United States Patent
Harper

(10) Patent No.: US 7,231,632 B2
(45) Date of Patent: Jun. 12, 2007

(54) SYSTEM FOR REDUCING THE NUMBER OF PROGRAMS NECESSARY TO RENDER AN IMAGE

(75) Inventor: John Harper, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/826,773

(22) Filed: Apr. 16, 2004

(65) Prior Publication Data

US 2005/0231521 A1 Oct. 20, 2005

(51) Int. Cl.
*G06F 9/44* (2006.01)
*G06T 11/20* (2006.01)
*G06F 13/00* (2006.01)

(52) U.S. Cl. .................. 717/109; 345/440; 719/331

(58) Field of Classification Search ................. 717/132, 717/141, 144, 105, 109, 113, 155, 156, 162; 345/440; 715/763; 700/17; 719/310, 330, 719/331, 332

See application file for complete search history.

(56) References Cited

U.S. PATENT DOCUMENTS

| | | | | |
|---|---|---|---|---|
| 4,752,893 A | * | 6/1988 | Guttag et al. ................ | 345/440 |
| 5,168,441 A | * | 12/1992 | Onarheim et al. ............ | 700/17 |
| 5,388,201 A | | 2/1995 | Hourvitz et al. ............. | 345/794 |
| 5,490,246 A | * | 2/1996 | Brotsky et al. .............. | 715/763 |
| 5,522,022 A | * | 5/1996 | Rao et al. .................... | 345/440 |
| 5,651,107 A | | 7/1997 | Frank et al. | |
| 5,764,229 A | | 6/1998 | Bennett | |
| 5,793,376 A | | 8/1998 | Tanaka et al. ............... | 345/582 |
| 5,877,741 A | | 3/1999 | Chee et al. | |
| 5,877,762 A | | 3/1999 | Young et al. | |
| 5,933,148 A | | 8/1999 | Oka et al. .................... | 345/427 |
| 5,949,409 A | | 9/1999 | Tanaka et al. ............... | 345/549 |
| 6,006,231 A | | 12/1999 | Popa | |
| 6,031,937 A | | 2/2000 | Graffagnino ................. | 382/236 |
| 6,075,543 A | | 6/2000 | Akeley ......................... | 345/539 |
| 6,166,748 A | | 12/2000 | Van Hook et al. ........... | 345/522 |
| 6,191,797 B1 | * | 2/2001 | Politis .......................... | 345/440 |
| 6,195,664 B1 | * | 2/2001 | Tolfa ........................... | 707/200 |
| 6,211,890 B1 | | 4/2001 | Ohba ........................... | 345/506 |

(Continued)

FOREIGN PATENT DOCUMENTS

EP 548 586 A 6/1993

(Continued)

OTHER PUBLICATIONS

International Search report dated Jul. 27, 2005 (PCT/US 05/008804; 119-0033WO).

(Continued)

*Primary Examiner*—Antony Nguyen-Ba
(74) *Attorney, Agent, or Firm*—Wong, Cabello, Lutsch, Rutherford & Brucculeri LLP

(57) ABSTRACT

A system for reducing memory and computational requirements of graphics operations. The system provides techniques for combining otherwise individual operations to apply filters to images. A combined filter emerging from the combination spares the processor time and the creation of an entire intermediary image. The system further provides for application of these techniques in many contexts including where the operations are fragment programs in for a programmable Graphic Processing Unit.

13 Claims, 19 Drawing Sheets

U.S. PATENT DOCUMENTS

| | | | |
|---|---|---|---|
| 6,246,418 B1 | 6/2001 | Oka | 345/441 |
| 6,272,558 B1 | 8/2001 | Hui et al. | |
| 6,369,823 B2 | 4/2002 | Ohba | 345/506 |
| 6,369,830 B1 | 4/2002 | Brunner et al. | 345/629 |
| 6,411,301 B1 | 6/2002 | Parikh et al. | 345/522 |
| 6,421,058 B2 | 7/2002 | Parikh et al. | 345/522 |
| 6,424,348 B2 | 7/2002 | Parikh | 345/522 |
| 6,452,600 B1 | 9/2002 | Parikh et al. | 345/522 |
| 6,456,290 B2 | 9/2002 | Parikh et al. | 345/522 |
| 6,466,218 B2 | 10/2002 | Parikh et al. | 345/522 |
| 6,489,963 B2 | 12/2002 | Parikh et al. | 345/522 |
| 6,526,174 B1 | 2/2003 | Graffagnino | 382/236 |
| 6,542,160 B1 | 4/2003 | Abgrall | |
| 6,571,328 B2 | 5/2003 | Liao et al. | 712/35 |
| 6,577,317 B1 | 6/2003 | Duluk, Jr. et al. | 345/506 |
| 6,580,430 B1 | 6/2003 | Hollis et al. | 345/473 |
| 6,609,977 B1 | 8/2003 | Shimizu et al. | 463/36 |
| 6,614,444 B1 | 9/2003 | Duluk, Jr. et al. | 345/581 |
| 6,618,048 B1 | 9/2003 | Leather | 345/422 |
| 6,636,214 B1 | 10/2003 | Leather et al. | 345/422 |
| 6,639,595 B1 | 10/2003 | Drebin et al. | 345/426 |
| 6,664,958 B1 | 12/2003 | Leather et al. | 345/422 |
| 6,664,962 B1 | 12/2003 | Komsthoeft et al. | 345/426 |
| 6,674,438 B1 | 1/2004 | Yamamoto et al. | 345/501 |
| 6,697,074 B2 | 2/2004 | Parikh et al. | 345/522 |
| 6,707,462 B1 | 3/2004 | Peercy et al. | 345/619 |
| 6,717,599 B1 | 4/2004 | Olano | |
| 6,734,864 B2 | 5/2004 | Abgrall | |
| 6,906,720 B2 | 6/2005 | Emberling et al. | |
| 6,910,000 B1 * | 6/2005 | Yedidia et al. | 703/2 |
| 6,911,984 B2 | 6/2005 | Sabella et al. | |
| 6,931,633 B1 * | 8/2005 | Vazquez et al. | 717/131 |
| 7,016,011 B2 * | 3/2006 | De Haan | 352/43 |
| 2002/0067418 A1 | 6/2002 | Hiroaki | |
| 2002/0093516 A1 | 7/2002 | Brunner et al. | 345/629 |
| 2002/0118217 A1 | 8/2002 | Fujiki | |
| 2002/0171682 A1 | 11/2002 | Frank et al. | |
| 2002/0174181 A1 | 11/2002 | Wei | 709/204 |
| 2003/0123739 A1 | 7/2003 | Graffagnino | 382/236 |
| 2003/0174136 A1 | 9/2003 | Emberling et al. | |
| 2004/0032409 A1 | 2/2004 | Girard | |
| 2004/0223003 A1 | 11/2004 | Heirich et al. | |
| 2005/0088447 A1 | 4/2005 | Hanggie et al. | |
| 2005/0088452 A1 | 4/2005 | Hanggie et al. | |
| 2005/0168471 A1 | 8/2005 | Paquette | |

FOREIGN PATENT DOCUMENTS

| | | |
|---|---|---|
| EP | 0 694 879 | 1/1996 |
| EP | 1 383 080 | 1/2004 |
| EP | 0 972 273 B1 | 3/2004 |
| WO | WO 98/45815 | 10/1998 |
| WO | WO 02/09039 A | 1/2002 |
| WO | WO 2004-027707 A2 | 4/2004 |

OTHER PUBLICATIONS

International Search report dated Aug. 8, 2005 (PCT/US 05/008805; 119-0034WO).

Haeberli, P. et al., "The Accumulation Buffer: Hardware Support for High-Quality Rendering," Computer Graphics, New York, NY, vol. 24, No. 4, Aug. 1, 1990, pp. 309-318.

nVIDIA. "Cg—Teaching Cg" Power Point Presentation, Author and date unknown.

Shantzis, "*A Model for Efficient and Flexible Image Computing*" Computer Graphics Proceedings, Annual Conference Series, 1994, pp. 147-154.

Akeley, et al., "*Real-Time Graphics Architecture*" http://www.graphics.stanford.edu/courses/cs448a-01-fall, The OpenGL® Graphics System—CS448 Lecture 15, Fall 2001, pp. 1-20.

Gelder, et al., "Direct Volume Rendering with Shading via Three-Dimensional Textures" Computer Science Dept., Univ. of California, Santa Cruz, CA 95064.

Elliott, "Programming Graphics Processors Funcionally,".

Segal, et al., "The OpenGL® Graphics System: A Specification (Version 1.5)" Copyright © 1992-2003 Silicon Graphics, Inc., Oct. 30, 2003.

International Search report dated Mar. 8, 2006 (PCT/US 05/019108; 119-0032WO).

* cited by examiner

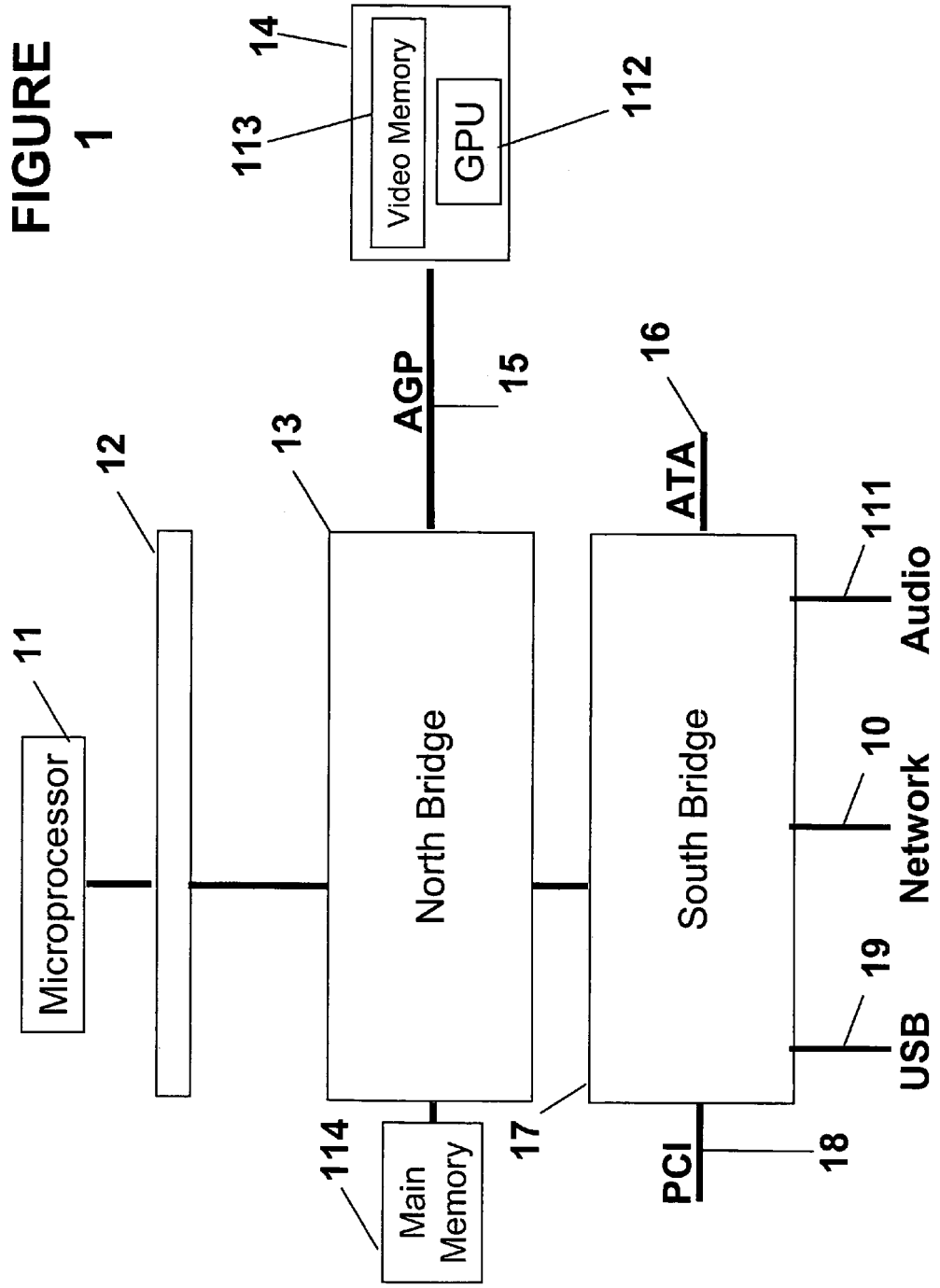

High-level Code Examples:

1. Allocate 51
2. Apply 52 to 51, parameters = (X, Y, Z, W), input = 51 (Sea Shore image), output = [place holder] CC sea shore
3. Apply 53, parameters (X, Y, Z, W), input = cc sea shore, output = [place holder] FC CC sea shore
4. Apply 54, parameters (X, Y, Z, W), input buffer 53, input Sea Shore image, output = [place holder] sea shore result

| | CPU | GPU |
|---|---|---|
| Time 1 | Frame 1 | Prior Task |
| Time 2 | Frame 2 | Frame 1 |
| Time 3 | Frame 3 | Frame 2 |
| Time 4 | Frame 4 | Frame 3 |
| Time 5 | Frame 5 | Frame 4 |
| Time 6 | Frame 6 | Frame 5 |
| Time 7 | Frame 7 | Frame 6 |

15(b)

| | P1 | P2 | P3 | P4 |
|---|---|---|---|---|
| Time 1 | Frame 1 | | | |
| Time 2 | Frame 2 | Frame 1 | | |
| Time 3 | Frame 3 | Frame 2 | Frame 1 | |
| Time 4 | Frame 4 | Frame 3 | Frame 2 | Frame 1 |
| Time 5 | Frame 5 | Frame 4 | Frame 3 | Frame 2 |
| Time 6 | Frame 6 | Frame 5 | Frame 4 | Frame 3 |
| Time 7 | | Frame 6 | Frame 5 | Frame 4 |

FIGURE 15(c)

| | CPU | GPU |
|---|---|---|
| Time 1 | Frame 1, effect 1 | |
| Time 2 | Frame 2, effect 1 | Frame 1, effect 2 |
| Time 3 | Frame 1, effect 3 | Frame 2, effect 2 |
| Time 4 | Frame 2, effect 3 | Frame 1, effect 4 |
| Time 5 | Frame 3, effect 1 | Frame 2, effect 4 |
| Time 6 | Frame 4, effect 1 | Frame 3, effect 2 |
| Time 7 | Frame 3, effect 3 | Frame 4, effect 2 |
| Time 8 | Frame 4, effect 3 | Frame 3, effect 4 |
| | | Frame 4, effect 4 |

15(c)

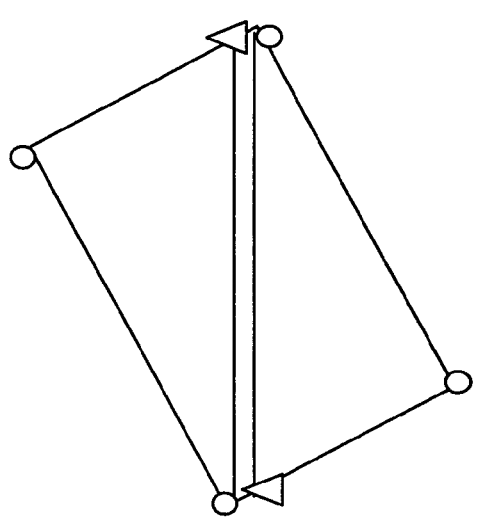
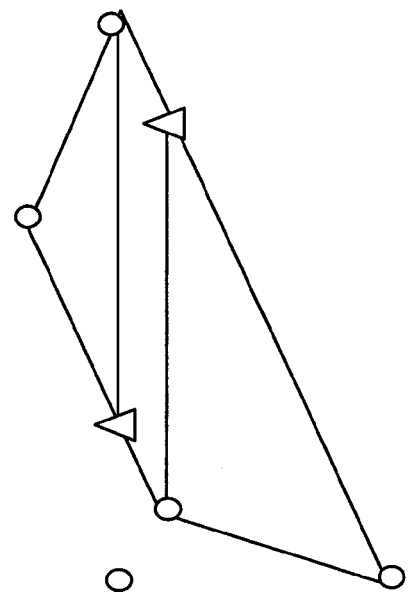
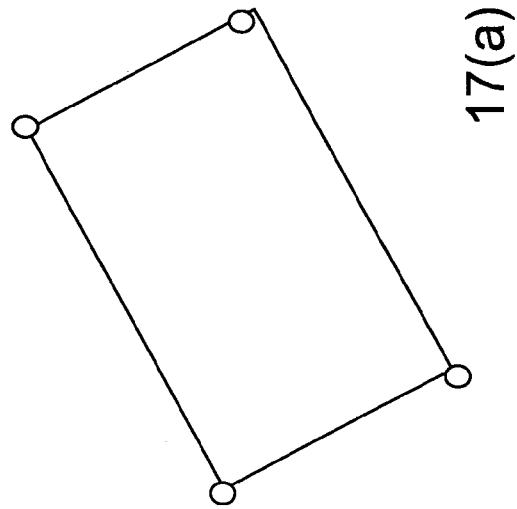
Figures 17(a) & 17(b)
17(a)
17(b)

US 7,231,632 B2

SYSTEM FOR REDUCING THE NUMBER OF PROGRAMS NECESSARY TO RENDER AN IMAGE

BACKGROUND OF THE INVENTION

Over the past several years there have been increasing demands placed upon graphics subsystems in all variety of hardware. For example, in the general computing area, even traditionally mundane programs, like presentation software, are including animation and other tools that are requiring faster and more complex graphics computation. In addition, the traditional graphics-intense applications like video, photo editing and gaming are growing both in scope and graphics-intensity. Moreover, vertical systems such as gaming and graphics dedicated computing (e.g. Nintendo Gamecube etc.) have accelerated even faster driving competition with the general computing architecture for graphics supremacy.

During this same time period, hardware manufacturers have sought to meet and exceed the growing demand with dedicated graphics processors having ever-increasing capability. Right now, there are several commercially available graphics processing units (GPUs) that are programmable. While both programmable and non-programmable GPUs offer enhanced speed for graphics calculations, programmable GPUs differ in that they offer a high measure of flexibility. For example, prior to programmable GPUs, an application programmer might decide between using CPU time to render a more interesting graphic or using the GPU to increase overall application performance at the cost of displaying a less ideal graphic. Programmable GPUs have combined the speed advantage of prior GPUs with a significant measure of flexibility. In practical terms, programmability is an important advantage because it allows programs to use the graphics chip in ways similar to the system microprocessor. By using the GPU this way, the system can generate virtually infinite graphics effects without loading the system CPU.

Programmable GPUs run programs that are generally called fragment programs. The name "fragment" program derives from the fact that the unit of data being operated upon is generally a pixel—i.e a fragment of an image. The GPUs can run a fragment program on several pixels simultaneously to create a result, which is generally referred to by the name of the buffer in which it resides. GPUs use data input generally called textures, which is analogous to a collection of pixels.

Also, during the same time period that GPUs were contemplated and developed, there have been efforts under way to provide some programming interfaces for application programs desiring to use the graphics-dedicated hardware. One such effort is commonly known as OpenGL. The goal of OpenGL is to make graphic function accessible to the programmer independent of the hardware. In doing so, OpenGL operates like a state machine. In particular, a program using the OpenGL library must set states such as current color, lighting, blending etc. When the program is run, the resultant context will be a combination of the states and input textures, such combination depending upon what was programmed. Given the state machine type operation, the result of an operation isn't always readily predictable.

As computers migrate toward more visually rich content, image processing becomes more important. As a consequence, the programmer's ease of accessing these tools and the efficiency of graphics calculations continues to grow in importance. While the combination of OpenGL and programmable GPUs have provided wide advances to graphics programmability, there remains a need for a higher level interface to the graphics subsystem. This need is heightened for applications directly involved in image processing (e.g. PhotoShop, AfterEffects or similar software). In these applications and others, it is desirable to have an abstraction layer that hides the complexity of graphics hardware from those exploiting that infrastructure. Furthermore, operating systems may wish to facilitate an overall rich user graphics experience by presenting such an abstraction layer to all applications.

Such an interface should allow a programmer or program to simply apply a filter or effect to a given image. Implicit in the need for a higher level API is the need to implement that API in a way that is both fast and efficient. In order to be efficient, a system should have a mechanism to conceptualize graphics programming in a way that is easy to understand and easy to operate upon. Furthermore, such a system should minimize the use of memory and computation time, while also efficiently dividing work between the CPU and GPU. Finally, it is desirable to have a system that may be emulated on a single processor so that programs built for dual processor systems (GPU and CPU) can run on legacy systems having only a CPU.

SUMMARY OF THE INVENTION

Among other advances, the invention seeks to solve the problems and meet the needs and desires described above. In doing so, some embodiments of the invention include a high-level program interface for graphics operations, or potentially other operations that may exploit a secondary processor resource. In a more specific embodiment of this type, a high-level program interface comprises graphics filtering functions that may be called by a user or program in the system. The program or user exploits the high-level program interface by creating effects or specifying filter functions from a pre-defined list. In alternative embodiments, the programmer or program may gain access to an extensible infrastructure to add filters to the pre-defined list.

In one general embodiment of the invention, software will exploit a selected processor in the system to compose a graph-like description of an image task. The graph-like description may be a node and link representation of an image, where nodes may represent operators and links may represent intermediary results and the storage necessary to hold those results. In greater particularity, nodes in the graph-like description may ultimately comprise threads or programs for computing a portion of the overall image operation on another processor. Furthermore, having a graph-like description of the overall image task allows use of an optimizing compiler to reduce the necessary resources for the overall image task. This compiling function is especially useful since the node programs will generally run on a processor other than that which runs the compiler.

The forgoing general embodiment may be described in the context of a contemporary pairing of a single CPU with a single GPU. This embodiment proposes software running on the CPU for assessing the overall image task and constructing a graph-like description of same. This may be visually represented as a tree graph of nodes and links with associations as described above. Since the node-programs may execute on the GPU, the construction of the program accounts for properties of the GPU. Most notably, and in a general sense, programmable GPUs operate several parallel execution streams so the node-programs may be expressed in parallelizable languages. For example, node programs may be GPU fragment programs. After construction of the graph representing the overall image task, the graph may be optimized by virtue of a compiler running on the CPU. Alternatively, the graph may be optimized by a compiler in distinct pieces, as the graph is created. The purpose of optimizing is to minimize memory usage and CPU or GPU time or otherwise gain efficiency when the image is computed.

According to varying embodiments of the invention, optimization may have many functional characteristics. For example, optimization may include caching intermediary results, consolidating multiple fragment programs into one, limiting memory and computation to areas within a confined domain of definition and region of interest, or optimizing division of computation between processors.

Applying these techniques in the contemporary graphics context is highly efficient and allows developers to write filters by expressing the operations to be performed on an element (e.g. pixel) or elements without concern for the specific hardware in a system—that will be accounted by the compiler. In addition, having created an API and efficient processing infrastructure for deployment in a multi-processor system, many embodiments also include functionality to exploit that the API on single processor systems. In a very general sense, this is accomplished by emulation.

BRIEF DESCRIPTION OF THE DRAWINGS

FIG. 1 is a sample hardware configuration

FIGS. 15(a) and 15(b) are illustrations of using multiple processors to apply multiple effects FIG. 15(c) an illustration of using multiple processors to apply multiple effects FIGS. 17(a) and 17(b) are an example of polygon divisions

DETAILED DESCRIPTION

A. Technology and Nomenclature

1. Technology

The inventive embodiments described herein may have implication and use in all types of multi-processor computing systems and, in particular, where differing types of processors are exploited in a system. Most of the discussion herein focuses on a common computing configuration having a CPU resource and a GPU resource. The discussion is only for illustration and not intended to confine the application of the invention to other systems having either: no GPU, multiple CPUs and one GPU, multiple GPUs and one CPU or multiple GPUs and multiple CPUs. With that caveat, we shall provide information regarding a typical hardware and software operating environment.

Figure 2A:
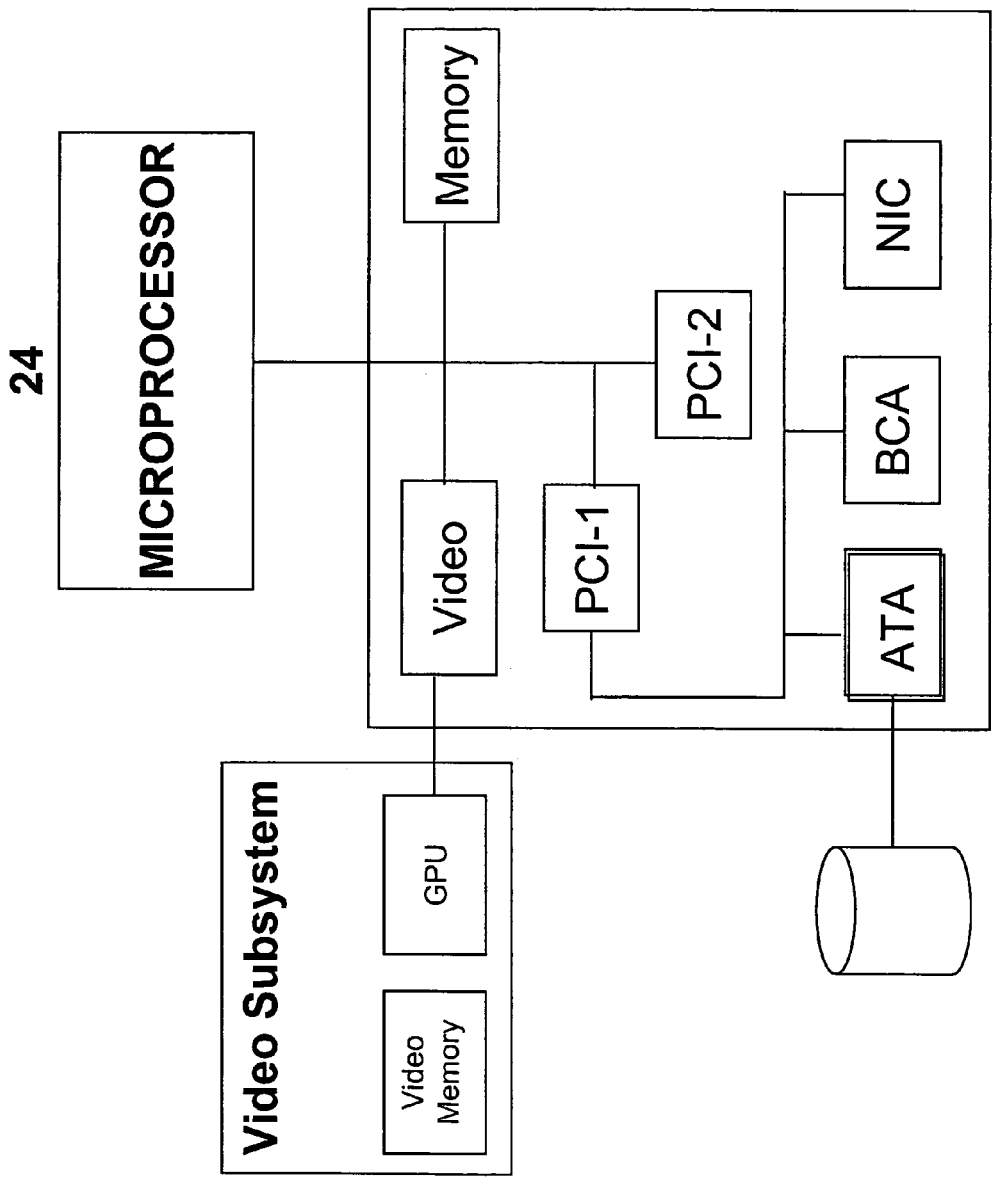
FIGS. 2(a) and 2(b) are samples of hardware configuration
Figure 2B:
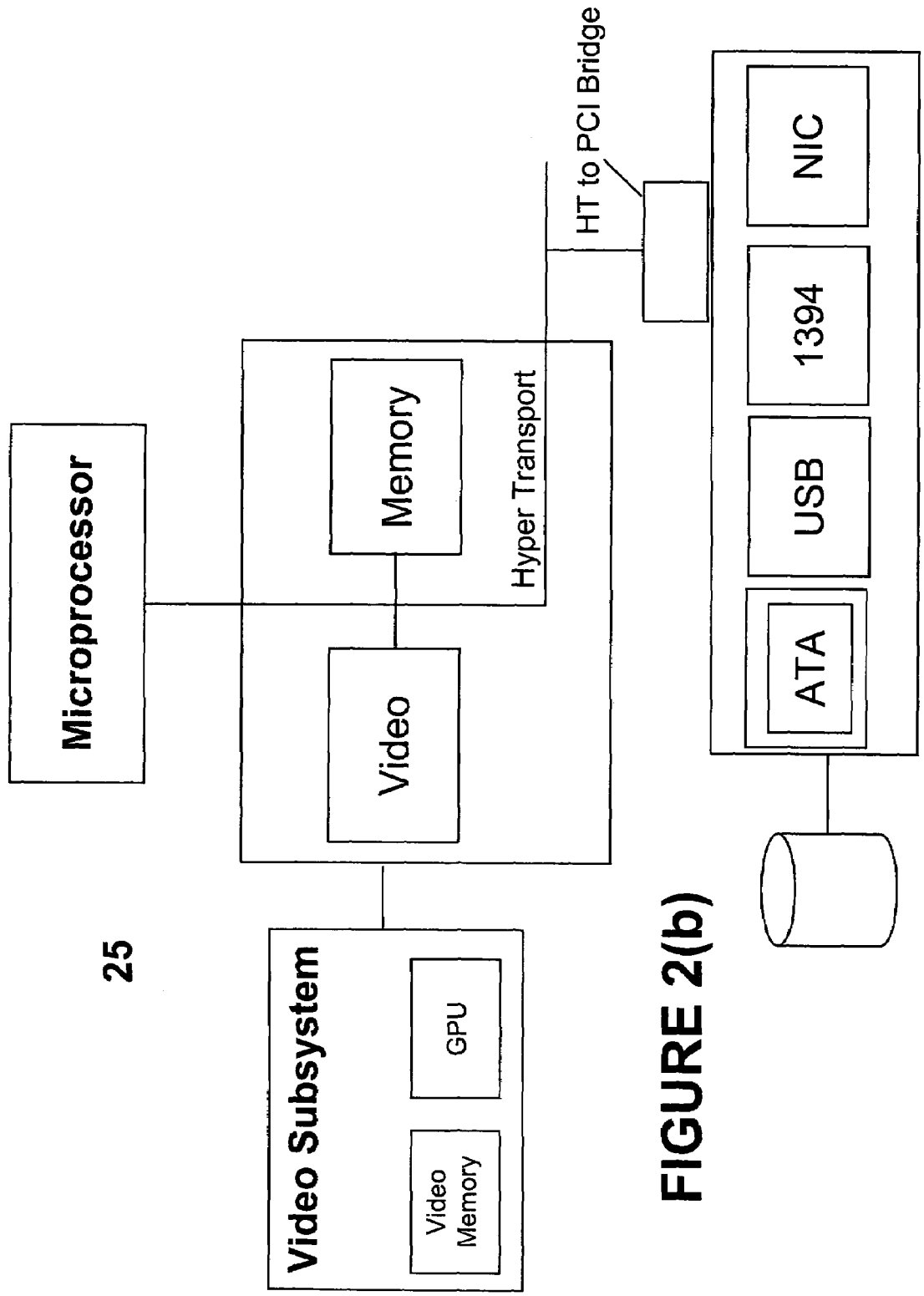

Referring to FIG. 1, a common hardware computing configuration is shown. Very generally, a Microprocessor 11 is coupled to chipset support integrated circuits 13 and 17. The microprocessor may be any microprocessor or controller such as one of the Intel Pentium family or IBM/Motorola PowerPC chips such as the 23, 24 or 25. The chipset ICs (expressed here as North Bridge 13 and South Bridge 17) may be implemented in one or more ICs. The chipset 13, 17 generally couples to the microprocessor through a bus 12 or by direct links, which are well known in the art at this time. If the chipset 13, 17 is implemented in more than one IC, it is common for North Bridge functionality (AGP, memory management etc) to have a more direct connection to the processor by either connection to a common bus or the aforementioned links. A separate chip containing the South Bridge functionality is very commonly coupled to the microprocessor 11 through the North Bridge. However, we do not wish to preclude other configurations that exist now or may exist in the future. Some potential South Bridge functionality includes an ATA bus 16 for peripheral attachments such as disk drives; a PCI bus 18 for attachment of all manner of peripherals; a USB controller 19 for attachment of USB devices; a network interface controller 110 for supporting Ethernet or potentially other networks; and audio support 111. More relevantly, typical North Bridge functionality includes a memory controller to support main memory 114 and an accelerated graphics port 15 for support of a video subsystem. Memory is typically any of a variety of types of dynamic random access memory, but may also, in alternative configurations be static RAM, magnetic memory, optical memory or any other suitable storage medium that exists or may exist in the future. AGP 15 is a special port placed in the chipset so that the graphics subsystem has rapid access to the system resources such as the microprocessor and main memory. There are various emerging flavors of AGP and certainly other methods to accelerate the speed of interaction between core resources and the graphics subsystem. This discussion is not intended to limit use to any particular method for performing similar functions. Lastly, FIG. 2 shows alternative computing hardware configurations 24 and 25, which are intended for loose association with 24 and 25 microprocessors respectively.

Figure 3:
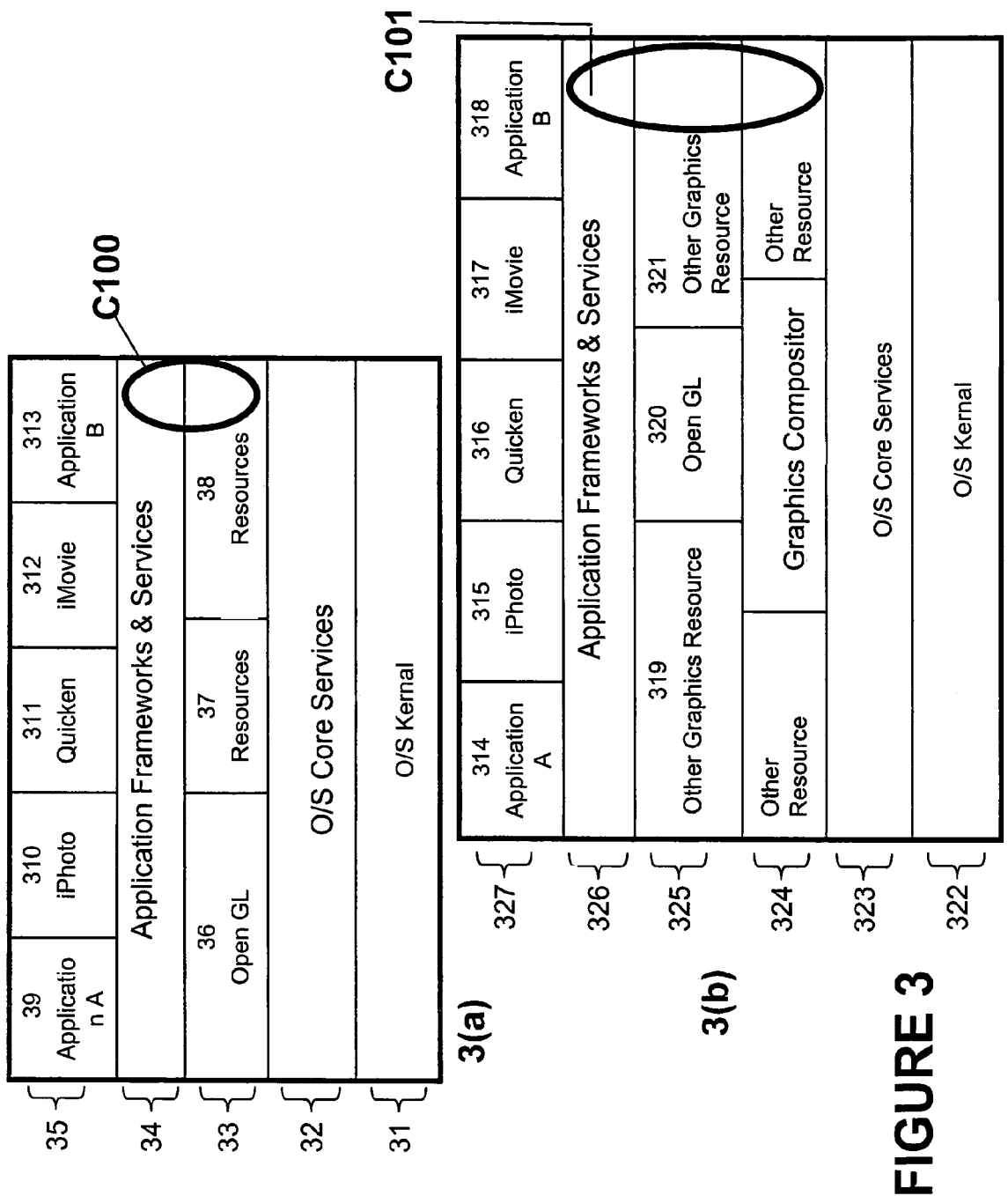
FIGS. 3(a) and 3(b) are an illustrative of software stack

As noted above, embodiments of the inventions disclosed herein include software. As such, we shall provide a description of common computing software architecture as expressed in layer diagrams of FIG. 3. Like our hardware examples, these are not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in a layer use resources from the layers below and provide services to layers above. However, in practice, all components of a particular software element may not behave entirely in that manner.

With those caveats regarding software, referring to FIG. 3(a), layer 31 is the O/S kernel, which provides core O/S functions in a highly protected environment Above the O/S kernel, there is layer 32 O/S core services, which extend functional services to the layers above such as disk and communications access. Layer 33 is inserted here to show the general relative positioning of the OpenGL library and similar resources. Layer 34 is an amalgamation of functions typically expressed as two layers: applications frameworks and application services. For purposes of our discussion, both these layers provide high-level and often functional support for application programs with reside in the highest layer shown here 35. Item 3100 is intended to show the relative positioning of "Core Imaging," a software suite and moniker, which provides a vehicle for describing many embodiments of the current invention (when referring to a software suite that comprises some, any or all or the inventive embodiments, we will generally use the term "Core Imaging").

Referring now to 3(*b*), item 101 represents the relative positioning of the Core Imaging suite, It is evident in the diagram 3(*b*) that, by comparison to 3(*a*), a layer has been added 324 for another graphics function—compositing. It is the compositor's job to perform window composition and management in a windowing system, like that which is discussed for many embodiments.

2. Trees and Graphs

Figure 4:
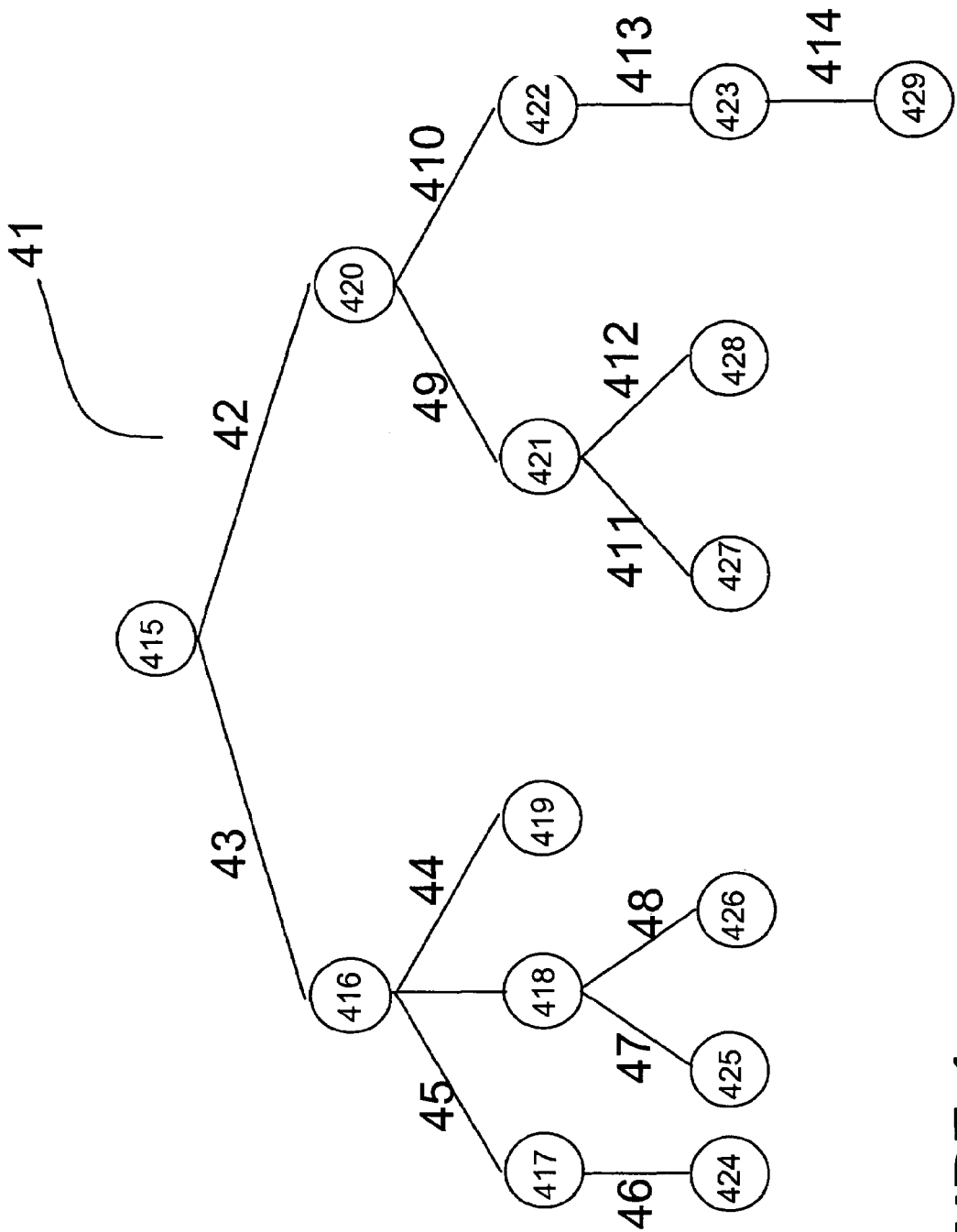
FIG. 4 is a graph

In mathematics and other computational sciences, problems may be expressed in a parsed fashion, which lends itself to machine-performed computation and the programming of such machine. An example of parsed expression is a generalized tree structure such as that shown in FIG. 4. Referring to FIG. 4, tree structure 41 is comprised of: links, which represent the result of the nearest subservient node (42, 43, 44, 45, 46, 47, 48, 49, 410, 411, 412, 413 and 414); and two types of nodes. There are leaf nodes that represent pre-existing computational input (e.g. operands), 419, 424, 425, 426, 427, 428 and 429. Alternatively, there are functional nodes that represent computational functions (e.g. operators) 415, 416, 417, 418, 420, 421, 422 and 423. As an overall example, referring to FIG. 4, link 46 serves as an input to functional node 417 and represents the result of leaf node 424 (the result of a leaf node, simply being the leaf).

Figure 5:
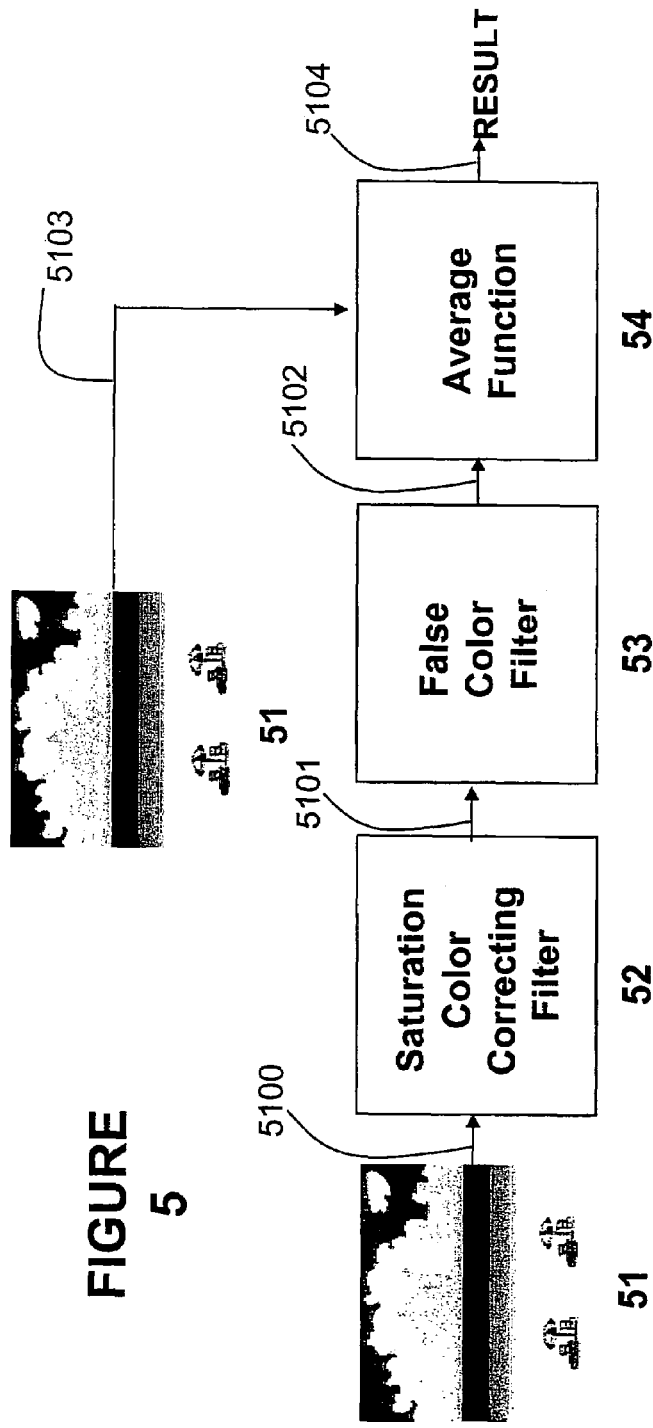
FIG. 5 is a graph and sample program steps

Referring now to FIG. 5, another tree is shown using rectangular nodes rather than circles. However, the representative nature of the diagram is the same: leaf nodes 51 are analogous to operands; functional nodes 52, 53, and 54 represent operators, and the links 5100, 5101, 5102, 5103 and 5104 represent results.

At various places in this disclosure we use trees like those in FIGS. 4 and 5, and we discuss those trees in the context of "graphs" being used or assembled within a computer system. We generally do not intend to imply that the computer system is constructing or using the graphical tree that is pictured, but rather that the system makes, maintains or uses some representation of the graphical tree that we draw for human illustrative purposes.

Furthermore, we generally use the trees (or graphs) in the context of discussing graphics technology and software. From the perspective of an application program or programmer, an image that is defined by a tree or graph is usually indistinguishable from an image defined by an array of pixels. Both types of images define the same ultimate object and it is the object that the application program associates with the image. In some respects, the same is true regarding the perspective of Core Imaging (or other software embodying the inventions herein). Therefore, Core Imaging may evaluate an image calculation task by evaluating a graph. In that respect, the result of the root node of the graph is the ultimate result. Referring to FIGS. 4 and 5, nodes 415 and 54 are the respective root nodes of the graphs.

In describing the embodiments of the invention and Core Imaging, we frequently reference these illustrative tools. Therefore, by way of introduction regarding many of the embodiments discussed herein, referring to FIG. 4, the following associations are generally appropriate in the context of our discussion: (i) the tree shown is generally referred to a low-level graph; (ii) functional nodes 415, 416, 417, 418, 420, 421, 422 and 423 represent "kernels" or fragment programs that run on a microprocessor such as a GPU; (iii) leaf nodes 419, 424, 425, 426, 427, 428 and 429 generally represent images, which is to say a collection of pixels or a representation of same; and (iv) links 42, 43, 44, 45, 46, 47, 48, 49, 410, 411, 412, 413 and 414 represent results, although in the context of an operation that will actually occur, those results are usually associated with a buffer for storing same.

In addition, for introduction purposes regarding many of the embodiments discussed herein, referring to FIG. 5, the following associations are appropriate in the context of our discussion: (i) the tree shown is generally referred to as a high-level graph; leaf nodes 51 represent images; functional nodes 52, 53, and 54 represent high-level filters, which are typically pre-defined filters; and the links 5100, 5101, 5102, 5103 and 5104 represent results of the filter, but unlike the low-level graph, are not necessarily associated with buffers.

B. Core Imaging API from the Programmer Perspective

Many embodiments of the invention involve object oriented programming and make four types of objects available to a programmer. These object types are images; filters, context, and vectors. Each is discussed briefly and with an effort not to limit its generality.

Images are either the two dimensional result of rendering (a pixel image) or a representation of the same. In high-level program operations, we often maintain objects that represent images in that those objects require computation to become the actual pixel values. Differing embodiments of the invention may exploit either or both of pixel-value images and un-computed images as a definition of image. The specific meaning derives quite easily from the contextual use (having no relation to the "context" object). In a general sense, during discussions relating to filters, images should be interpreted as inputs to a function or filter.

Filters are high-level functions that are used to affect images. Filters may comprise one or more of the pre-defined filters listed at the end of this disclosure. Filters may be analogized to fragment programs, which similarly affect images (or more precisely, typically textures), however producing only one pixel at a time. In many of the inventive embodiments, Core Imaging compiles filter-based image manipulation so that such manipulation can occur on a GPU using fragment programs. There is not necessarily a one-to-one correspondence between filters and fragment programs.

Context is a space such as a defined place in memory in which the result of a filtering operation resides. If images are assumed to be inputs as suggested above, then context is assumed to be output.

A Vector is a collection of floating point numbers. For most embodiments discussed herein, Vectors are associated with four floating point numbers, each number having the same fixed number of bits—commonly 32. In graphics, vectors may be employed to represent (i) the four dimensions required to describe pixel appearance (R (red); G (green); B (blue); and Alpha (transparency)); or (ii) the two or three dimensions required to describe two-space, three-space, or four-space (homogeneous) coordinates respectively: X, Y, Z, and W.

C. Core Imaging and the Core Imaging API

Core Imaging is a software suite comprising many routines and functioning as, among other things, a high-level programming language or API built for graphics functions but applicable to other functionality such as math alone (e.g. convolution operations). Recall, that we use the moniker Core Imaging to refer to any one embodiment or any group of embodiments and we do not intent to confine the invention to any particular comment regarding "Core Imaging." Similarly, we may refer to a routine or process as or within Core Imaging and by that, we do not intend to imply this such software is implemented as a single unit or layer.

Core Imaging includes a high-level language or API for communicating with a graphics framework and graphics-focused applications services suite. This also includes a compiler for producing assembly from the high-level language. The language/API is platform and hardware independent because the graphics framework and subservient software layers may account for platform or hardware differences. The API allows programmers to apply effects to images without concern for (1) the states and other parameters required by OpenGL or like interfaces, or (2) assembly language for the GPU or other resource performing graphics rendering.

When conceptualized as software, Core Imaging (or an embodiment of the API and associated compiler) may be viewed as a suite of graphics services routines positioned generally between application programs and the operating systems. Since layered software conceptualizations are subject to varying interpretations, this discussion is not intended to be exclusive of other ways to conceptualize the layered position of Core Imaging (or any graphics services software suite according to an embodiment of the invention). With that caveat, referring to FIGS. 3(a) and 3(b), graphics services software suites 3100 and 3101 are respectively shown.

The positioning of these graphic services 3100 and 3101 implies that these suites may include components for application frameworks, application services and graphics resources. In short, the intention in this positioning is to imply that Core Imaging 3100 and 3101 may interact with: Applications in layers 35 and 327; other frameworks or services in layers 34 and 326; resources such as OpenGL in layers 33 and 325; the compositor in layer 24; and O/S services in layers 32 and 323.

In a general sense, as applied to graphics, Core Imaging allows programmers and programs to implement an effect by either (1) using a pre-defined high-level filter or (2) by assembling a series of pre-defined filters using the API or one or more other embodiments of this invention. In the latter case, the programmer or program makes API calls to Core Imaging for high-level descriptions of zero or more of the pre-defined filters. The program or programmer places those high-level descriptions (or reference thereto) in a data structure that we shall call a high-level graph. The high-level graph is assembled by the programmer or program creating a new filter. The high-level graph defines relationships between the pre-defined filters and images being employed in the new filter. When the programmer or program has completed building its high-level graph, it has effectively completed its tasks for creating the new filter. That is to say that all the information necessary to create the new filter is embodied in the high-level graph.

In an alternative embodiment, as a programmer or program assembles a graph in cooperation with Core Imaging, the graph created may be a low-level graph or substantially a low-level graph. For example, from the perspective of the program or programmer, a request may be made for a high-level filter, however, Core imaging may create and deliver an object that is a low-level filter or some interim step between a low-level filter and a high-level filter. Since the program or programmer does not actually inspect the object, Core Imaging can respond to requests for high-level code with low-level code. In this manner, Core Imaging may assemble a low-level graph while a program believes to be working with high-level filters and objects.

Core Imaging has the additional tasks of ultimately optimizing and compiling the high-level graph (along with any applicable input parameters) to yield a GPU-ready program. The compiling step may be performed just in time for use of the ultimate image. In summary, the programmer or program has used high-level language of the API (including pre-defined filters) to create and effect, which is essentially a new filter comprised of various other filters and inputs. The programmer or programmer may also programmatically apply this filter to an image. Various embodiments of the invention contemplate various divisions of work between the GPU and CPU. Generally, the CPU will run Core Imaging and the GPU will run the ultimate product of Core Imaging. However, depending upon hardware abilities and ultimate optimizations, Core Imagine may create tasks for the CPU and GPU. Furthermore, if there is no programmable GPU in the system, Core Imaging may create an object for the CPU to render the image to context.

D. Basic Functions of a Core Imaging Embodiment

Looking now more fully at the capabilities of Core Imaging, in one embodiment, the API provides six high-level functions for the programmer and ultimately a user of an application program: creation of a context; creation of an image; creation of a filter; the ability to set parameters associated with filters (e.g. the arguments of a filter function); the ability to ask for the output of a filter or group of filters that has been assembled; and the ability to render an image to a context.

1. Creating a Context.

We refer generally to an output as a context, so the ability to create a context is derived from tools that allow definition of an object in memory. The definition of such an object is necessary so that there may be a destination for the results of an operation. For example, a context can be associated with a bitmap in main memory or with an OpenGL view. These associated image containers are used as a destination for rendering. While the invention primarily contemplates memory such as video memory associated with a system's graphics functions, the concepts discussed here apply equally to any memory or storage found elsewhere in the system or accessible to the system. Therefore, without limitation, memory may include all types of solid state memory such as dynamic memory or static memory whether specifically associated with the graphics subsystem, shared with the graphics subsystem or nominally dedicated to the main system or another subsystem accessible by the main system. Furthermore, while speed is certainly an issue, the concepts herein do not intend to exclude magnetic or optical memory.

As example of creating a context, we can assume that an application program wishes to ultimately display something to screen. Assume Apple's iPhoto application desires to display an image of the sea shore in response to a user command. iPhoto may exploit the Core Imaging API by calling a function to request creation of a context. Core Imaging will return, among other possible things, a handle of identification of the created context. Let's assume that handle is "empty context."

2. Creating an Image.

We refer generally to an input as an image, because coordinates or pixels in an image may be sampled to yield relevant values. Using an embodiment of the inventive API, images may be created from nothing or from another image. An image is created from nothing by providing a mechanism for creating pixel values. For example, an image may be created from nothing by simply defining the image as a color or a mathematical combination of colors (like a checkerboard or striped page). An image, more commonly, may be created from another image by applying one or more filters to the existing image.

Following our iPhoto example from above, iPhoto may create an image by asking graphic services to take an existing image of children on a sea shore and apply a filter (e.g. a blur) to some area outside of the children. Upon application of this filter, a new image is created. For clarity, this is an un-computed image in that new pixel values have not been calculated, but rather, the blur filter has been programmatically applied and resides or is referenced in the image buffer where all the other elements necessary to calculate the pixels are either stored or referenced.

3. Create a Filter.

We refer generally to a filter as any function that may be performed on zero or more images (ultimately a pixel). In slightly more particularity, a filter may be a function that accepts images and other parameters (associated with and dependent upon the particular filter) as inputs and yields a new image. The API currently provides several dozen filters that are listed and described elsewhere in this disclosure. However, an embodiment of the invention calls for an extensible nature so the inventors continue to develop filters and have provided an ability of others to develop filters as well. While the invention contemplates extensibility that allows for addition of pre-defined type filters, our discussion will focus on new filters created by the combination and manipulation of zero or more pre-defined filters.

One manner contemplated for the creation of a filter is for a programmer or program to begin by using an embodiment of the inventive API to tie together one or more of the API's pre-defined filters and any other items or functions that the programmer wishes to apply. As mentioned earlier, to create a new filter, the program or programmer may create a high-level graph comprising representations of all images and pre-defined filters that will be used and the relationship between those objects. In some embodiments, the pre-defined filters are intended to be as comprehensive as possible of rudimentary graphics functions, so as to minimize the need or incentive for the programmer or program to write assembly for the GPU. Indeed, an overall benefit of Core Imaging is the ability to program at the application layer without reference to the specific graphics hardware.

Once a new filter is defined with a high-level graph, an application program or user (at the CPU level) may call Core Imaging to implement the high-level graph (effect the filters referenced in the graph on the images referenced in the graph in a manner defined by the graph). Of course, the high-level graph may have been written to incorporate more than one image, but the technique is the same. When implementing the filter, Core Imaging may require other input data because filters commonly have filter-specific inputs such as a blur radius for blurs, geometric parameters or any other inputs like those specified in the filter definitions listed later.

An important function of Core Imaging is to then return one or more objects to the application program or user. According to varying embodiments of the invention the returned objects may be rendered or ready for computation on the GPU, the CPU or some combination of those two. In one alternative embodiment, Core Imaging builds all or part of the low-level graph while responding to application program requests for high-level elements. In this embodiment, the application program believes it is asking for higher level code, while core imaging is delivering lower-level code (the application program cannot detect the difference because it does not analyze the objects delivered by Core Imaging). Alternatively, in a preferred embodiment, the returned objects may be an optimized low-level graph ready for just-in-time compilation, when the application requires the image in a context. In some embodiments, Core Imaging will return only one object, which is to be compiled just-in-time and run on the GPU. In order to do so, Core Imaging must convert (and generally optimize) the high-level graph and convert the image(s) to a texture(s) (GPUs use textures, not images for computation). In converting an image to a texture, the Core Imaging uses the CPU to first convert the image to a sampler. A sampler is an image plus its state, so converting to a sampler comprises the steps of incorporating state information such as the following: (1) wrap mode such as transparent, clamp or replicate; (ii) interpolation mode such as using values from the nearest whole pixel to the subject pixel, or interpolating across a grid of four pixels surrounding the subject pixel; and (iii) affine transform such as rotate, scale, skew, translate, mirror. The sampler may then easily be converted to a texture for use by the GPU. With all this as input, the CPU, running Core Imaging, creates an object comprising a GPU program that, when executed, will implement the filter on actual pixels (provided by the textures created above).

Referring now to FIG. 5, we shall proceed through a general example of filter creation. Recalling back to our iPhoto sea shore example, a user may ask iPhoto to auto-enhance a photo. Assume, purely for illustration purposes that the auto enhance requires the following filter creation. This is purely for illustration in that the current iPhoto enhance feature would actually not operate in this way. iPhoto will first create its desired filter. This process might start by calling Core Imaging to allocate the base image 51, which at this point may be in graph or pixel form. We see this in step one of FIG. 5 and the high-level graph tree diagram. Next iPhoto calls Core Imaging to add a program step (and corresponding tree position) to apply color correction filter 52 to the image 51. We see this in FIG. 5 step 2 and the high-level graph tree diagram. Note that the output of step 2 in FIG. 5 is defined as Placeholder CC (for color corrected) sea shore. Since, at this point, it is uncertain when and if this intermediary result (CC sea shore) will ever exist, we do not allocate a buffer but rather place a placeholder in the high-level graph indicating the possibility of an intermediary result. In furtherance of the auto-enhance feature, iPhoto might further apply a false color filter 53 to the result of the 52 filtering. As before, iPhoto will call Core Imaging to get the high-level false color filter and insert same in the mounting high-level graph (and tree in FIG. 5 for illustration purposes). Next, in order to round out the auto enhance function, iPhoto might choose to average the result of the 53 filtering (FC CC sea shore) with the original sea shore image (51), so an appropriate filter 54 would be called from Core Imaging and inserted in high-level graph. This is seen both in the tree graph of FIG. 5 and the sample program steps.

Figure 6:
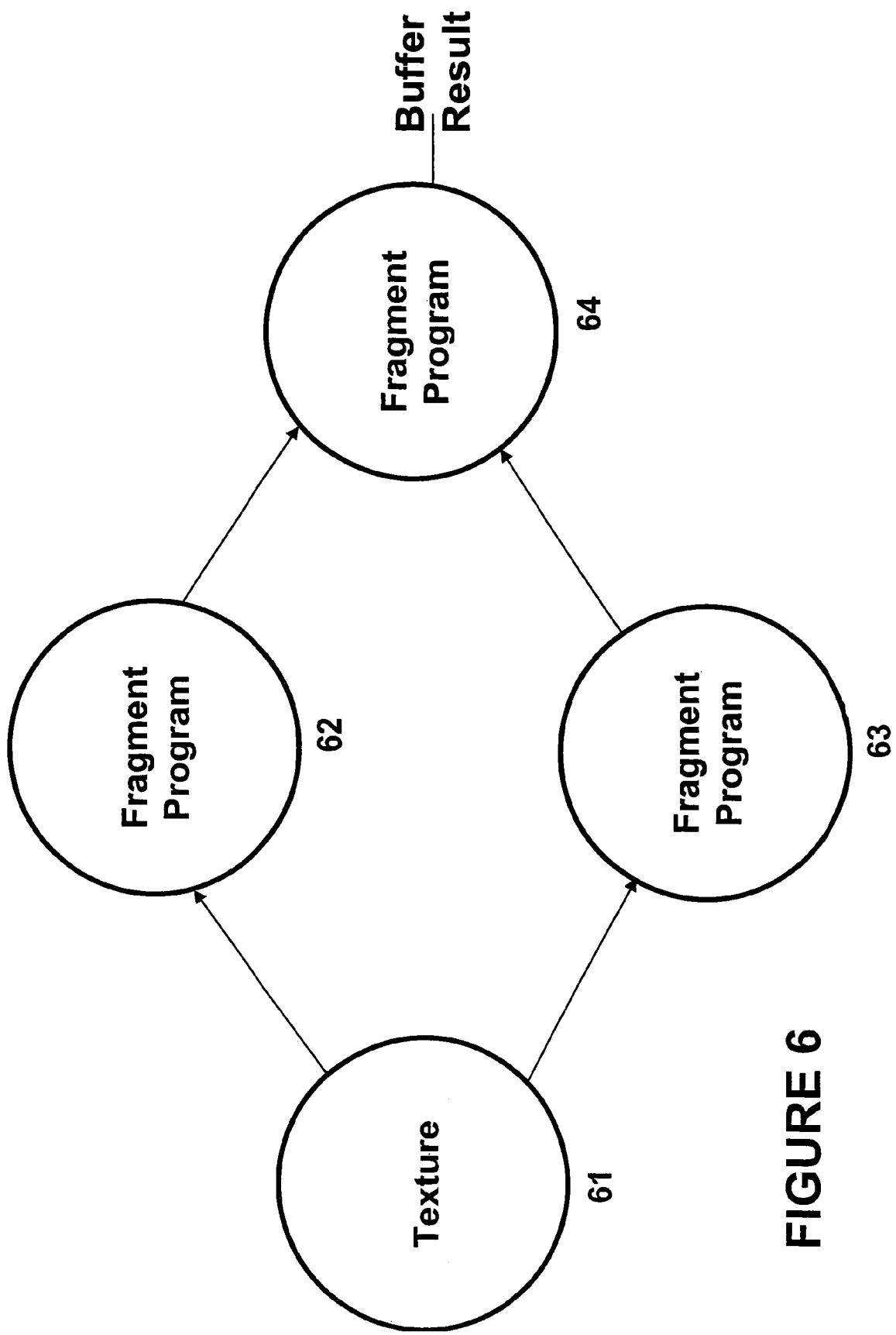
FIG. 6 is a graph

In our example, iPhoto now has a high-level graph for its desired result of an auto enhance sea shore image. In order to make that result usable in accordance with the embodiment of this example, iPhoto may sequentially call routines in Core Imaging (or Core Imaging may act alone) to convert, optimize or compile the high-level program as described above. For illustrative purposes, a result expressed in a simple form (analogous to FIG. 5) is displayed in FIG. 6. We see in FIG. 6 that the fragment programs (62, 63 and 64) need not analogize well to the high-level pre-defined filters that comprise the high-level tree for auto enhance shown in FIG. 5. Each high-level filter may comprise one or more fragment programs to effect its purpose. Furthermore, when the program is optimized, it is possible for fragment programs to be replaced, re-ordered or eliminated. Lastly we see that the GPU implementation shown in FIG. 6 begins with a texture rather than an image, and ends by placing the result in a physical place (a buffer—no more place holders).

4. Set Values for a Filter.

As referenced earlier, each high-level filter, whether created as above or pre-defined as in the list herein, may have a set of input values that are necessary and defined by the filter function. In our sea shore example, we showed these input parameters as a vector "parameters (X,Y,Z,W) to represent generic inputs (see FIG. 5). Another and less generic example would be a blur filter, which would nearly certainly require the radius of a blur as an input parameter. Yet other examples are input color, input intensity, input saturation etc. (see list of filters for more examples in context). The API for Core Imaging necessarily provides programmers and programs the ability to set these input parameters, which allows the predictable creation or editing of an image Referring to our iPhoto seashore example, we were performing a blur on an area of our photo. While precise input parameters would depend upon the specific blur filter, iPhoto would most likely need to supply a radius of blur.

5. Ask for Output of a Filter.

In one embodiment, once a graph exists for a particular filter, a program or programmer may call Core Imaging for the output of that filter. In response, Core Imaging will create an object ready for just-in-time compilation and then execution typically just on the GPU. This output of the high-level filter is simply an un-calculated or representative image. In alternative embodiments, Core Imaging may either optimize the graph or calculate the image at this point. The prior embodiment is often preferred because, optimization requires processing cycles and calculation will use processing cycles and memory. These resources are usually better to preserve until we are certain that the image must be rendered to context.

Referring to our iPhoto example in the typically more preferred embodiment (saving memory and processor time), iPhoto would call Core Imaging to produce the un-calculated image, ready for just-in-time compilation and execution.

a. A Caveat to Creating the Filter Output.

Like many graphic processing engines, Core Imaging may likely be built to operate in only one color space, for example "light linear." Therefore, in order to process a graph, some embodiments must convert the color space to light linear, and before returning a result, must convert the color space back to its original color. In some embodiments, this conversion is effected on a high-level graph by placing appropriate color conversion high-level filter at the input(s) and output of the high-level graph. In other embodiments, this occurs on a low-level graph, but in a very similar fashion. In the case of the low-level graph a "kernel" or fragment program node for color conversion is placed on the input(s) and output of the graph. On most embodiments where nodes are placed into the graphs (high or low-level), the situation dictates that the result of that color conversion node is very likely to be helpful in the future. Therefore, the results of color conversion nodes should be cached in most embodiments. An alternative to creating graph nodes for color conversion is to program such conversion into one of the Core Imaging routines.

6. Render an Image to Context.

Ultimately, most images are created for visual use, such as display. Therefore, an extremely common step in this embodiment of image creation is to call for the rendering of the image into some defined context. For most embodiments, Core Imaging will perform optimization of the graph at this point. In short, optimization may involve any or all of the following: (1) producing a low-level graph, where for conceptualization purposes, nodes of the graph represent fragment programs and the low-level graph defines the relationship between images and fragment programs (this is contrasted to high-level graph that comprises images and high-level filters and their inter-relationship); (2) optimizing for domain of definition; (3) optimizing for region of interest; (4) combining fragment programs to reduce the size of the graph and ultimately the memory space that its execution will require: and (5) comparing the execution requirements of the optimized low-level graph with the resident hardware (GPU, CPU, memory etc.). Once optimized, the low-level graph is compiled and one or more executable objects are produced. As we have discussed, typically there is one executable object for the GPU, however, during optimization or compiling, it may be determined that multiple processors should be employed. After compiling the resulting objects are executed and the image is rendered to the specified context Referring again to our iPhoto example, in order to put the image on the screen, iPhoto will call Core Imaging to render the object to the screen. In a typical embodiment, this step involves the GPU code running on all the relevant pixels in the image and producing the enhanced photo image. The image may be placed on the screen by placing it in a buffer that is associated with the screen display.

E. Optimizing

Optimization is the process of analyzing and changing a program or task so that when the task is actually performed, it is performed most efficiently or easily. In the context of most embodiments discussed herein, we seek to use one microprocessor to optimize program code for another microprocessor. In yet more specific embodiments, we seek to use a system CPU resource to optimize a program to be run on the GPU. In even more specific embodiments, the CPU analyzed a graphics task (typically the application of an effect to an image) expressed as a graph, and optimizes the graph, so that when the graph is just-in-time compiled, it runs most efficiently on the GPU.

We have discussed optimization and compilation in both general and specific contexts. Without limiting the scope of the prior disclosure, we will now discuss embodiments of core imaging involving any one of four different general techniques for optimizing. Those four general techniques are: caching of intermediary results; limiting computation and storage to the domain of definition; limiting computation and storage to the region of interest; and graph re-writing to reduce or simplify the graph.

Since optimization deals with savings in real-world items like CPU cycles, GPU cycles and memory space, we will usually discuss the optimization techniques with reference to the lowest level (closest to hardware) conceptual illustration tool that we have introduced. That tool is the low-level graph. However, these techniques should not be viewed as limited to a single level of conceptualization. Indeed, these techniques may apply and realize efficiencies at higher levels and lower levels of illustrative abstraction (e.g. on higher-level graphs or on compiled code).

Figure 7:
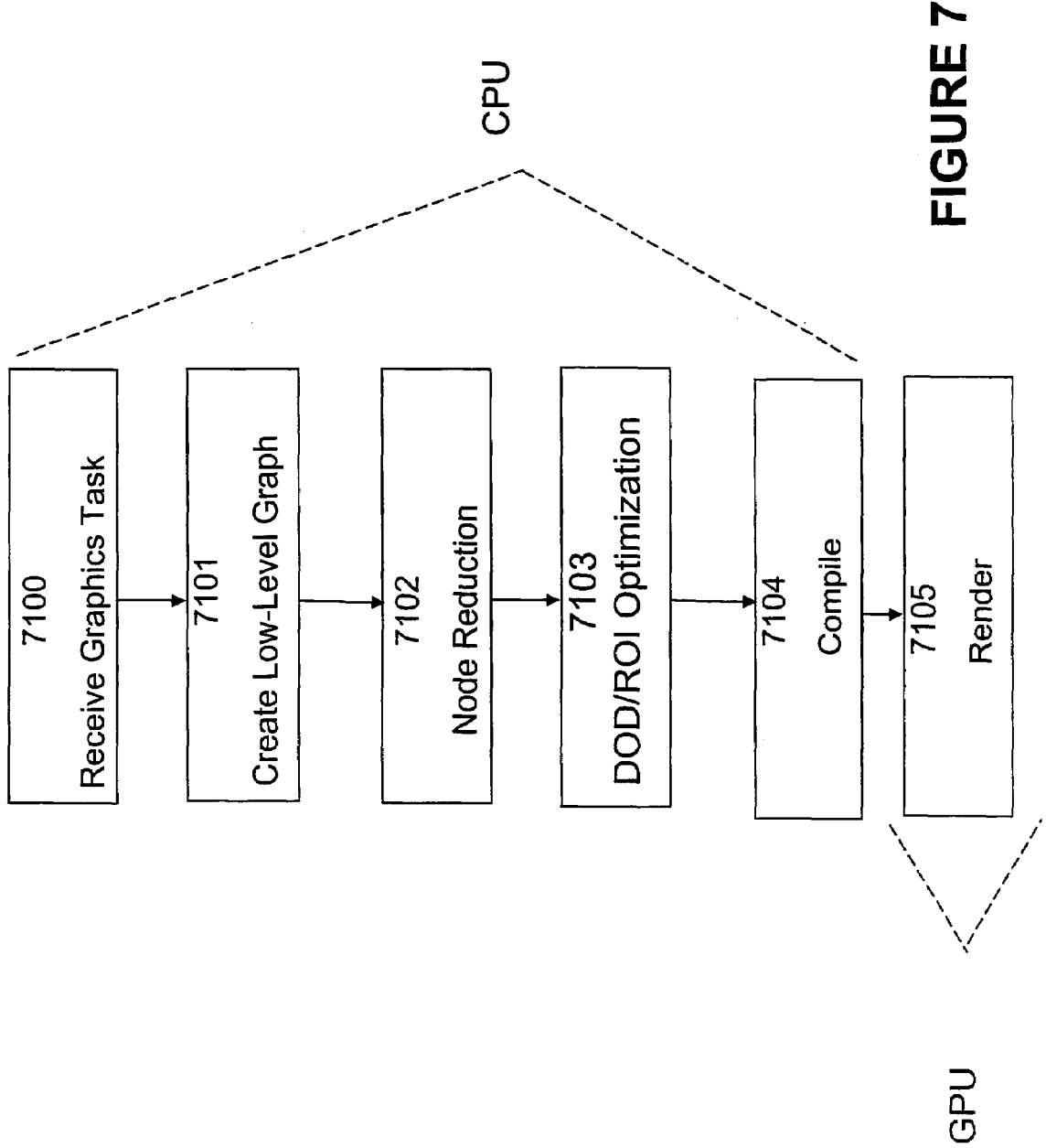
FIG. 7 is an illustrative flow chart for image creation

The disclosed optimization techniques may be useful when employed in various orders and even hybrids of order where sequential techniques are recursively applied to one node at a time or sections of a graph. However, in order to be most clearly illustrative, we introduce the techniques in a logical sequential order as shown in FIG. 7. Referring now to FIG. 7, Core imaging receives a graphics task from an application program at step 7100. To the extent that the task is not already embodied in a low-level graph, in step 7101, Core Imaging must create a low-level graph. Next, in step 7102, Core Imaging performs node reduction analysis and eliminates nodes where possible. After unnecessary (or collapsible) nodes are optimized, Core Imaging moves to step 7103 where optimization is performed to ultimately limit the size of buffers and image inputs. This step involves intersecting two regions called domain of definition ("DOD") and region of interest ("ROI"). After the ROI/DOD optimization, the graph is ready to compile in step 7104. Finally, all this prior work having been run on the CPU, the program is sent to the GPU for rendering (as we have discussed throughout, some embodiments may compile and send portions of a graph to the CPU as well).

In discussing aforementioned optimization techniques, there may be use in a deeper understanding of embodiments of the nodes in a graph. We shall illustrate with respect to nodes in the low-level graph, but the concepts apply to any similar representation. Thus far, we have discussed nodes as functions, filters and fragment programs. However, in order to effect analysis on a graph, we require a node representation with more specific and richer information. Therefore, in varying embodiments of the invention, based upon desirability or necessity, low-level graph nodes have the following associated information: (i) a program like the fragment programs that have been discussed; (ii) arguments for the program, that may comprise, samplers (images with states), and one or more vectors (recall a vector is a collection of floating point numbers); (iii) domain of definition for the output of the node; and (iv) an ROI function that provides an accurate prediction of the input shape for the node, given an output shape (both shapes defined in a coordinate system, perhaps the same global coordinate system).

1. Caching of Intermediary Results

For reasons inherent to contemporary computing, application programs will frequently request calculation of identical or similar images time after time. Application programs also often request calculation of images that are subsets or supersets of previously calculated images. For this reason, Core Imaging exploits caching techniques to prevent unnecessary work. In most embodiments, graph nodes form our basis for cache management. In particular, recall that we have discussed high-level graphs such as that which is represented by the tree in FIG. 5. We have also mentioned low-level graphs which can be conceptualized as the trees shown in FIG. 4 and FIG. 6. For some embodiments, we assume that each node in a graph is immutable and defined by the portion of the graph below it (i.e. the objects and calculations required to resolve a node). Having made that assumption, we can cache the result of a node (typically an image) and then determine if the same node (defined as the sum of the graph below it) is in queue to be re-calculated. Rather than recalculate the node, we can simply fetch the result from memory. According to varying embodiments, this may be done for all nodes. In order to use memory efficiently, we may elect to delete caches at differing times (e.g. when memory usage is high, or when cached entries are old, or when associated application programs are closed, or when system is shut down). In addition, for efficient use of memory, we may use alternative storage. In most embodiments, we primarily use static or dynamic memory allocated to the video subsystem or the GPU. However, we can choose to place these caches in any accessible storage, such as system memory, hard drives or other magnetic memory in the system or even possibly network accessible storage.

In varying embodiments, caching may be exploited during optimization (e.g. on the CPU), during rendering (e.g. on the GPU) or at both times.

2. Graph Re-writing to Reduce or Simplify the Graph

Another efficiency technique exploited in some embodiments of the invention is to optimize the graph by eliminating unnecessary nodes. When successful, this can be profound in its savings because it will generally eliminate an entire temporary image and the corresponding need for a buffer. In addition, consolidating or eliminating a node will save processing cycles during execution.

In order to consolidate, Core Imaging must find adjacent pairs of nodes that may be reduced. Generally, two nodes may be reduced into one if the output of the one node is the input of the second node. For example, if the output of node Alpha is defined as Alpha Buffer and the input of Node Beta is a texture stored in Alpha Buffer, then the two nodes may be combined.

Figure 8:
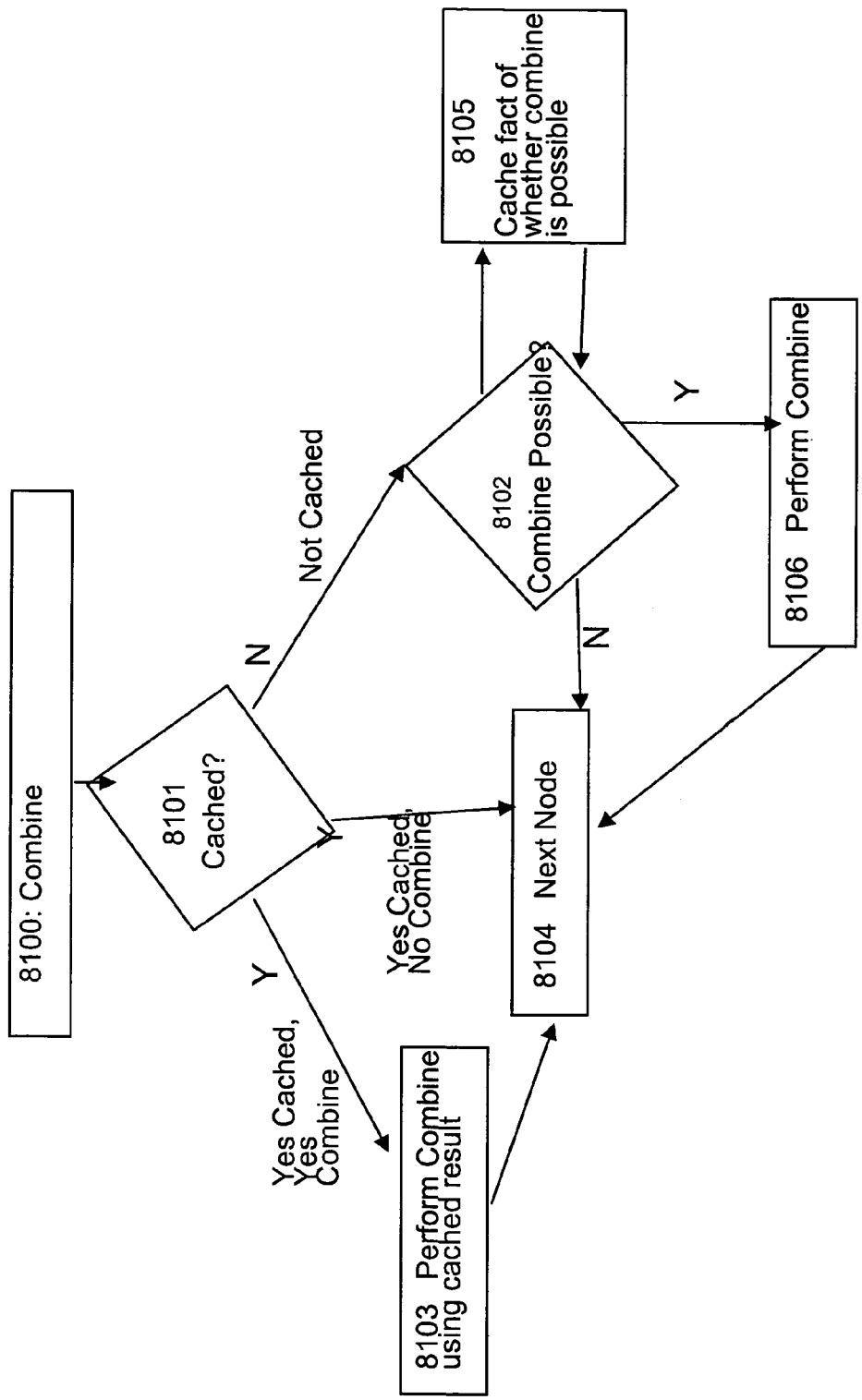
FIG. 8 is an illustriative flow chart for node combination

In terms of computational cycles, it may be a relatively expensive analysis to determine if two nodes may be combined. Therefore, when a determination is made regarding whether two nodes may be combined, that determination may be cached. To be clear, some embodiments cache both a negative and positive result so the program may use the cache not only to find a cached combination, but to determine if a combination is not possible so that time is not wasted performing the analysis. An example embodiment is shown in FIG. 8. In performing a combine inquiry 8100, the first step 8101 is to determine if a result of an analysis on these nodes has been done before and is resident in the cache. Therefore, at step 8101 the system checks cache for a pre-analyzed combine result. In addition, since the routine we are discussing typically runs on the CPU, this cache will use system memory in many embodiments. Lastly, as an example of how the cache may be tagged, in one embodiment, the cache key has four pieces of data: (1 & 2) representation of the two node programs, (3) a representation of the texture unit index in the superior node program, which will receive the output from the subservient node program; and (4) a representation of a Boolean value specifying whether the output values should be clamped to the range 0,1.

Returning to step 8101, there are three possible paths at this decision step. First, the results may be cached and the nodes may be combined. In this event, control passes to step

8103 and the combine is performed using the cached result. Control would then pass to step 8104 to find and analyze to the next node. Second, the results may be cached but the nodes may not be combined. In this case, control goes directly to next node step 8104. Third, finally, the results may not be in the cache. In this case control passes to step 8102 to determine if a combination of the proposed nodes is possible. As indicated by step 8105, whether or not the combination is possible, the result is cached (indicating either combination is not possible or combination is possible and storing the result). At step 8012, if combination is possible, it is performed in step 8106, although in practice some embodiments will perform combination during analysis. After combination is performed control passes to 8104 for the next node. Finally if step 8102 determines that combination is not possible, then control passes to step 8104 for the next node.

3. An Embodiment for Combining Two Nodes

Figure 9:
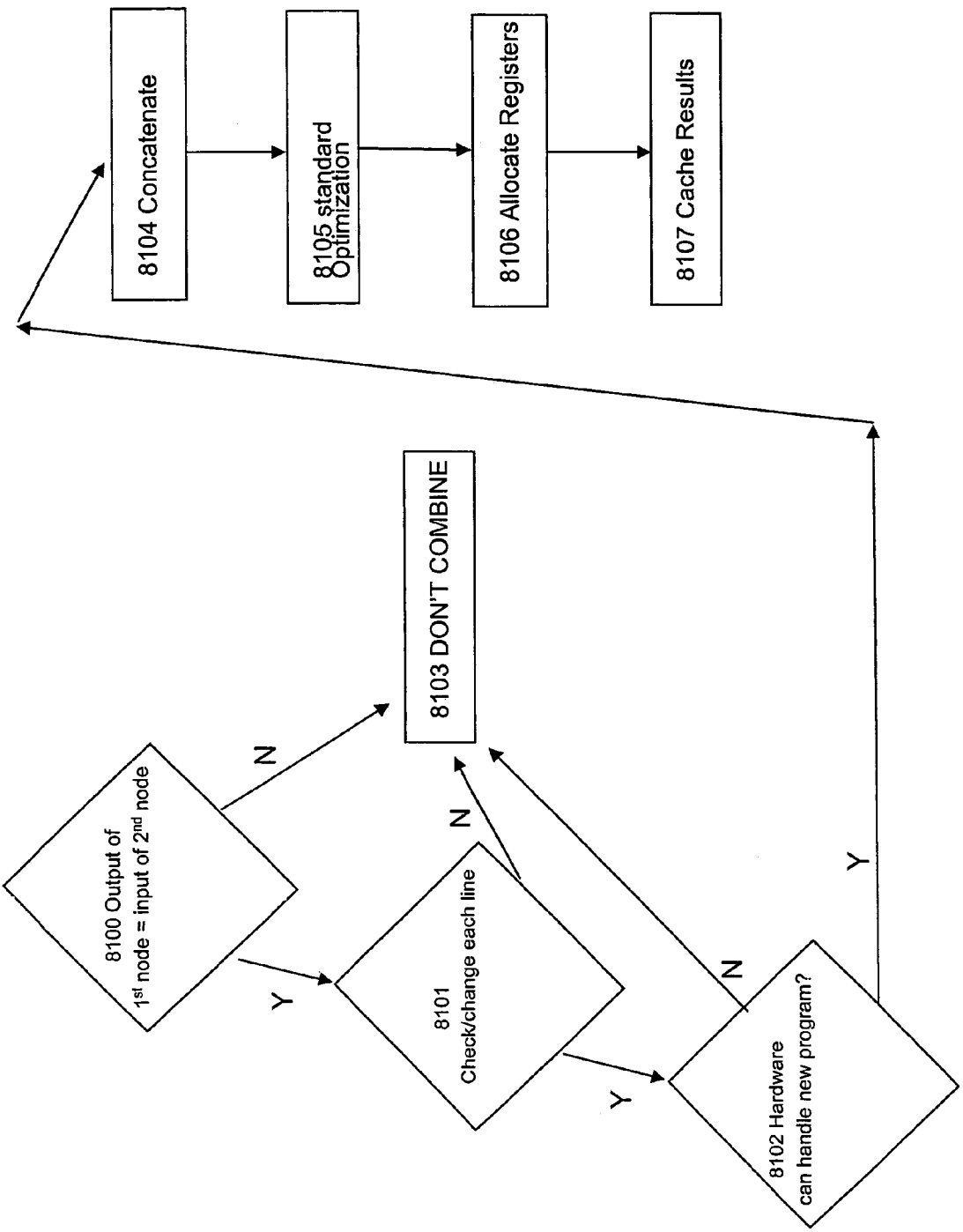
FIG. 9 is an illustrative flow chart for node combination

Referring to FIG. 4 and FIG. 9, assume that Core Imaging will analyze whether nodes 415 and 420 may be combined. Beginning at step 9100, in most embodiments, Core Imaging will attempt to combine these nodes if the output of node 415 is the close enough in nature to the input of node 420. In many embodiments, the output of node 415 must be the same as the input of node 420 in that the output buffer must be the place in which the input texture resides. However, in other embodiments, Core Imaging may evaluate whether such output and input are sufficiently similar to yield a correct result, or in yet other embodiments, a close-to-correct result.

Returning to decision 9100, if the respective output and input are not sufficiently similar, then the nodes may not be combined as indicated in step 9103. However, if the respective output and input are sufficiently similar, then control moves to step 9101 to check each line of the fragment program associated with the second node (in this example, node 420). We will discuss line checking later but, for this level of process, we assume that each line is checked to see that it does not negate the possibility of combining nodes 415 and 420. In addition, minor changes are made in certain lines to facilitate combination. Therefore, if the line check at step 9101 results in negating a node combination, then the nodes 415 and 420 will not be combined as indicated in stem 9103. Alternatively, if the line check at step 9101 indicates a continued possibility for a node combination, then control moves to decision step 9102 where it is determined whether the hardware can handle the combined nodes. In a general sense, this may refer to any hardware limitation in the system, such as memory, the nature of any microprocessor or the system status. In a more particular sense, most embodiments need only check the capabilities of the resident GPU to see if the are too many look-ups or registers required. Clearly, (unless emulation is used) if step 9102 determines that the resident hardware can not process a combination of nodes 415 and 420, then the combination can not be made as indicated in step 9103. Alternatively, if step 9102 determines that the hardware can handle the combined nodes then control passes to step 9104 where a series of tasks begins to finalize the combination of the nodes.

In step 9104 the program code for the nodes is actually concatenated. In step 9105, a standard pre-compiler optimizer program is applied. This is not the optimization that is the subject of some embodiments to this invention. Rather, this is a readily available pre-compile optimization routine. Next, in step 9106, instructions are applied to allocate registers. Finally, in step 9107 the results are cached for future combination analysis.

Figure 10:
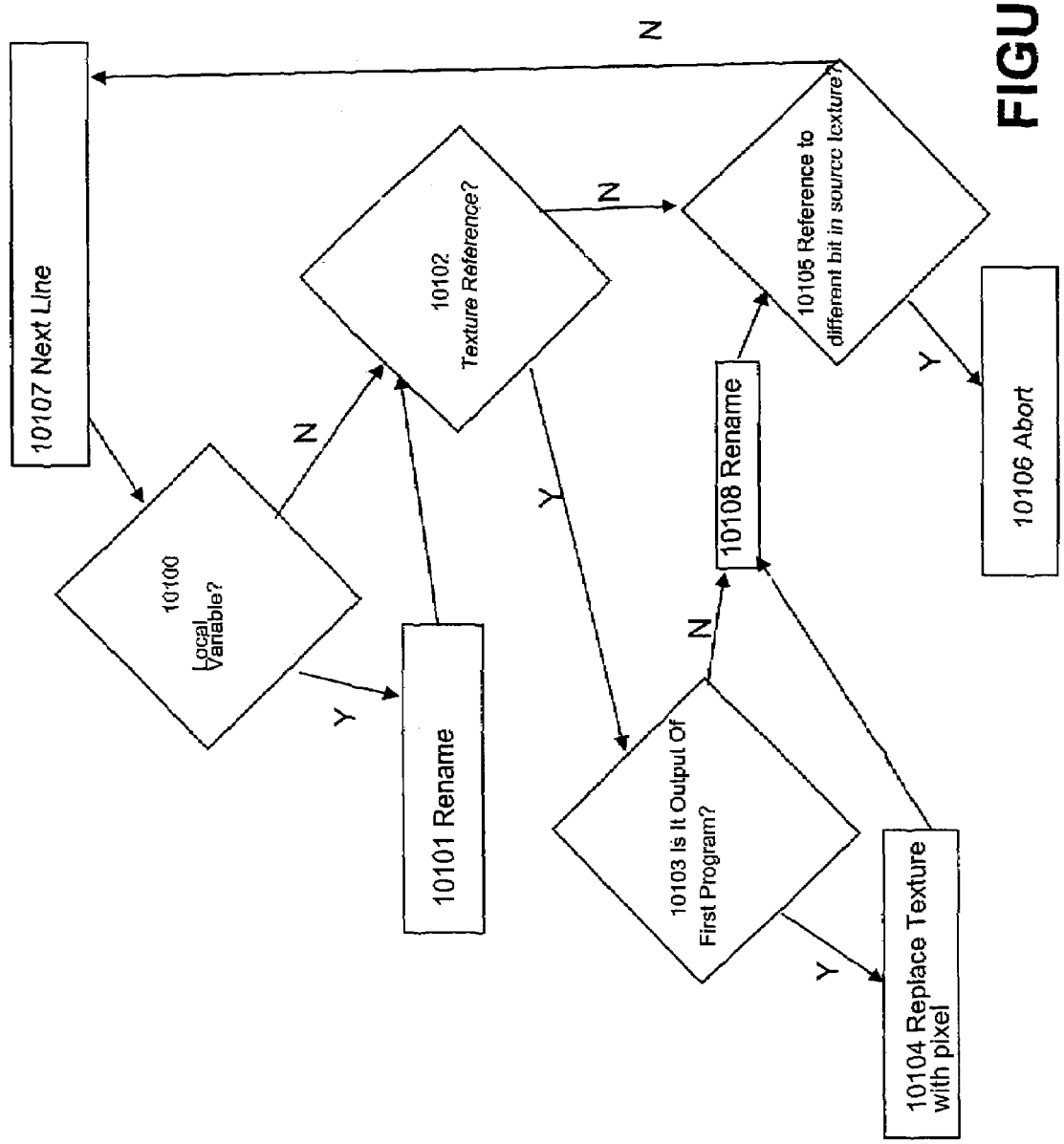
FIG. 10 is an illustrative flow chart for node combination

In discussing this example, there has been only minor attention paid to step 9101, which is the checking of each line in the second program. Referring now to FIG. 10, we shall explore that process in greater detail. At step 10107, Core Imaging seeks the next program line for analysis. The next line may be the first line of the program representing the second node 420. Control moves to decision step 10100 where Core Imaging determines if there are local variables in the program line. If there are such local variables, then control moves to step 10101 because such local variables must be renamed so they do not conflict with the local variable in the first program (that program representing node 415 in this example). In some embodiments, all local variables are numbered with sequential integers starting from zero in each fragment program. Therefore, in renaming local variables in the second fragment program (that representing node 420), (1) the first new name is derived by simply adding to the highest numbered local variable in the first program; and (2) subsequent local variables are named sequentially using the first re-named local variable as a base name.

Once the local variables in a program line are renamed, control moves to decision step 10102 where Core Imaging looks for texture references in the program line. It is noteworthy that, decision step 10100 also leads to step 10102 if there were no local variables requiring renaming. In either case the, at decision step 10102, Core Imaging looks for any texture references in the program line. If no texture reference is found, then control moves to decision step 10105. If a texture reference is found, control moves to step 10103 to see if the found texture reference is a product of the first node's (415's) processing. If the found texture reference is not a product of the first node's processing, then control moves to step 10108, to rename the texture if necessary.

Assuming that the found texture is a product of the first node's processing, then control passes from step 10103 to step 10104 to replace that texture with a single pixel. In a general sense, we replace a texture with a single pixel because, while fragment programs have whole textures for inputs and whole buffers for outputs, the fragment programs process only one pixel at a time. Therefore, if Core Imaging will combine or concatenate two fragment programs, those programs must be re-written to pass the same pixel through the entire extended length of the combined programs—there can not be an intermediate buffer created by a single (combined or otherwise) fragment program. As a consequence, in some embodiments, step 10104 involves eliminating any reference to the subject input texture and replacing it with a register reference that will hold the pixel under operation. After step 10104 is complete, control passes to step 10108 to rename the texture if necessary.

Texture renaming is the same principle and process as local variable renaming so no further comment is needed on substance. After texture renaming occurs, control move to decision step 10105.

At decision step 10105, Core Imaging checks for any reference to a pixel in the input texture that is identified by a register. To elaborate on this step, assume that the input texture to the second node (420) was texture Alpha. Assume also, that texture Alpha has been written out of the program in favor of a pixel in register Beta. At step 10105, Core Imaging is looking for any reference to a pixel of texture Alpha, other than the pixel stored in register beta. This is because, the combination of two fragment programs will eliminate the creation of texture Alpha (an intermediary image), and, at runtime, the system's only reference to texture Alpha will be the single pixel in register beta. Therefore, if the program underlying the second node (420) has substantive reference to pixel other than the pixel in register beta, then the combination can not happen and must abort as shown in step 10106. If there is no reference to such a pixel, then program control moves to step 10107, to move to the next line.

In reviewing the program steps described here, it should be noted that there are many ways to process lines of code with the functions and changes described. For example, the program may look at one item at a time in each line and process through all options for a particular item before moving to the next item in the same line until a single line is finished. For another example, the program may read a first item and: check if it's a local variable and if so rename it; check if it's a texture reference and if so, check if the reference is to the output of the first program and so on. The point is that given the disclosed technique, a skilled programmer can decide how to proceed through the analysis and line checking.

4. Limiting Computation and Storage to the Domain of Definition

In a general sense, images are not bounded by anything other than the coordinate system in which they exist. For most coordinate systems, this "boundary" does not apply useful limitation. Therefore, when considering an image, we may consider it's domain of definition. The domain of definition of an image is a representation of all places in which the image is defined (thus the name "domain of definition"). A practical way to think about domain of definition is as a representation of all places in an image that are explicitly defined and not transparent. One example of a domain of definition is the geometric shape in which all non-transparent pixels lie.

In developing optimization techniques, the domain of definition ("DOD") is interesting because there is no need to compute or draw pixels outside the DOD. Therefore, in optimizing a graph, there is use in first calculating the DOD of the root node (the very highest node, for example node 415 of FIG. 4). Once you have the DOD of the root node, you may intersect that shape with the substantive result of the node and eliminate from the rendering and drawing task all portions of the substantive result that reside outside of the DOD. Unfortunately, the DOD of a node is not always available, and when such is the case, the DOD must be considered infinite.

In a general sense, the DOD of the root node is calculated by propagating from the bottom of the graph upward. Referring to FIG. 4, we calculate the DOD of root node 415 by starting with the leaf nodes 424, 425, 426, 427, 428 and 429. Since leaf nodes represent images that have been already defined, they may have a DOD without reference to a lower node (as a practical matter, a leaf node is usually a read command in the graph). The DOD of the higher level nodes is calculated using the inputs to the node and the function the node performs. In practice of some embodiments, each node type in a system has a function call to determine its DOD in view of its possible inputs (this is one way of viewing the earlier statement that a node may include its output DOD). In alternative embodiments, the optimizing program calculates the DOD itself, during optimization. In yet another embodiment, the DOD for some nodes is calculated directly during optimization and other nodes are calculated indirectly by calling a function. For example, one embodiment may directly calculate DOD for easy nodes (those where the input and output shapes are the same) and make function calls for difficult nodes (those where the input to output shape changes). For illustration, we shall very briefly review calculation of DODs.

This calculation of DODs varies slightly depending upon the type of node being analyzed. For example, if the function of node 418 is simply a color conversion, then the DOD of node 417 will be the same as DOD of leaf node 424. This same example applies to all operations that do not change the shape of the input image DOD (i.e. range alterations, color space conversions and image tints). However, some nodes may be more complex to calculate because they either have multiple inputs or because the function changes the shape of the input node's DOD (e.g. a geometric change). Looking at the multiple node issue first, assume we wish to calculate the DOD for node 416, already having the DODs for nodes 417, 418 and 419. The DOD for node 416 is a simple function of the input nodes' DODs and is commonly either the union or the intersection of the input nodes' DODs. Whether the result DOD is the intersection, union, or some slightly more complex function is dependent on the function of the node and is easy for any programmer to assess.

In calculating DODs, Changes in image shape caused by the function demand more consideration. These types of functions include, without limitation, items like blurs where the image changes shape due to the pure operation of the function (like a blur or a scale operation—typically a blur will make an image bigger). Alternatively, the function may simply re-orient the image (rotate, offset etc.), which operation may change the location in the coordinate system. In either case, most embodiments will require a function to call the DOD for an output based upon any possible inputs. Any skilled programmer can write such functions.

Finally, recall that some nodes will not have defined DOD. In those cases, most embodiments will assign infinite as the value of the DOD.

5. Limiting Computation and Storage to the Region of Interest

Having the DOD for nodes, we can now determine the region of interest ("ROI") for associated nodes. In summary, the region of interest is the portion of the input image that is necessary to compute the given output DOD. Therefore, while each node has a DOD on its output, it has an ROI for EACH input (in viewing a graph, you can conceptualize this as an ROI for every link). As an example of an ROI, assume a node function that is a blur, with an input image that is "Large Rectangle" and an output DOD that is "Small Rectangle." The ROI function for this blur will return a shape that defines what portion of the input image "Large Rectangle" is relevant for calculating the portion of the blur result in the output DOD. The value of understanding this ROI region is that we only need to store the relevant portion of the input image, so we save memory for storing intermediary results (and some on the ultimate result as well), and processing time applying effects to pixels that may ultimately be irrelevant. For example, the buffer that would occur at link 46 need only store the relevant result, which is the intersection of the output DOD of node 24 and the ROI of node 17—such intersection being an optimized result region.

Like DOD calculations, in practice of some embodiments, a function is used to determine the ROI of a node. Also, like DODs, some ROIs are easy to determine in that they are simply identical to a value found on a link across a node. For example, if link 45 has an ROI of "Alpha" and node 417 is a color conversion, then the ROI for link 46 is also Alpha, However, if node 417 is a blur, then determining the ROI for link 46 is more difficult (it is very likely different from Alpha and probably smaller). In some embodiments, a function associated with the node will be called to resolve a hard-to-determine ROI. In alternative embodiments, the optimizing routine calculates the ROIs itself, during optimization. In yet another embodiment, the ROIs for some links are calculated directly during optimization and other links are calculated indirectly by calling a function. For example, one embodiment may directly calculate ROIs for easy links (those where the input and output shapes are the same) and make function calls for difficult links (those where the output shape is different than the input shape). For illustration, we shall very briefly discuss calculation of ROIs Like DOD calculations, ROI calculations must be propagated through the graph tree, although as implied above from the root down (not from the leaves up, like DODs). When Core Imaging is asked to perform a graphics task, the asking entity provides an ROI for the output, so we can assume that the root node (e.g. 415) is known. To determine the other ROIs we simply propagate backward through the graph tree. For example, to calculate the ROI for input/link 43, we consider the "known" ROI at the result and the function of 415.

6. ROI and DOD Example Embodiments

Figure 11:
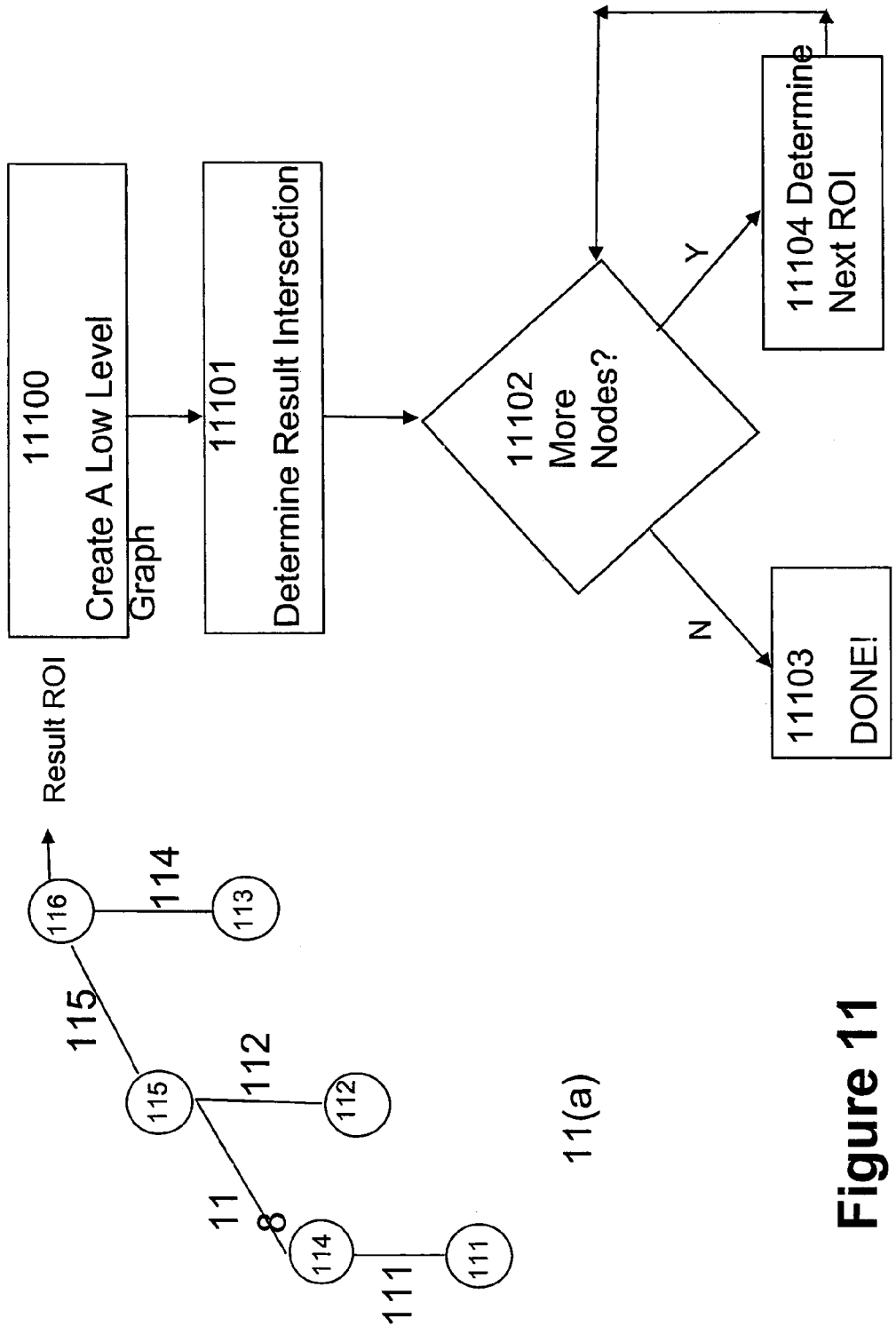
FIG. 11(a) is a graph
FIG. 11(b) is an illustrative flow chart for graph optimization

As discussed earlier, application programs will construct high-level graphs using the Core Imaging API. Either using one of those graphs, or by other means, a programmer of application program will submit a graphics task to Core Imaging. Referring to FIG. 11(*a*), assume that task is to draw Result ROI. Referring to FIG. 11(*b*), the first task for Core Imaging is to create a low-level graph, step 11100. While there is more involved in creating the low-level graph (shown as a tree in 11(*a*)), for purposes of this example, it is only important to know that output DODs, including the global DOD (DOD of the root node 116) will be calculated and represented in the nodes at the end of this step 11100. Next, in step 11101, Core Imaging finds the intersection of the Global DOD and Result ROI. For convenience we shall call this "Result Intersection."

Core Imaging then continues to decision step 11102 to determine if there are more nodes to examine. This determination 11102 may be made in any suitable manner that will be clear to a skilled programmer. If there are no further nodes to examine, then the program is finished with this optimization task in step 11103, and is ready for just-in-time compiling. Returning to "More Nodes?" decision 11102, if there are more nodes to optimize, Core Imaging will determine the ROIs for the inputs of the next node. There are a variety of well know ways to determine which node is next in walking a tree, so we will not discuss that topic here.

For purposes of our FIG. 11 example, we remain at node 116 and step 11104 with the task of calculating the input ROIs for node 116—the root node. As discussed earlier, this might be determined directly or by calling a function. In either event the ROIs for links 114 and 115 are determined and inserted in the graph.

After ROIs are determined for node 116 inputs, Core Imaging returns to decision 11102 to answer the query "More Nodes?" There are more nodes in this case, the Core imaging moves to step 11104 to determine the Input ROI of node 115. Note that since Node 113 is a leaf node and has no inputs, there is no ROI calculation for node 113. Therefore, the input ROIs are determined for links 118 and 112 and inserted in the graph.

Core Imaging returns to step 11102 and determines there are more nodes so moves on to step 11104 again to determine the ROI for node 114. Note again that 112 is a leaf node, so no calculation is necessary. The ROI for 111 is determined and entered in the graph.

Control returns to decision node 11102 and determines there are no more nodes (node 111 is a leaf). Core Imaging moves on to step 11103, Done!

The Graph is now optimized for ROI and DOD, but other optimizations, such as node consolidation and caching, may be layered on this or could have been performed simultaneously.

7. Recursive Execution Embodiments

As mentioned earlier, programmers may find efficiency in organizing the optimization techniques in various orders. However, some embodiments of the current invention practice one or more of the techniques in defined sequences across only portions of a graph. In particular, the same (or a similar) program sequence may be applied recursively to a portion of the graph, one portion at a time. This method allows for efficiency gains by providing opportunities for memory re-use and sequential processing (to some extent). For simplicity, the concept of caching is largely omitted from the discussion of these embodiments. However, given the disclosure herein, one skilled in the art will understand where caching steps should be implemented.

Figure 12:
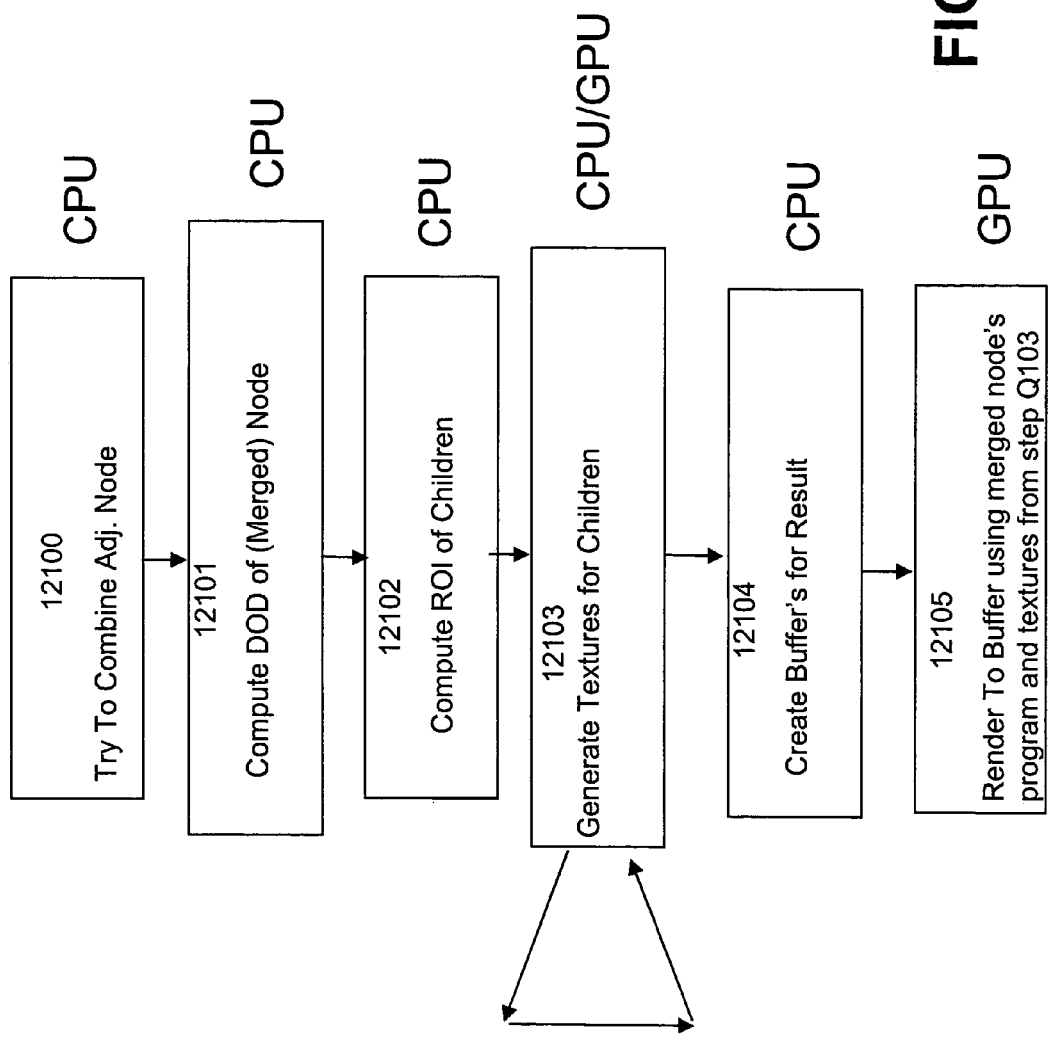
FIG. 12 is an illustrative flow chart for graph optimization

For illustration, refer to FIG. 12 where a flow chart is shown for a recursive execution embodiment of the invention to arrive at a result. Stated alternatively, the purpose of the example is to calculate the root node. At step 12100, Core Imaging attempts to combine the root node with adjacent nodes. If nodes may be combined, that process is executed possibly absorbing multiple nodes along each input link to the root node. Control moves to step 12101, where Core Imaging determines the DOD for the (possibly merged) root node. Once DOD is known, control passes to step 12102 where ROI is computed for the children links to the root node. Having ROI and DOD, the two may be intersected to determine the result region. Control passes to step 12104 now to generate textures for the inputs of the root node. These input textures are necessary in order to render the root node. Many times, however, the input textures of the node will be un-calculated and represented only by a graph. In those cases, Core Imaging may need to recursively process, on each subservient node, similar steps to those described in this example. Therefore, the process illustrated in FIG. 12 may be applied in nested fashion to move down a graph and resolve nodes that are ultimately necessary to resolve in order to calculate the root node. Alternatively stated, the process for resolving a node is applied in nested fashion until control resolves all nodes necessary to compute the textures for the inputs to the root node. After the root node input textures are calculated, control moves to step 12104 for creation of a buffer for the result. Finally, control moves to step 12105 where the GPU is used to render the result to the buffer created in step 12104.

It should be understood that the notion of caching was intentionally omitted from the prior illustration in order to focus on the recursive process. However, caching may be employed in a variety of places, including without limitation for node results and node-combination analysis and results.

Figure 13:
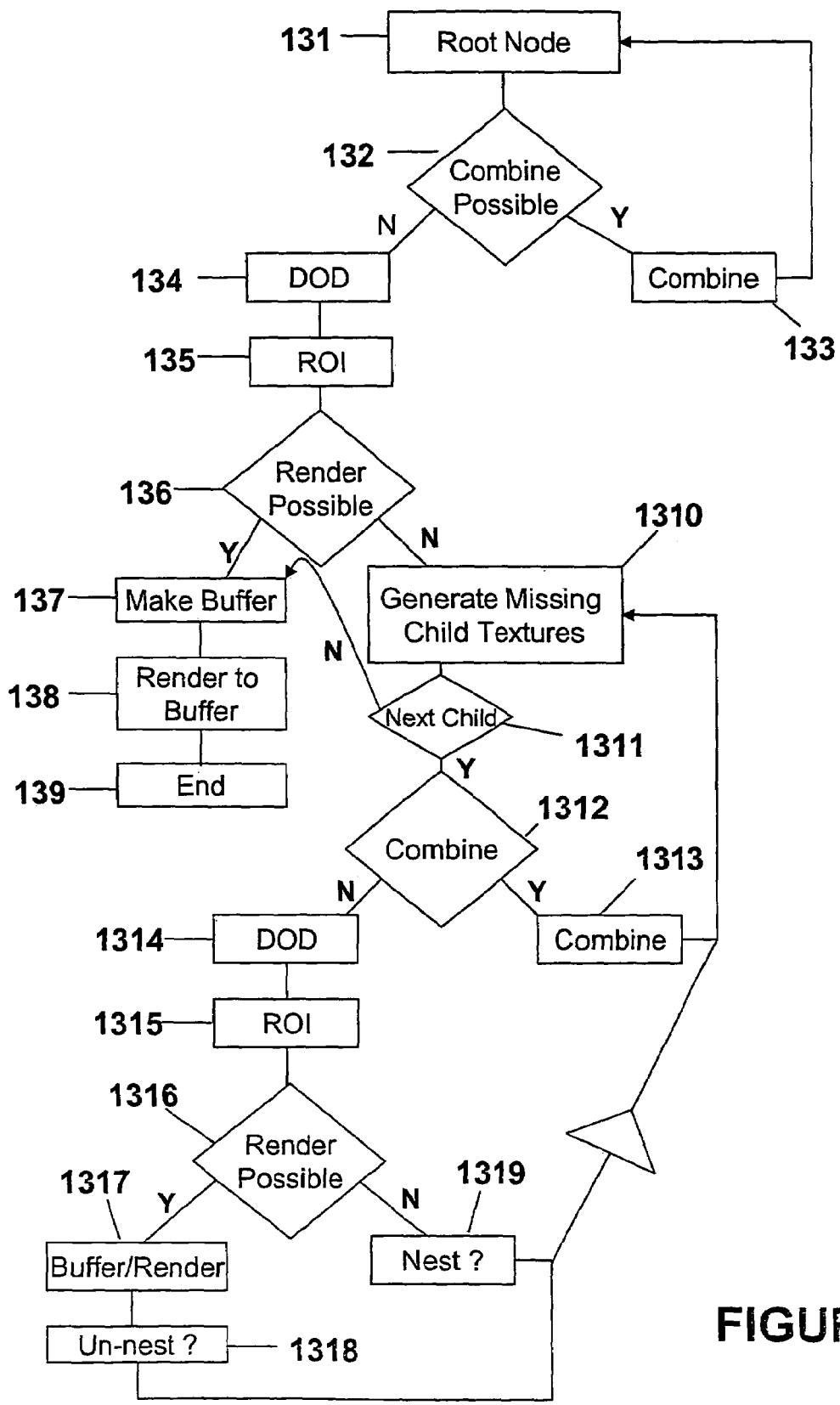
FIG. 13 is an illustrative flow chart for optimizing

Yet another recursively processed embodiment is shown by the flow chart in FIG. 13. Referring then to FIG. 13, step 131 indicates that we are attempting to compute the root node. In doing so, step 132 determines if it is possible to combine the root node with and adjacent node. According to step 133, if combination is possible, the combination is performed and combinations continue to occur (through steps 131, 132 and 133) until it is determined that no further combinations are possible. After such determination, control passes to steps 134 and 135 for DOD and ROI optimization. Next, decision step 136 determines if it is now possible to render the root node. It will only be possible to render the root node if all the inputs to the root node are calculated. Therefore, assuming the answer to decision 136 is no, control passes to step 1310 for the task of generating the missing child textures that are necessary for resolving the root node. It is noteworthy here that the ensuing process under 1310 is very similar to the overall process for resolving the root node. In particular, the same routines are used to resolve sub-nodes and root nodes. However, those routines may be called in nested fashion to resolve multiple nodes in a graph. Alternatively, those routines may be run in parallel to resolve several nodes at once, even nodes in non-related graphs Returning now to step 1311, the next child node must be determined, which is simply appropriately choosing the next node to analyze. Steps 1312 and 1313 analogize to steps 132 and 133. Steps 1314, 1315 and 1316 analogize to steps 134, 135 and 136. Step 1317 analogizes (for brevity) to steps 137 and 138. Step 1319 indicates that when a sub-node may not be rendered due to the unavailability of its input textures, that the next node (step 1311) will likely be calculated in a nested computation. Similarly, step 1318 indicates the likelihood of un-nesting a level after a node has been resolved and rendered.

Ultimately, at step 1311, if there are no more children to resolve, control may pass to steps 137 and 138 where a buffer is made for the result of the root node and the root node is rendered to context.

Figure 14:
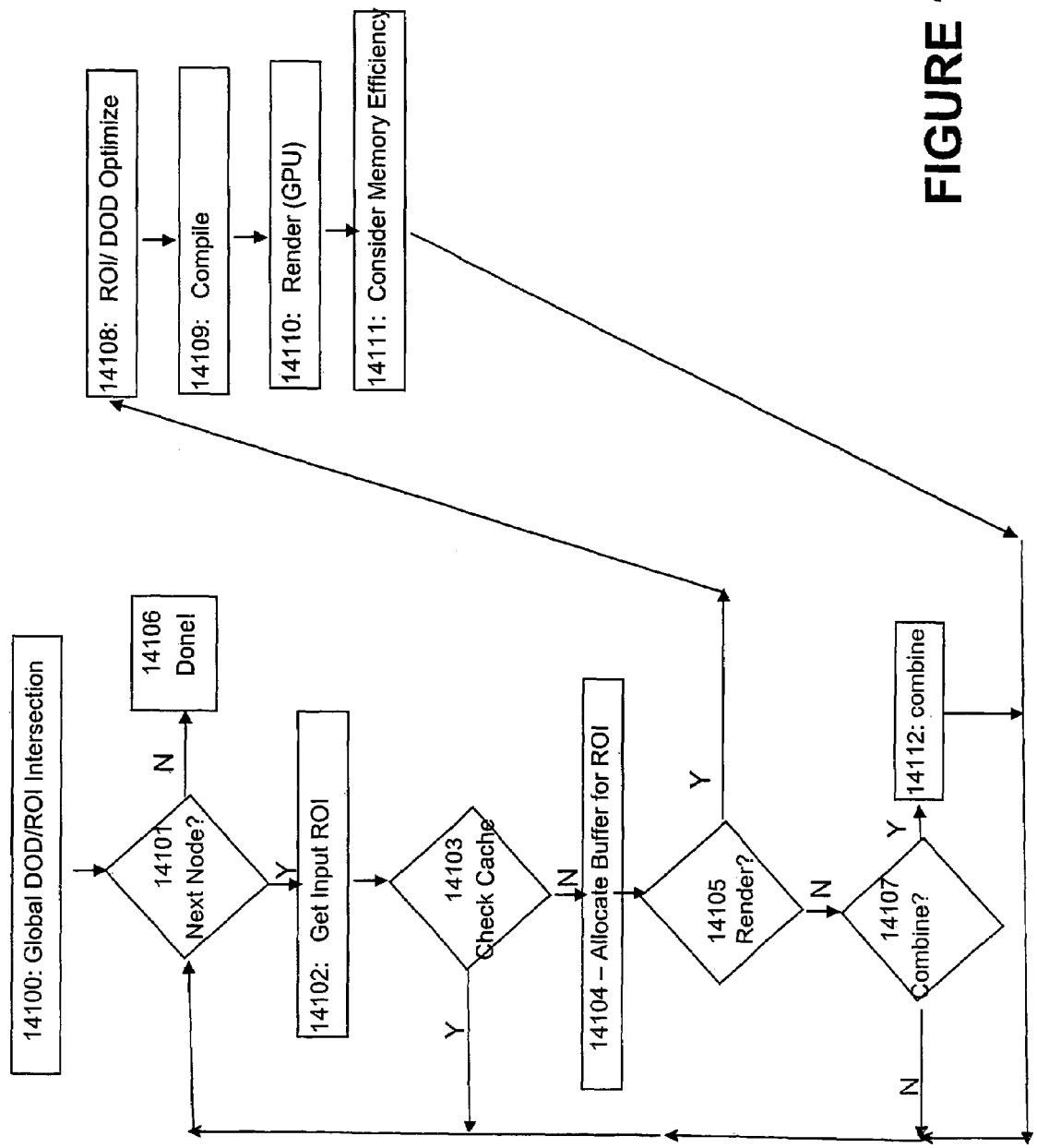
FIG. 14 is an illustrative flow chart for graph optimization

For yet another alternative embodiment or recursive operation, refer to FIGS. 4 and 14, and assume the graph shown in FIG. 4 must be optimized and rendered by Core imagine. Starting at the root node 415, Core Imaging may begin at step 14100 by calculating the global ROI intersection with the Global DOD. Control moves to Step 14101 to determine if there is a next node. If there is no next node, then processing is done as indicated in step 14106. However, in this case, the root node 415 is the next node. Control passes to step 14102 to get the input ROI for node 415 on input link 42. Having obtained such input ROI, control passes to decision 14103 to determine if the result of 415/ROI is in cache. If the 415/ROI image is in cache, control passes back to decision block 14101 to check if there are further nodes to process (recall that if that result is found in cache system needn't process the entire graph below the found node). In this case, assume that the result of 415/ROI was not in cache so control passes to buffer allocation step 14104. At this step, a buffer is defined and may be allocated for the size of 415 input ROI. Control then passes to decision step 14105 to determine if the node (415) may be rendered at this time. In practice this may be a command to render node 415 into the buffer that was just previously defined.

As we see from FIG. 4, node 415 is the root node and is not ready to render. We will deal later with the Y decision on step 14105. Since node 415 is not ready to render, control passes to step 14107 to determine if the next adjacent node may be collapsed into node 415. At the step, the system must determine if node 415 may be collapsed into the next adjacent node (as discussed in greater detail earlier). As discussed elsewhere herein, the combine decision and operation may involve a second caching system whereby the system can lookup whether two nodes may be collapsed and, if so, the result of the collapse.

Returning to the decision at step 14107, if 415 may be combined with and adjacent node, then control moves to step 14112 and the combination is effected. Control then passes back to node 14101, where the next node for analysis is the newly created 415. If step 14107 determines that a combination is not possible, then control passes back to decision step 14101 to determine the next node for analysis. In the practice of some embodiments, a "NO" at step 14107, leaves node 415 un-resolved and the return to step 14101 runs the routine on the next node in a nested fashion. The nesting may go infinitely deep and will ultimately resolve by de-nesting (one nest at a time) at the next node step 14101.

Returning now to step 14101, we determine that the next node is 420, so control proceeds to step 14102 to retrieve or calculate the input ROI for Node 420. Once ROI is determined, control passes to decision node 14103 where the 420/ROI combination is checked in the cache. Assuming there is a cache miss, control passes to step 14104 and a buffer is allocated. Control then passes to step 14105 for the decision if render is possible (again, in practice this may simply be an attempt to render 420). FIG. 4 tells us that node 420 can not render, so control passes to step 14107 for a determination regarding the possibility of collapsing a node. Assume that determination is also negative, and control returns to step 14101 (in some embodiments for a second nest of the routine).

At 14101, next node is determined to be node 422. The input ROI is determined at step 14102 and control moves to the cache check at step 14103. Now assume that we have a cache hit so that node 422 and all below it is resolved and stored. Control then moves back to step 14101 where the next node becomes node 421 (node 420 remains unable to render because of the small portion of the tree following link 49). With respect to 421, input ROI is determined at step 14102 and we shall assume a cache miss at decision 14103. At step 14104 we define a buffer for the 421 ROI and at step 14105 will find that node 421 may be rendered (nodes 427 and 428 are tree leaves or input images so they do not prevent rendering of node 421).

In view of the ability to render node 421, control passes to step 14108 for ROI/DOD optimization. Here we intersect the output DOD of node 421 with the input ROI of node 20 to minimize the size of our ultimate buffer that will be written during rendering. In some embodiments will adjust the buffer settings made in step 104. Node 421 is then passes to the compiler (step 14109) and the compiled result is rendered (step 14110). After rendering (or at some points in this process), many embodiments will re-consider memory usage caused by buffers and whether that space may be set free or re-used. We represent this consideration in step 14111.

Control now returns to step 14101, where it will ultimately be determined that node 420 is ready to render (step 14105). Rendering will occur as previously described and control will ultimately pass back to step 14101 for consideration of node 410. If we assume that the node 410/ROI is cached, then rendering will ultimately occur on our result node 415.

F. Simple Code Examples

For illustration the following is an example in code showing how Core Imaging API may be used for a simple exposure filter:

```
CIImage *image, *result;
CIFilter *bright;
CIContext *context;
CGImageRef cgImage;
context = [CIContext contextWithCGLContext: someGLContext];
image = [CIImage imageFromCGImage: someCGImage];
bright = [CIFilter filterWithName:@"CIExposureFilter"];
// filter parameters set via key/value coding
[bright setValue: image forKey: @"inputImage"];
[bright setValue: [NSNumber numberWithFloat: -2.0] forKey:
@"inputExposure"];
result = [bright outputImage]; // result is still just a "promise"
[context render: result]; // forces evaluation
```

Also for illustration, the following is an example of combining fragments according to an embodiment of the invention.

```
program 1:
MOV r0, program.local[0];                    -- r0 = local variable 0
MUL r1, r0, program.local[1];                -- r1 = r0 * local
                                                variable 1
MOV result.color, r1;                        -- output pixel is r1
program 2:
MOV r0, program.local[0];
TEX r1, fragment.texcoord[0], texture[0], RECT;  -- r1 = sample (texture
0, coord 0)
MUL r2, r0, r1;                              -- r2 = r0 * r1
MOV result.color, r2;
combined program:
MOV r0, program.local[0];
MUL r1, r0, program.local[1];
MOV r256, r1;                                -- save output pixel
MOV r0, program.local[2];
MOV r1, r256;                                -- replace texture
                                                lookup by
                                                previous output
MUL r2, r0, r1;
MOV result.color, r2;
```

G. Core Imaging Producing CPU and GPU Code

In compiling high-level filter combinations, Core Imaging may yield multiple objects for execution during rendering. This feature of Core Imaging may be widely applicable to systems with multiple heterogeneous processors. For example, it may be useful to perform just-in-time compilation to divide a weather forecast calculation being performed on an operating aircraft. Just-in-time compilation allows an efficiency algorithm to account for the status of the aircraft (flying) when determining which processing resources to use. This general process may be summarized in seven steps although an effective system could operate on a subset of these steps: (1) check which resources are available for employment, such as processors, controllers and memory spaces; (2) evaluate the capabilities of each of the resources: (3) check the operating status of each resource; (4) evaluate the requirements of the current task; (5) analyze the requirements of the task with respect to some or all of the available resources; (6) optimize and compile the software to meet the requirements of the task while increasing the overall efficiency of hardware usage in the system (generally reducing the resources used by the task, but perhaps using under utilized or otherwise un-used resources): and (7) execute the compiled code. It is noteworthy that, depending upon the embodiment, steps one through five may occur at execution time or before, while steps six and seven may be most useful in the process if occurring at or near execution time.

There are virtually infinite applications for this process (whole or truncated) that can consider hardware capabilities, the nature and difficulty of the task and real-time status in determining an efficient division of work. Notwithstanding those virtually infinite applications, there are three common reasons that Core Imaging will produce CPU code. One of those is for emulating a GPU on the CPU and that is discussed later. The second reason is for strict efficiency by using the CPU to do offline rendering. The final reason is for absolute necessity, such as when the task exceeds the hardware ability of the GPU (this is also discussed some in a later place).

Given that the first and third reasons are discussed elsewhere, we briefly discuss the second reason here by providing an example. A central benefit to multiple processors is the ability to work in parallel. When the application program presents tasks requiring serial application of filtering routines, parallelism is most easily established. By example, referring to FIG. 15(a), there is a chart show the timing of a CPU and GPU working serially on a 6 frame sequence. For purposes of this example, there are two effects being sequentially applied to each frame, the CPU applied the first effect and the GPU applies the second effect. The GPU starts frame one while the GPU is idle or working on something else. After the first effect is applied to frame 1, the frame is passed to the GPU to apply the second effect. While the GPU applies the second effect to frame 1, the CPU is applying the first effect to frame 2. The process continues (shown in chart 15(a)) so that simple parallelism is used to very efficiently exploit hardware and quickly apply two effects to a stream. Referring to FIGS. 15(b) and 15(c), there are shown similar charts conveying the efficiency of applying four effects either with four processors (FIG. 15(b)) or two processors (FIG. 15(c)). It is noteworthy that the nesting in FIG. 15(c) can be arranged in many ways and applied to any number of processors with any number of effects. The efficiency is realized through serializing the application of effects. The efficiency can be further enhanced if the work required for each effect is optimally suited for the processor performing the task. For example, in FIG. 15(a), if the CPU were better suited for applying the second effect, then the order of frame processing between the CPU and GPU would be reversed.

H. Emulation: Core Imaging Producing CPU Code

As previously discussed, during the past several years flexible graphics-related hardware and software technologies have evolved and provided basis for even more useful technologies such as many embodiments of this invention. In particular, the advent of technologies such as OpenGL and programmable GPUs have provided tools for many of the innovations described herein. However, these tools are not necessarily backward compatible, in that all of Core Imaging's functionality may not be able to run on every platform for lack of an enabling infrastructure (e.g. a programmable GPU). Therefore, if there are programmers or programs that rely on Core Imaging's services, those programmers or programs may be compromised on a particular platform if some or all of Core Imaging's services are unavailable.

As a practical example, if one designs an operating system to provide functions like that of Core Imaging, then presumably applications will be designed to make high-level graphics calls like those described in many of the embodiments herein. However, a problem arises when you envision the attempt to run those applications on older computers, even assuming a new operating system has been employed.

Specifically, a problem arises if a call is made to Core Imaging, for which the GPU would normally provide rendering. For this reason, it is useful for Core Imaging to comprise an emulation ability, so that all or a maximum of its functionality may be available on any platform.

Therefore, from a very high-level (system functionality) we can see that there are times when an emulator will be very useful, if not necessary. However, while the legacy applicability of Core Imaging provides incentive for this disclosure, the innovations herein are not so limited. Therefore, we shall have a brief discussion regarding the more precise circumstances in which an emulator may be employed. In particular, we have already alluded to the usefulness of an emulator in the absence of a programmable GPU or any GPU at all. However, in addition, even systems comprising GPUs may have beneficial use for emulation. In particular, problems may exceed the resource limits of a particular GPU. For example, in contemporary GPUs, images beyond 2048×2048 are generally too big. In addition, the accuracy of results may require the CPU (some GPUs such as those currently available from ATI use only 24 bit floating point). Of course, there are numerous other hardware limitations and possibly low-level software considerations that may make an emulator useful to resolve a particular graph or node 1. Making the Decision to Emulate The decision to emulate may be made at various times depending upon the nature of the host system and the reason for emulation. For example, in a system lacking programmable GPU support, a software switch may permanently set the configuration to emulate appropriate graphics calls. Alternatively, the decision may be made after Core Imaging has been called for a specific task. In this case, the nature of the task may be considered as well as the specific capabilities of the resident GPU, and possibly even the status of processes and hardware items. In some particular embodiments, Core Imaging makes the decision regarding emulation at the time of a graphics call. In some of those embodiments, emulation is used when there is either no resident GPU or the resident GPU is not programmable. In others of those embodiments, the decision is made after graph optimization has been at least partially applied and it is determined that either the GPU is unable to process a particular fragment, or such particular fragment is more advisable to process through emulation on the CPU. In yet another embodiment, the decision to emulate may depend upon the source of the graphics request or the destination of the output. This is because overall system response to a graphics request may be improved by improving the rate of memory operations. For example, if Core Imaging is asked to render a result to system memory, that ultimate destination is one factor tending toward emulation because emulation takes place on the CPU. Access to main memory is generally faster from the CPU than from the GPU. Likewise, memory operations in the video ram will generally be faster from the GPU. Therefore, if Core Imaging is asked to render to VRAM, that is a factor tending toward using the GPU.

2. Emulation as a Layer in the Software Stack

Referring to FIGS. 3(a) and 3(b) we have described Core Imaging as generally providing services in the area 3100 and 3101. For many embodiments of the Core Imaging emulator, we can refer to a service that exists in the layer of OpenGL 36 or 320. Therefore the emulator of those embodiments provides services generally at the same level at OpenGL. This is a distinction from other embodiments wherein the emulator provides services below OpenGL. The distinction occurs because the former embodiments achieve performance, in part, by providing emulation on only a subset of OpenGL's (or similarly situated services) functions. In alternative embodiments, the emulator may be part of an OpenGL (or similar) implementation. In yet another alternative embodiment, the emulator may be below OpenGL (or a similar service) and provide more comprehensive coverage. Of course, this may be at the expense of performance.

In discussing emulator embodiments of the current invention, we shall provide more specific discussion regarding two sets of embodiments. One set of embodiments involves compiling GPU programs (e.g. fragment programs) directly to machine code for the target CPU or CPUs. The second set of embodiments involves a byte-coded virtual machine where each GPU instruction is modeled by a function in a high-level programming language (such as 3). In either type of embodiment, it is preferred, although unnecessary, to begin with a low-level graph. Furthermore, since graph optimization as discussed previously may reduce nodes, memory and calculations, it is also preferred to begin with an optimized graph. Since the emulators work with fragment programs that may be a portion of a node, the emulator task may be viewed as layered below the graph walking and resolution techniques previously described.

I. Compiling GPU Programs Directly to Machine Code

Once a decision has been made to emulate, many embodiments use the following general process for a CPU-ready program. Given our prior discussion, it should be clear that we assume a beginning with GPU code. In greater particularity, this may usually be fragment programs associated with nodes in a graph. Each fragment program has one or more GPU instructions we may call these lines). Each line in the program is then translated to a CPU-equivalent instruction. Many lines, such as those comprising an add instruction, may have single instruction CPU equivalents. Other lines require more intense emulation in that a single line of fragment code must translate into multiple CPU instructions. Either type of translation (one-to-one or one-to-many) may be accomplished in a any variety of manner that a skilled programmer may recognize. In one preferred embodiment, instruction translation occurs through a large "if" statement. In another embodiment, a table and lookup are used to align GPU instructions with equivalent one or more CPU instructions.

During the translation step, GPU code may be translated from any level of GPU instruction to any level of CPU instruction. For example, the translation may occur from GPU assembly into CPU assembly. In one preferred embodiment, the translation occurs between GPU assembly and CPU machine code, which is binary in current implementation.

Once the program is expressed as CPU instruction, the code may be unrolled. Code unrolling and ultimately instruction scheduling are fairly standard optimization techniques to take advantage of instruction-level parallelism ("ILP"). The general purpose of ILP is to increase the amount of hardware parallelism exploited by software instructions. One way this is accomplished is to re-arrange instructions to maximize performance. More specifically, groups of instructions having no interdependence may be executed in parallel. Loop unrolling is a class of ILP techniques whereby efficiency is gained by exploiting the parallelism inherent in a loop. This is important in a graphic operation because a single fragment, or more particularly, its CPU-emulated equivalent, will run many, many loops in order to resolve numerous pixels (one loop per pixel). In loop unrolling, n instances of the loop are unrolled—that is, n instances of the loop code are written in program lines (e.g. if there are 10 lines in the loop and n is 4, then there would be 40 lines of unrolled code). Finally, the unrolled code must be set up to run in this form, meaning that there may be necessary adjustments to the increments of variables and the branch or goto command that restarts the loop. After unrolling, program scheduling is then used to optimize the unrolled code for maximum parallelism on the subject hardware. When the unrolled code is ultimately run, it will need only loop one nth the number of times of the original loop and each new loop will run with far less stall events.

Once unrolled, the next three steps on the code are standard optimization, register allocation and program/instruction scheduling. A skilled programmer will recognize how all these steps may be performed, however, we shall provide very brief descriptions. Our descriptions are not intended to be exhaustive or exclusive. There may be many techniques that we do not mention. Furthermore, all the techniques we do mention may not be performed under the categorization that we state. Standard program optimization is aimed at improving time and memory performance through many techniques such as code compactions and elimination of duplicates. Register allocation is performed to avoid conflicts, minimize the number of registers used and throw out instructions with no output effects. Finally, program/instruction scheduling optimizes the code for the pipelining and parallelism of the particular hardware.

Having accomplished so much by this point, the code is cached so in the future, this work is unnecessary.

1. A Specific Example Embodiment

Figure 16:
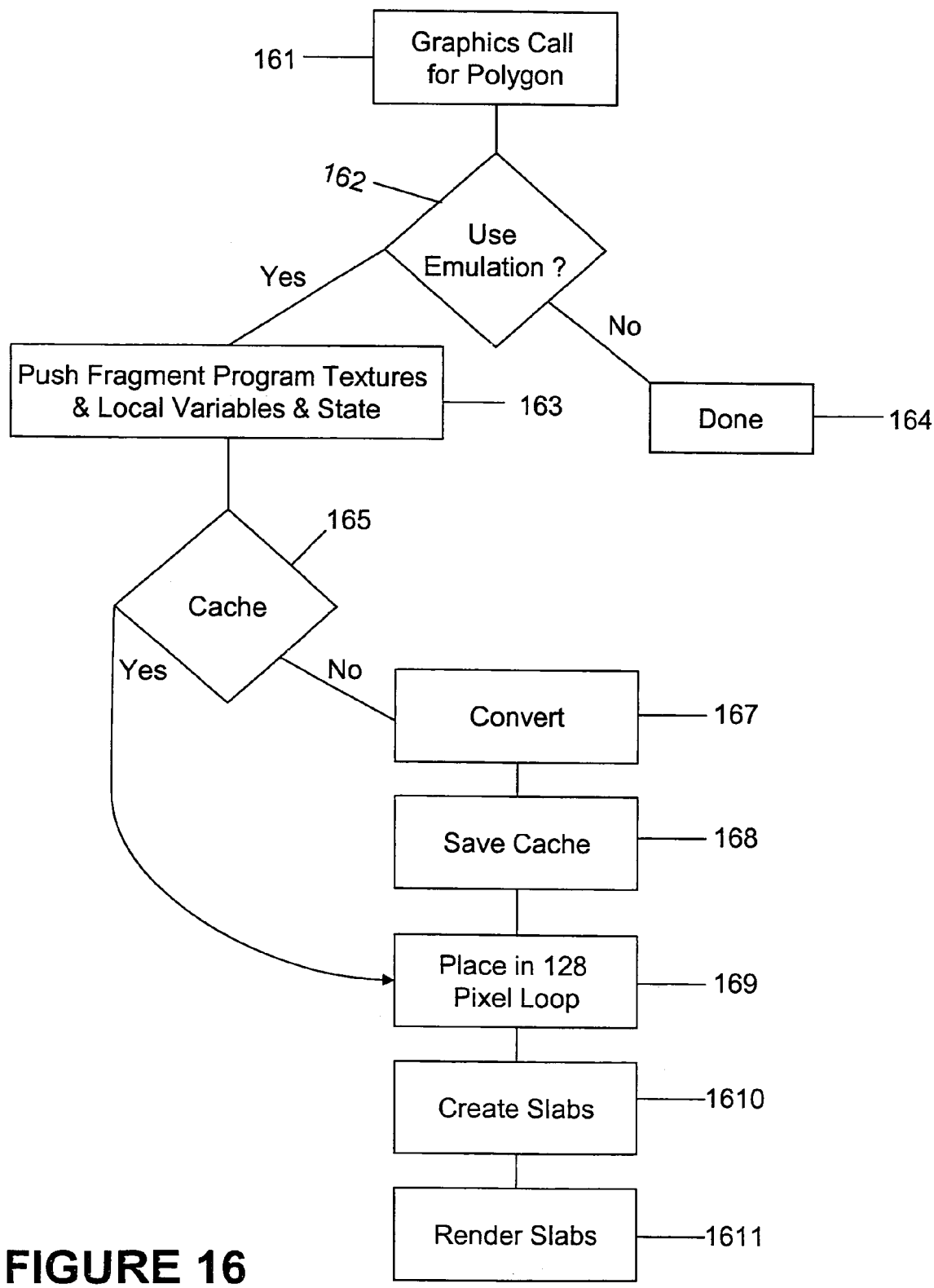
FIG. 16 is an illustrative flow chart for optimizing

Referring to FIG. 16, there is a sample program flow for an embodiment of the inventive emulator. The program flow and description are intended only for illustration. Actual embodiments may use object oriented approaches that may not be readily described with a flat flow chart.

Referring to step 161, a program calls Core Imagine to request rendering or creation of an image that is typically bounded as a polygon. Control moves to decision 162 where it is determined whether or not the emulator should be employed. If the emulator will not be employed, control moves to step 164, where we would be done for the purpose of this illustration. Of course, the disclosure discusses alternatives to emulation elsewhere.

Having previously discussed considerations for employing emulation, we shall assume that step 162 determines to use the emulator and control passes to step 163 where data is pushed to the emulator from other routines in Core Imaging. In particular, the data is the following: the subject fragment program; textures needed to render the fragment program; local variables; and state. After these items are made available to the emulator, control moves to decision 165 to see if CPU machine codes have already been generated for this task. The fragment program is used as an index into the cache. However, there are varying ways to implement the cache. In some embodiment the cache lookup will comprise the formats for all the necessary data. For example, the cache may key off of a table storing information such as the pixel format of the output (32 bits per pixel, RGBA, etc.), and/or the pixel format and state of each texture.

Returning to decision 165, if there is a cache hit, then control skips to step 169. For completeness of illustration, assume a cache miss and control moves to step 167 for conversion of the GPU fragment code to CPU code. Since techniques for this conversion are described above, we only briefly address the issue. In most embodiments, this step 167 performs all of conversion, unroll, standard optimization, register allocation, and program/instruction scheduling. However, other embodiments may perform more or fewer functions depending upon what steps have been completed earlier. Similar caveat applies to the next step 168, where the CPU code result is cached. While most embodiments cache the binary machine code, the skilled programmer may find reason to cache a less processed result.

Moving now to step 169, the machine code is placed in an N length loop for pixel evaluation. The job of this loop is to evaluate L pixels. In a preferred embodiment, L is 128. While the inventions described herein applied to nearly any value for L, the inventors have found that, in their implementation an L value of 128 provides good performance in balancing various consideration (the desire to do many pixels at once, with the larger overhead caused by texture lookups and dealing with partial blocks). Therefore, If the loop of step 169 is to evaluate L pixels, then the unrolled code must be looped a number of times equal to L divided by N, where N is the number of iterations of the loop that are expressed in the unrolled code. Ultimately then, N equals L/n. Therefore, if we use our preferred embodiment of 128 pixels per full loop, and we assume 4 unrolled iterations, then the unrolled code must be looped 32 times.

Moving now to step 1610, the emulator causes the creation of slabs. In a preferred embodiment, this may be accomplished through a function call. The term slab is used for its relatively common meaning in the graphics art. However, in this embodiment, slabs are formed by drawing horizontal lines at all vertices on the output polygon. For example, see FIG. 17 where there is shown in FIG. 17(a), a tilted rectangle and the same titled rectangle divided into slabs. FIG. 17(b) shows two trapezoids having the same relationship; one is shown with slabs drawn in.

After slabs are created, control moves to step 1611 for rendering. In a preferred embodiment, the slabs are rendered one at a time. In particular, each slab is rendered by running the pixel loop created in step 169 on L sequential pixels found on a scan line in a slab. In even more particularity, the polygon is rendered by: (i) selecting a first slab (assuming an X,Y,Z global coordinate system, in a preferred embodiment section may proceed from the smallest to largest Y value); (ii) selecting a first scan line on such first slab (assuming an X,Y,Z global coordinate system, in a preferred embodiment section may proceed from the smallest to largest Y value); (iii) using the loop created in step 169 to render the first L pixels of the scan line and then repeating this step until the scan line is all rendered; (iv) moving to subsequent scan lines (including for portions of L pixels) until all scan lines in a slab are complete; (v) completing all subsequent slabs in similar fashion. In addition, since Core Imaging's choice of L pixels is arbitrary to the service requestor (e.g. application program), some embodiments write out rendered results to one or more buffers, one pixel at a time. The ultimate result can then be placed in the requested destination in desired pieces. For example, the result can be moved to the requested destination after the completion of L pixels, or after completion of a whole portion (such as a slab), or after completion of the whole polygon. This extra step also creates a convenient place for any post processing such as format conversions (between the buffer and the requested destination).

In discussing the rendering across scan lines, a question may arise regarding the handling of scan lines where the pixel count is not a multiple of L. While skilled programmers may devise a variety of methods for implementing this case, some embodiments of the invention account for this issue within the framework of the process shown in FIG. 16. In one particular example, the pixel loop of step 169 loops a number of times according to a variable, say Alpha. Therefore, if there are 128 pixels and the loop is unrolled 4 times, then Alpha will be 32. However, if there are only 48 pixels (e.g. after processing several 128 bit groups across a scan line), then Alpha may be set to 12. Alternatively, if there are 66 pixels, Alpha may be set to 16 for processing the first 64 pixels, then Alpha may be set to one to process the 65th pixel and the 66th pixel. In summary, these embodiments call for using a variable to control looping and adjusting that variable to deal with varying amounts of pixels.

Another method for handling non-multiples of L pixels, is to provide unrolled code segments for varying amounts of pixels. For example, if the main loop has 4 unrolled segments, there may also be code created with three unrolled segments, two unrolled segments and one unrolled segment. Therefore, if there are 3 pixels, the three-pixel code can be used. If there is one pixel, then the one-pixel code may be used.

There are also embodiments that combine the forgoing techniques. For example, if there are 66 pixels, Alpha may be set to 16 for processing the first 64 pixels, then the two-pixel code may be run to handle the 65th and the 66th pixels. Alternatively, if there are 67 pixels, Alpha may be set to 16 for processing the first 64 pixels, then the one-pixel code may be run 3 times to handle the 65th, 66th, and 67th pixels.

2. Slabs

Many embodiments use slabs. As an alternative to slabs, an entire polygon could be rendered, in the same fashion as described. However, slabs provide a significant advantage in texture calculations. In particular, texture coordinates are known for the vertices of the output polygons. In most embodiments, this is because the layer above (e.g. the graph optimizer) provides this information. However, typically, the hardware can map the vertices of its base unit polygon (typically a triangle) to the relevant texture map; and the vertices of the hardware's base unit polygon must coincide with the vertices of the output polygon. Referring to FIGS. 17(a) and 17(b), these vertices are shown as circular dots. Referring to FIGS. 17(a) and 17(b) again, when slabs are formed they typically comprise one or more vertices that were not vertices on the original polygon. In all of FIG. 17, these "new" vertices are shown as triangles. Therefore, in one or more embodiments, when slabs are formed, the texture values of the new vertices (triangles in FIG. 17) may by calculated by a variety of techniques. Some embodiments calculate the texture coordinates for the new vertices by interpolating the coordinate values from the known polygon vertices. In a preferred embodiment, linear interpolation is used to interpolate down the edges of split-up slabs. Each slab then will have three or four vertices with known texture coordinates. With three or four known coordinates at the vertices of the slabs, the texture value of any pixel on a slab may be determined by mathematical techniques such as interpolation, or more particularly, linear interpolation.

Ultimately, since the slabs are smaller than the polygons, they provide a significantly easier calculation of texture values. In particular, as described to this point, slabs comprise a portion of the result polygon and occur as either a triangle or a four-sided polygon. In the case of a triangle, once the texture coordinates for all vertices are known, the coordinates (and ultimately value) of any point may be calculated with math (e.g. interpolation or linear interpolation). Furthermore, when the slab is a polygon, the program may use multiple mathematical schemes to devise the texture coordinates of a point in the polygon. For example, in some embodiments, the program will choose three vertices and perform linear interpolation.

The advantages of slabs may be realized through different shapes. For example, in some embodiments, the result polygon may be divided into all triangles for rendering. This can simplify the texture lookups in that there are always only three vertices. Therefore, there is never a need to make a decision regarding which three vertices of a four-sided polygon should be used for interpolation. In addition, a skilled programmer might apply the concepts taught herein to other schemes whereby the result polygon is divided for rendering.

3. Texture Look Ups

We have discussed texture lookups, for example, in the context of slab and polygon vertices. We shall now discuss further detail regarding how to efficiently incorporate texture lookups into some of the embodiments that have been disclosed. We must first provide background for this detailed discussion by describing two relevant types of texture lookups and then providing a context that may be analogized to prior discussions.

In the emulation task, there are two general types of texture lookups that may be encountered. There are independent texture lookups which are coordinates into a known texture. For example, an independent texture lookup may be a place in code referring to given coordinates in a known texture. Alternatively, there are dependent texture lookups, which are texture lookups that depend upon some other item or event, so coordinates are typically programaticallly placed in a register. For example, this may be a place in code where the coordinates into a given texture are found in a register. The texture lookup is dependent on the result of some other operation that will populate the register.

In setting context for the texture lookup techniques, we look more closely at the activity inside the main loop of the emulator described for varying embodiments. More particularly, this is generally analogized to the loop we discuss with reference to FIG. 16 as 169. By that analogy and reference to FIG. 16, in setting up the loop in step 169, there is more to accomplish than simply placing the unrolled code in a loop to effect the processing of 128 pixels. In particular, for each group of pixels (slab, scan line or preferably L or remainder group of pixels), code must be set up. As discussed earlier, part of setting up code may be that when a scan lines comprises a pixel length that is not multiples of 128 (L), the code may account of the remainder pixels. In addition, the code may be set up for texture lookups.

Focusing more directly now on the subject of texture lookups, a preferred embodiment of the emulator will set up the main loop for texture lookups. In one embodiment, such setup is performed for every L pixels and involves separately setting up for independent and dependent texture references. For these embodiments, during set up, each independent texture reference is looked up, preferably in the same step. And, for each dependent texture reference, a function is inserted in the code to perform the lookup after the dependency has been met. To be clear, a function call is inserted into the code for each lookup. A function is created for every texture unit accessed by a dependent texture reference in the program. The only values passed to the texture lookup function are the coordinate to lookup and the texture to use. More precisely, this inserted piece of code will call outside the loop, such function essentially emulating the GPU texture lookup ability. In one preferred embodiment, the function call from within the loop passes the texture, state and coordinates; and the function returns a vector. However, this function call may be otherwise implemented.

4. Setups

While we have discussed setting up code a number of times already, we shall provide some illustrative embodiments. For example, in a given embodiments there may be portions of code that will be set up for each polygon, and portions that will be set up for each slab, and portions that will be setup of each scan line, and portions that will be setup for each pixel group (e.g. L or remainder group). The various activities in a given setup may be extrapolated from the other discussion herein.

J. Multiple CPUs

Embodiments following techniques similar to the prior example are extremely well suited for multiple CPUs. This is because the loop machine code created at step 169 (FIG. 16) may be run in separate instances on different slabs or different polygons. In particular, Core Imaging or another suitable program can greatly speed graphics rendering on a multiprocessor system by dividing the task between processors. In a preferred embodiment, the increment of task that would be sent to each processor is a slab (or other subdivision). However, the increments could be smaller (e.g. scan lines) or larger (e.g. whole polygons).

K. Byte-Coded Virtual Machine

A virtual machine may also be used to emulate the GPU code on the CPU. A virtual machine is a process that behaves like hardware in that it can accept instructions and emulate processor resources to another processor. In a general sense, the advantage of a virtual machine emulator solution is that the virtual machine is more portable. In particular, a virtual machine may be written in a high-level language and then compiled for any platform. Alternatively, the embodiments that compile GPU programs to machine code may be custom written for each hardware platform.

In one preferred embodiment, the invention calls for a byte-code virtual machine emulator. The adjective "byte-code" adds the meaning that the virtual machine process accepts compiled code, or in the case of some embodiments code at a low-level that is analogous to that which hardware would accept At a high-level, the virtual machine may be analogized to the CPU in the embodiments discussing a GPU-to-machine-code emulators. In greater particularity, the virtual machine may be conceptualized as lying beneath the higher-level functions and techniques previously described. Therefore, all of the emulation and other methods and techniques previously described can be analogized and applied to the disclosed virtual machine emulators. However, there are interesting aspects of the virtual machine embodiments that merit independent consideration.

In one embodiment, the virtual machine includes very large virtual registers for building the output pixels. In particular, now freed from the constraint of hardware, the virtual machine can use register sizing that meets the demands of other criteria, such as efficiency. Therefore, in some embodiments, the virtual machine will set up a register for pixels that is L pixels wide (referring back to our example of 128 pixels processed along a scan line). A register this wide provides many options for main loop processing. At one extreme, the register may function as an output buffer with one pixel being processed at a time (single pixel loop). At the other extreme, each step in the main loop may be effected on each pixel before moving to the next step (this would be analogous to fully unrolling the loop). As a balance between these extremes, some embodiments will implement the virtual machine to conceptually unroll the loop as much as possible, without incurring dependency issues. Depending upon system considerations, the pixel register may be a multiple of L or fraction of L. Furthermore, the pixel register may also be implemented dynamically to match the size of a scan line or polygon working-segment (such as a slab).

In practice, when an embodiment of the emulator is running it receives an instruction from a higher layer, which is preferably a higher layer of Core Imaging. Conceptually, the instruction may be at any level but for a preferred embodiment, the instruction will be low-level such as byte code. The virtual machine must then convert the instruction to a task for the CPU. The first part of such conversion is an "if" statement or jump table that effects a direct conversion to CPU cognizable instructions. In one preferred embodiment, the virtual machine models a GPU instruction as a C function. In this type of embodiment, each GPU instruction to be emulated may correspond with a C function. The C function may then be converted to CPU-cognizable code with an ordinary compiler. Most commonly, in a preferred embodiment, each emulated GPU instruction is modeled in a high-level language such as C. The high-level models are compiled and the results are incorporated into an "if" statement of jump table to be used during operation of the virtual machine emulator. Lastly, when operating on an element during emulation (such as a pixel), a CPU vector register may preferably be used to store the vector.

L. Emulating a Subset of Functionality

In order to yield performance, many embodiments do not emulate all possible low-level graphics calls. In general, by emulating only a subset of possible graphics instruction, the implementation can make more assumptions about the supported calls and therefore avoid some contingencies thereby saving work. For example, in some embodiments, Core Imaging has no need for perspective correct interpolations. In particular, OpenGL typically requires at least one divide instruction for every pixel per interpolated texture coordinate. Divides are very expensive computationally and since these embodiments of Core Imaging don't have perspective, the divides are unnecessary. Another example of performance gained by supporting only a subset of operations is that some embodiments of Core Imaging only support a small number of texture formats and destination formats. This limits data conversions and allows easier inline code generation.

As an example of supporting only a subset of functions, in one embodiment the emulator supports only a subset of OpenGL's functionality as follows: (i) drawing four-sided polygons; (ii) binding textures; (iii) binding programs; (iv) setting local variables; and (v) setting destinations.

There are several ways to practically apply this type abbreviated support. Foremost, the defined high-level API may only support these functions so that there is no possibility of receiving commands that can not be emulated. For example, if Core Imaging only supports a subset of functions, then the Core Imaging emulator need not support more. In that case, if programs or programmers wish to use non-supported graphics calls they must do so through another mechanism, such as direct calls to OpenGL or direct use of the GPU. Alternatively, one emulation technique might be used for the enumerated subset of functions (or some other subset) and another technique may be used for all other graphics calls. For example, the five emulated functions may be emulated through an embodiment using the GPU-to-machine technique, while other functions may be emulated through the virtual machine embodiments. This arrangement allows for highest performance on the most common graphics calls and easier portability and programming for supporting other calls. Of course, this division can be drawn along other criteria, such as difficulty of servicing the call, or the suitability of call servicing by respective techniques. In addition, the two sets of techniques (virtual machine and CPU-to-machine) can similarly share responsibility for implementing one or more subsets of overall graphics function in a system

M. Sample Filter List

At various points in the specification, we have referred to an illustrative list of filters. The following many pages are devoted to that list. This list and the accompanying parameters are provided for illustration and completeness of discussion. Regarding the inventors' implementations of the aforementioned innovations, each of the listed filters may or may not be used or modified. Furthermore, more filters may be created and those may differ materially from that disclosed.

-------------- Filter # 1: CIColorMonochrome --------------
{
   category = "Color Correction";
   inputColor = {class = CIColor; default = <0.6, 0.45, 0.3, 1>; type = opaqueColor; };
   inputImage = {class = CIImage; };
   inputIntensity = {
     class = NSNumber;
     default = 1;

```
      identity = 0;
      minimum = 0;
      sliderMaximum = 1;
      sliderMinimum = 0;
      type = scalar;
   };
   name = "Color Monochrome";
   outputImage = {class = CIImage; };
}

------------- Filter # 2: CIEqualize -------------
{
   category = "Color Correction";
   inputBlack = {
      class = NSNumber;
      default = 0.25;
      identity = 0;
      sliderMaximum = 1;
      sliderMinimum = 0;
      type = scalar;
   };
   inputImage = {class = CIImage; };
   inputWhite = {
      class = NSNumber;
      default = 0.75;
      identity = 1;
      sliderMaximum = 1;
      sliderMinimum = 0;
      type = scalar;
   };
   name = "Color Equalize";
   outputImage = {class = CIImage; };
}

------------- Filter # 3: CISaturate -------------
{
   category = "Color Correction";
   inputImage = {class = CIImage; };
   inputSaturation = {
      class = NSNumber;
      default = 1;
      identity = 0;
      minimum = -1;
      sliderMaximum = 3;
      sliderMinimum = -1;
      type = scalar;
```

```
   };
   name = Saturate;
   outputImage = {class = CIImage; };
}

------------- Filter # 4: CIFalseColor -------------
{
   category = "Color Correction";
   inputColor1 = {class = CIColor; default = <0.3, 0, 0, 1>; type = color; };
   inputColor2 = {class = CIColor; default = <1, 0.9, 0.8, 1>; type = color; };
   inputImage = {class = CIImage; };
   inputIntensity = {
      class = NSNumber;
      default = 1;
      identity = 0;
      minimum = 0;
      sliderMaximum = 1;
      sliderMinimum = 0;
      type = scalar;
   };
   name = "False Color";
   outputImage = {class = CIImage; };
}

------------- Filter # 5: CIColorTint -------------
{
   category = "Color Correction";
   inputAngle = {
      class = NSNumber;
      default = 1.047197551196598;
      identity = 0;
      maximum = 6.283185307179586;
      minimum = 0;
      sliderMaximum = 6.283185307179586;
      sliderMinimum = 0;
      type = angle;
   };
   inputImage = {class = CIImage; };
   name = "Color Tint";
   outputImage = {class = CIImage; };
}

------------- Filter # 6: CIColorNegative -------------
{
```

```
    category = "Color Correction";
    inputImage = {class = CIImage; };
    name = "Color Negative";
    outputImage = {class = CIImage; };
}

------------- Filter # 7: CIGamma -------------
{
    category = "Color Correction";
    inputImage = {class = CIImage; };
    inputPower = {
        class = NSNumber;
        default = 0.75;
        identity = 1;
        sliderMaximum = 3;
        sliderMinimum = 0.1;
        type = scalar;
    };
    name = Gamma;
    outputImage = {class = CIImage; };
}

------------- Filter # 8: CIBrighten -------------
{
    category = "Color Correction";
    inputAmount = {
        class = NSNumber;
        default = 0;
        identity = 0;
        sliderMaximum = 1;
        sliderMinimum = -1;
        type = scalar;
    };
    inputImage = {class = CIImage; };
    name = Brighten;
    outputImage = {class = CIImage; };
}

------------- Filter # 9: CIColorPosterize -------------
{
    category = "Color Correction";
    inputBlueLevels = {
        class = NSNumber;
        default = 6;
        identity = 6;
        sliderMaximum = 30;
```

```
      sliderMinimum = 0;
      type = scalar;
    };
    inputGreenLevels = {
      class = NSNumber;
      default = 6;
      identity = 6;
      sliderMaximum = 30;
      sliderMinimum = 0;
      type = scalar;
    };
    inputImage = {class = CIImage; };
    inputRedLevels = {
      class = NSNumber;
      default = 6;
      identity = 6;
      sliderMaximum = 30;
      sliderMinimum = 0;
      type = scalar;
    };
    name = "Color Posterize";
    outputImage = {class = CIImage; };
}

------------- Filter # 10: CIContrastBrightness ------------- {
    category = "Color Correction";
    inputBrightness = {
      class = NSNumber;
      default = -0.3;
      identity = 0;
      sliderMaximum = 1;
      sliderMinimum = -1;
      type = scalar;
    };
    inputContrast = {
      class = NSNumber;
      default = -0.3;
      identity = 0;
      sliderMaximum = 1;
      sliderMinimum = -1;
      type = scalar;
    };
    inputImage = {class = CIImage; };
    name = "Contrast/Brightness";
    outputImage = {class = CIImage; };
}
```

-------------- Filter # 11: CISepiaTone --------------
{
   category = "Color Correction";
   inputImage = {class = CIImage; };
   inputIntensity = {
     class = NSNumber;
     default = 1;
     identity = 1;
     minimum = 0;
     sliderMaximum = 1;
     sliderMinimum = 0;
     type = scalar;
   };
   name = "Sepia Tone";
   outputImage = {class = CIImage; };
}

-------------- Filter # 12: CIColorControls --------------
{
   category = "Color Correction";
   inputBrightness = {
     class = NSNumber;
     default = 0;
     identity = 0;
     minimum = -1;
     sliderMaximum = 1;
     sliderMinimum = -1;
     type = scalar;
   };
   inputContrast = {
     class = NSNumber;
     default = 1;
     identity = 1;
     minimum = 0.25;
     sliderMaximum = 4;
     sliderMinimum = 0.25;
     type = scalar;
   };
   inputHue = {
     class = NSNumber;
     default = 0;
     identity = 0;
     sliderMaximum = 6.283185307179586;
     sliderMinimum = 0;
     type = angle;

```
   };
   inputImage = {class = CIImage; };
   inputSaturation = {
      class = NSNumber;
      default = 1;
      identity = 1;
      minimum = 0;
      sliderMaximum = 3;
      sliderMinimum = 0;
      type = scalar;
   };
   name = "Color Controls";
   outputImage = {class = CIImage; };
}

-------------- Filter # 13: CIGrayscale --------------
{
   category = "Color Correction";
   inputColor = {class = CIColor; default = <0.6, 0.45, 0.3, 1>; type = opaqueColor; };
   inputImage = {class = CIImage; };
   inputIntensity = {
      class = NSNumber;
      default = 1;
      identity = 0;
      minimum = 0;
      sliderMaximum = 2;
      sliderMinimum = 0;
      type = scalar;
   };
   name = Grayscale;
   outputImage = {class = CIImage; };
}

-------------- Filter # 14: CIMultiply --------------
{
   category = "Color Correction";
   inputColor = {
      class = CIColor;
      default = <0.75, 0.75, 0.75, 0.75>;
      identity = <1, 1, 1, 1>;
      type = color;
   };
   inputImage = {class = CIImage; };
   name = Multiply;
   outputImage = {class = CIImage; };
```

}

```
------------- Filter # 15: CIDissolveTransition ------------- {
   category = Transition;
   inputImage = {class = CIImage; };
   inputTargetImage = {class = CIImage; };
   inputTime = {
      class = NSNumber;
      default = 0;
      identity = 0;
      maximum = 1;
      minimum = 0;
      sliderMaximum = 1;
      sliderMinimum = 0;
      type = time;
   };
   name = Dissolve;
   outputImage = {class = CIImage; };
}

------------- Filter # 16: CIDisintegrateTransition ------------- {
   category = Transition;
   inputEdgeRamp = {
      class = NSNumber;
      default = 35;
      minimum = 0;
      sliderMaximum = 40;
      sliderMinimum = 0;
      type = scalar;
   };
   inputImage = {class = CIImage; };
   inputMaskImage = {class = CIImage; };
   inputShadowRamp = {
      class = NSNumber;
      default = 7;
      minimum = 0;
      sliderMaximum = 15;
      sliderMinimum = 0;
      type = scalar;
   };
   inputTargetImage = {class = CIImage; };
   inputTime = {
      class = NSNumber;
      default = 0;
      identity = 0;
      maximum = 1;
```

```
      minimum = 0;
      sliderMaximum = 1;
      sliderMinimum = 0;
      type = time;
   };
   name = "Slide Disintegrate";
   outputImage = {class = CIImage; };
}

-------------- Filter # 17:  CIRippleTransition --------------
{
   category = Transition;
   inputCenter = {class = CIVector; default = <150, 150, 0, 1>; type = position; };
   inputDisplacement = {
      class = NSNumber;
      default = 50;
      identity = 0;
      minimum = -50;
      sliderMaximum = 50;
      sliderMinimum = -50;
      type = scalar;
   };
   inputImage = {class = CIImage; };
   inputShadingMap = {class = CIImage; };
   inputTargetImage = {class = CIImage; };
   inputTime = {
      class = NSNumber;
      default = 0;
      identity = 0;
      maximum = 1;
      minimum = 0;
      sliderMaximum = 1;
      sliderMinimum = 0;
      type = time;
   };
   inputWaveWidth = {
      class = NSNumber;
      default = 30;
      identity = 60;
      minimum = 1;
      sliderMaximum = 1000;
      sliderMinimum = 6;
      type = distance;
   };
   name = "Ripple Transition";
```

```
    outputImage = {class = CIImage; };
}

-------------- Filter # 18:  CIFlashTransition --------------
{
    category = Transition;
    inputCenter = {class = CIVector; default = <150, 150, 0, 1>; type = position; };
    inputColor = {class = CIColor; default = <1, 0.8, 0.6, 1>; type = opaqueColor; };
    inputFadeThreshold = {
       class = NSNumber;
       default = 0.85;
       identity = 0.85;
       minimum = 0;
       sliderMaximum = 1;
       sliderMinimum = 0;
       type = scalar;
    };
    inputImage = {class = CIImage; };
    inputLookupRadius = {
       class = NSNumber;
       default = 45;
       identity = 45;
       minimum = 0;
       sliderMaximum = 330;
       sliderMinimum = 0;
       type = distance;
    };
    inputMaxStriationRadius = {
       class = NSNumber;
       default = 2.58;
       identity = 2.58;
       minimum = 0;
       sliderMaximum = 10;
       sliderMinimum = 0;
       type = scalar;
    };
    inputStriationContrast = {
       class = NSNumber;
       default = 1.375;
       identity = 1.375;
       minimum = 0;
       sliderMaximum = 5;
       sliderMinimum = 0;
       type = scalar;
```

```
    };
    inputStriationStrength = {
      class = NSNumber;
      default = 0.5;
      identity = 0.5;
      minimum = 0;
      sliderMaximum = 3;
      sliderMinimum = 0;
      type = scalar;
    };
    inputTargetImage = {class = CIImage; };
    inputTexture = {class = CIImage; };
    inputTime = {
      class = NSNumber;
      default = 0;
      identity = 0;
      maximum = 1;
      minimum = 0;
      sliderMaximum = 1;
      sliderMinimum = 0;
      type = time;
    };
    name = Flash;
    outputImage = {class = CIImage; };
}

------------- Filter # 19:  CISwipeTransition -------------
{
    category = Transition;
    inputAngle = {
      class = NSNumber;
      default = 0;
      identity = 0;
      maximum = 6.283185307179586;
      minimum = 0;
      sliderMaximum = 6.283185307179586;
      sliderMinimum = 0;
      type = angle;
    };
    inputColor = {class = CIColor; default = <1, 1, 1, 1>; type = opaqueColor; };
    inputImage = {class = CIImage; };
    inputOpacity = {
      class = NSNumber;
      default = 0;
      identity = 0;
```

```
      minimum = 0;
      sliderMaximum = 1;
      sliderMinimum = 0;
      type = scalar;
    };
    inputTargetImage = {class = CIImage; };
    inputTime = {
      class = NSNumber;
      default = 0;
      identity = 0;
      maximum = 1;
      minimum = 0;
      sliderMaximum = 1;
      sliderMinimum = 0;
      type = time;
    };
    inputWidth = {
      class = NSNumber;
      default = 600;
      identity = 600;
      minimum = 0.1;
      sliderMaximum = 1000;
      sliderMinimum = 0.1;
      type = distance;
    };
    name = Swipe;
    outputImage = {class = CIImage; };
}

-------------- Filter # 20:  CIModTransition --------------
{
    category = Transition;
    inputCenter = {class = CIVector; default = <150, 150, 0, 1>; type = position; };
    inputCompression = {
      class = NSNumber;
      default = 0.5;
      identity = 0.5;
      minimum = 0;
      sliderMaximum = 1;
      sliderMinimum = 0;
      type = scalar;
    };
    inputContrast = {
      class = NSNumber;
      default = 16;
```

```
    identity = 16;
    minimum = 0;
    sliderMaximum = 20;
    sliderMinimum = 0;
    type = scalar;
};
inputEndAngle = {
    class = NSNumber;
    default = 2.6;
    identity = 2.6;
    minimum = 0;
    sliderMaximum = 6.283185307179586;
    sliderMinimum = 0;
    type = angle;
};
inputImage = {class = CIImage; };
inputScale = {
    class = NSNumber;
    default = 126;
    identity = 126;
    minimum = 1;
    sliderMaximum = 200;
    sliderMinimum = 1;
    type = scalar;
};
inputStartAngle = {
    class = NSNumber;
    default = 1.1;
    identity = 1.1;
    minimum = 0;
    sliderMaximum = 6.283185307179586;
    sliderMinimum = 0;
    type = angle;
};
inputTargetImage = {class = CIImage; };
inputTime = {
    class = NSNumber;
    default = 0;
    identity = 0;
    maximum = 1;
    minimum = 0;
    sliderMaximum = 1;
    sliderMinimum = 0;
    type = time;
};
name = Mod;
```

```
    outputImage = {class = CIImage; };
}

------------ Filter # 21:  CICopyMachineTransition ------------ {
    category = Transition;
    inputAngle = {
        class = NSNumber;
        default = 0;
        identity = 0;
        maximum = 6.283185307179586;
        minimum = 0;
        sliderMaximum = 6.283185307179586;
        sliderMinimum = 0;
        type = angle;
    };
    inputColor = {class = CIColor; default = <0.6, 1, 0.8, 1>; type = opaqueColor; };
    inputImage = {class = CIImage; };
    inputLeadingEdge = {
        class = NSNumber;
        default = 0.83;
        identity = 0.83;
        minimum = 0;
        sliderMaximum = 1;
        sliderMinimum = 0;
        type = scalar;
    };
    inputOpacity = {
        class = NSNumber;
        default = 1.3;
        identity = 1.3;
        minimum = 0;
        sliderMaximum = 3;
        sliderMinimum = 0;
        type = scalar;
    };
    inputReturnTime = {
        class = NSNumber;
        default = 0.65;
        identity = 0.65;
        minimum = 0;
        sliderMaximum = 1;
        sliderMinimum = 0;
        type = scalar;
    };
    inputTargetImage = {class = CIImage; };
```

```
inputTime = {
  class = NSNumber;
  default = 0;
  identity = 0;
  maximum = 1;
  minimum = 0;
  sliderMaximum = 1;
  sliderMinimum = 0;
  type = time;
};
inputWidth = {
  class = NSNumber;
  default = 200;
  identity = 200;
  minimum = 0.1;
  sliderMaximum = 1000;
  sliderMinimum = 0.1;
  type = distance;
};
name = "Copy Machine";
outputImage = {class = CIImage; };
}

------------- Filter # 22:  CIZoomBlurTransition ------------- {
  category = Transition;
  inputAmount = {
    class = NSNumber;
    default = 65;
    identity = 65;
    minimum = 0;
    sliderMaximum = 100;
    sliderMinimum = 0;
    type = scalar;
  };
  inputCenter = {class = CIVector; default = <150, 150, 0, 1>; type = position; };
  inputImage = {class = CIImage; };
  inputSampling = {
    class = NSNumber;
    default = 0.997;
    identity = 0.997;
    minimum = 0.01;
    sliderMaximum = 1;
    sliderMinimum = 0.98;
    type = scalar;
  };
```

```
      inputTargetImage = {class = CIImage; };
      inputTime = {
         class = NSNumber;
         default = 0;
         identity = 0;
         maximum = 1;
         minimum = 0;
         sliderMaximum = 1;
         sliderMinimum = 0;
         type = time;
      };
      name = "Zoom Blur Transition";
      outputImage = {class = CIImage; };
}

------------- Filter # 23:  CIBumpDistortion -------------
{
      category = Distortion;
      inputAmount = {
         class = NSNumber;
         default = 300;
         identity = 300;
         minimum = 0;
         sliderMaximum = 1000;
         sliderMinimum = 0;
         type = distance;
      };
      inputCenter = {class = CIVector; default = <150, 150, 0, 1>; type =
position; };
      inputImage = {class = CIImage; };
      inputScale = {
         class = NSNumber;
         default = -0.5;
         identity = 0;
         minimum = -10;
         sliderMaximum = 10;
         sliderMinimum = -10;
         type = scalar;
      };
      name = Bump;
      outputImage = {class = CIImage; };
}

------------- Filter # 24:  CIPullDistortion -------------
{
      category = Distortion;
```

```
inputAmount = {
  class = NSNumber;
  default = 300;
  identity = 300;
  minimum = 0;
  sliderMaximum = 1000;
  sliderMinimum = 0;
  type = distance;
};
inputAngle = {
  class = NSNumber;
  default = 0;
  identity = 0;
  maximum = 6.283185307179586;
  minimum = 0;
  sliderMaximum = 6.283185307179586;
  sliderMinimum = 0;
  type = angle;
};
inputCenter = {class = CIVector; default = <150, 150, 0, 1>; type = position; };
inputImage = {class = CIImage; };
inputLength = {
  class = NSNumber;
  default = 50;
  identity = 0;
  minimum = 0;
  sliderMaximum = 1000;
  sliderMinimum = 0;
  type = distance;
};
name = Pull;
outputImage = {class = CIImage; };
}

------------- Filter # 25: CILinearPullDistortion ------------- {
  category = Distortion;
  inputAngle = {
    class = NSNumber;
    default = 0;
    identity = 0;
    maximum = 6.283185307179586;
    minimum = 0;
    sliderMaximum = 6.283185307179586;
    sliderMinimum = 0;
    type = angle;
```

```
    };
    inputCenter = {class = CIVector; default = <150, 150, 0, 1>; type =
position; };
    inputImage = {class = CIImage; };
    inputOffsetAngle = {
        class = NSNumber;
        default = 0;
        identity = 0;
        minimum = 0;
        sliderMaximum = 6.283185307179586;
        sliderMinimum = 0;
        type = angle;
    };
    inputOffsetLength = {
        class = NSNumber;
        default = 50;
        identity = 0;
        minimum = 0;
        sliderMaximum = 1000;
        sliderMinimum = 0;
        type = distance;
    };
    inputRadius = {
        class = NSNumber;
        default = 300;
        identity = 300;
        minimum = 0;
        sliderMaximum = 1000;
        sliderMinimum = 0;
        type = distance;
    };
    name = "Linear Pull";
    outputImage = {class = CIImage; };
}

------------- Filter # 26: CILinearBumpDistortion ------------- {
    category = Distortion;
    inputAngle = {
        class = NSNumber;
        default = 0;
        identity = 0;
        maximum = 6.283185307179586;
        minimum = 0;
        sliderMaximum = 6.283185307179586;
        sliderMinimum = 0;
        type = angle;
```

```
    };
    inputCenter = {class = CIVector; default = <150, 150, 0, 1>; type =
position; };
    inputImage = {class = CIImage; };
    inputRadius = {
       class = NSNumber;
       default = 300;
       identity = 300;
       minimum = 0;
       sliderMaximum = 1000;
       sliderMinimum = 0;
       type = distance;
    };
    inputScale = {
       class = NSNumber;
       default = 0.5;
       identity = 1;
       minimum = -10;
       sliderMaximum = 10;
       sliderMinimum = -10;
       type = scalar;
    };
    name = "Linear Bump";
    outputImage = {class = CIImage; };
}

------------- Filter # 27:  CIRippleDistortion -------------
{
    category = Distortion;
    inputCenter = {class = CIVector; default = <150, 150, 0, 1>; type =
position; };
    inputHeight = {
       class = NSNumber;
       default = 30;
       identity = 0;
       minimum = -50;
       sliderMaximum = 50;
       sliderMinimum = -50;
       type = distance;
    };
    inputImage = {class = CIImage; };
    inputRadius = {
       class = NSNumber;
       .default = 300;
       identity = 0;
       minimum = -50;
```

```
      sliderMaximum = 950;
      sliderMinimum = -50;
      type = distance;
   };
   inputWidth = {
      class = NSNumber;
      default = 40;
      identity = 40;
      minimum = 0;
      sliderMaximum = 100;
      sliderMinimum = 0;
      type = distance;
   };
   name = Ripple;
   outputImage = {class = CIImage; };
}

------------- Filter # 28:  CISuperGelButton -------------
{
   category = Distortion;
   inputCenter = {class = CIVector; default = <150, 150, 0, 1>; type = position; };
   inputColor = {class = CIColor; default = <0.6, 0.8, 1, 1>; type = color; };
   inputDamping = {
      class = NSNumber;
      default = 2;
      identity = 2;
      minimum = 0;
      sliderMaximum = 3;
      sliderMinimum = 0;
      type = scalar;
   };
   inputDepressTime = {
      class = NSNumber;
      default = 0.27;
      identity = 0.27;
      minimum = 0.1;
      sliderMaximum = 3;
      sliderMinimum = 0.1;
      type = scalar;
   };
   inputExpansion = {
      class = NSNumber;
      default = 0.02;
      identity = 0;
```

```
      minimum = -1;
      sliderMaximum = 1;
      sliderMinimum = -1;
      type = scalar;
   };
   inputImage = {class = CIImage; };
   inputPeriod = {
      class = NSNumber;
      default = 0.4;
      identity = 0.4;
      minimum = 0.1;
      sliderMaximum = 3;
      sliderMinimum = 0.1;
      type = scalar;
   };
   inputRadius = {
      class = NSNumber;
      default = 200;
      identity = 200;
      minimum = 1;
      sliderMaximum = 1000;
      sliderMinimum = 1;
      type = scalar;
   };
   inputReflection = {
      class = NSNumber;
      default = 1;
      identity = 1;
      minimum = 0;
      sliderMaximum = 3;
      sliderMinimum = 0;
      type = scalar;
   };
   inputRefraction = {
      class = NSNumber;
      default = 12;
      identity = 12;
      minimum = 0;
      sliderMaximum = 200;
      sliderMinimum = 0;
      type = scalar;
   };
   inputShineMap = {class = CIImage; };
   inputSlope = {
      class = NSNumber;
      default = -4;
```

```
      identity = -4;
      minimum = -6.5;
      sliderMaximum = 4.5;
      sliderMinimum = -6.5;
      type = scalar;
   };
   name = "Super Gel Button";
   outputImage = {class = CIImage; };
}

-------------- Filter # 29:  CIPinchDistortion --------------
{
   category = Distortion;
   inputCenter = {class = CIVector; default = <150, 150, 0, 1>; type = position; };
   inputImage = {class = CIImage; };
   inputRadius = {
      class = NSNumber;
      default = 300;
      identity = 0;
      minimum = 0;
      sliderMaximum = 1000;
      sliderMinimum = 0;
      type = distance;
   };
   inputScale = {
      class = NSNumber;
      default = 0.5;
      identity = 0;
      minimum = 0;
      sliderMaximum = 1;
      sliderMinimum = 0;
      type = scalar;
   };
   name = Pinch;
   outputImage = {class = CIImage; };
}

-------------- Filter # 30:  CIDisplaceDistortion -------------- {
   category = Distortion;
   inputDisplacement = {
      class = NSNumber;
      default = 600;
      identity = 0;
      minimum = 0;
      sliderMaximum = 10000;
```

```
      sliderMinimum = 0;
      type = distance;
   };
   inputDisplacementMap = {class = CIImage; };
   inputImage = {class = CIImage; };
   name = Displace;
   outputImage = {class = CIImage; };
}

------------- Filter # 31: CIRoundedDistortion -------------
{
   category = Distortion;
   inputCenter = {class = CIVector; default = <150, 150, 0, 1>; type = position; };
   inputImage = {class = CIImage; };
   inputRadius = {
      class = NSNumber;
      default = 400;
      identity = 400;
      minimum = 0;
      sliderMaximum = 1000;
      sliderMinimum = 0;
      type = distance;
   };
   name = Rounded;
   outputImage = {class = CIImage; };
}

------------- Filter # 32: CIFunHouseDistortion ------------- {
   category = Distortion;
   inputAmount = {
      class = NSNumber;
      default = 3;
      identity = 1;
      minimum = 0;
      sliderMaximum = 100;
      sliderMinimum = 0;
      type = distance;
   };
   inputAngle = {
      class = NSNumber;
      default = 0;
      identity = 0;
      maximum = 6.283185307179586;
      minimum = 0;
      sliderMaximum = 6.283185307179586;
```

```
      sliderMinimum = 0;
      type = angle;
   };
   inputCenter = {class = CIVector; default = <150, 150, 0, 1>; type =
position; };
   inputImage = {class = CIImage; };
   inputWidth = {
      class = NSNumber;
      default = 400;
      identity = 400;
      minimum = 0;
      sliderMaximum = 1000;
      sliderMinimum = 0;
      type = distance;
   };
   name = "Fun House";
   outputImage = {class = CIImage; };
}

------------- Filter # 33:  CIBlackHoleDistortion ------------- {
   category = Distortion;
   inputAmount = {
      class = NSNumber;
      default = 150;
      identity = 0;
      minimum = 0;
      sliderMaximum = 1000;
      sliderMinimum = 0;
      type = distance;
   };
   inputCenter = {class = CIVector; default = <150, 150, 0, 1>; type =
position; };
   inputImage = {class = CIImage; };
   name = "Black Hole";
   outputImage = {class = CIImage; };
}

------------- Filter # 34:  CIHoleDistortion -------------
{
   category = Distortion;
   inputCenter = {class = CIVector; default = <150, 150, 0, 1>; type =
position; };
   inputImage = {class = CIImage; };
   inputRadius = {
      class = NSNumber;
      default = 150;
```

```
      identity = 0.1;
      minimum = 0.01;
      sliderMaximum = 1000;
      sliderMinimum = 0.01;
      type = distance;
   };
   name = Hole;
   outputImage = {class = CIImage; };
}

-------------- Filter # 35:  CIAffineTile --------------
{
   category = Distortion;
   inputAngle = {
      class = NSNumber;
      default = 0;
      identity = 0;
      maximum = 6.283185307179586;
      minimum = 0;
      sliderMaximum = 6.283185307179586;
      sliderMinimum = 0;
      type = angle;
   };
   inputCenter = {class = CIVector; default = <150, 150, 0, 1>; type = position; };
   inputImage = {class = CIImage; };
   inputScale = {
      class = NSNumber;
      default = 3;
      identity = 1;
      minimum = 0;
      sliderMaximum = 20;
      sliderMinimum = 0.05;
      type = scalar;
   };
   inputSkew = {
      class = NSNumber;
      default = 0;
      identity = 0;
      sliderMaximum = 3;
      sliderMinimum = -3;
      type = scalar;
   };
   inputStretch = {
      class = NSNumber;
      default = 1;
```

```
      identity = 1;
      minimum = 0;
      sliderMaximum = 10;
      sliderMinimum = 0.1;
      type = scalar;
   };
   name = "Affine Tile";
   outputImage = {class = CIImage; };
}

------------- Filter # 36:  CIOpTile -------------
{
   category = Distortion;
   inputAngle = {
      class = NSNumber;
      default = 0;
      identity = 0;
      maximum = 6.283185307179586;
      minimum = 0;
      sliderMaximum = 6.283185307179586;
      sliderMinimum = 0;
      type = angle;
   };
   inputCenter = {class = CIVector; default = <150, 150, 0, 1>; type = position; };
   inputImage = {class = CIImage; };
   inputScale = {
      class = NSNumber;
      default = 2.8;
      identity = 1;
      minimum = 0;
      sliderMaximum = 10;
      sliderMinimum = 0.1;
      type = scalar;
   };
   inputTileSize = {
      class = NSNumber;
      default = 65;
      identity = 65;
      minimum = 0;
      sliderMaximum = 1000;
      sliderMinimum = 1;
      type = distance;
   };
   name = "Op Tile";
   outputImage = {class = CIImage; };
```

}

-------------- Filter # 37:  CIParallelogramTile --------------
{
   category = Distortion;
   inputAcuteAngle = {
     class = NSNumber;
     default = 1.570796326794897;
     identity = 1.570796326794897;
     maximum = 6.283185307179586;
     minimum = 0;
     sliderMaximum = 6.283185307179586;
     sliderMinimum = 0;
     type = angle;
   };
   inputAngle = {
     class = NSNumber;
     default = 0;
     identity = 0;
     maximum = 6.283185307179586;
     minimum = 0;
     sliderMaximum = 6.283185307179586;
     sliderMinimum = 0;
     type = angle;
   };
   inputCenter = {class = CIVector; default = <150, 150, 0, 1>; type = position; };
   inputImage = {class = CIImage; };
   inputTileSize = {
     class = NSNumber;
     default = 100;
     identity = 100;
     minimum = 0;
     sliderMaximum = 200;
     sliderMinimum = 1;
     type = distance;
   };
   name = "Parallelogram Tile";
   outputImage = {class = CIImage; };
}

-------------- Filter # 38:  CITriangleTile --------------
{
   category = Distortion;
   inputAngle = {
     class = NSNumber;

```
    default = 0;
    identity = 0;
    maximum = 6.283185307179586;
    minimum = 0;
    sliderMaximum = 6.283185307179586;
    sliderMinimum = 0;
    type = angle;
  };
  inputCenter = {class = CIVector; default = <150, 150, 0, 1>; type =
position; };
  inputImage = {class = CIImage; };
  inputTileSize = {
    class = NSNumber;
    default = 100;
    identity = 100;
    minimum = 0;
    sliderMaximum = 200;
    sliderMinimum = 1;
    type = distance;
  };
  name = "Triangle Tile";
  outputImage = {class = CIImage; };
}

------------- Filter # 39:  CIGlassDistortion -------------
{
  category = Distortion;
  inputAmount = {
    class = NSNumber;
    default = 110;
    identity = 0;
    minimum = 0;
    sliderMaximum = 2000;
    sliderMinimum = 0.01;
    type = distance;
  };
  inputCenter = {class = CIVector; default = <150, 150, 0, 1>; type =
position; };
  inputImage = {class = CIImage; };
  inputScale = {
    class = NSNumber;
    default = 0.4;
    identity = 1;
    minimum = 0.001;
    sliderMaximum = 2;
    sliderMinimum = 0.004;
```

```
      type = distance;
   };
   inputSoftness = {
      class = NSNumber;
      default = 0;
      identity = 0;
      minimum = 0;
      sliderMaximum = 5;
      sliderMinimum = 0;
      type = distance;
   };
   inputTexture = {class = CIImage; };
   name = "Glass Distortion";
   outputImage = {class = CIImage; };
}

------------- Filter # 40:  CIRingLens -------------
{
   category = Distortion;
   inputCenter = {class = CIVector; default = <150, 150, 0, 1>; type = position; };
   inputImage = {class = CIImage; };
   inputRadius = {
      class = NSNumber;
      default = 20;
      identity = 20;
      minimum = 0.01;
      sliderMaximum = 1000;
      sliderMinimum = 0.01;
      type = distance;
   };
   inputRefraction = {
      class = NSNumber;
      default = 1;
      identity = 0;
      minimum = 0.0001;
      sliderMaximum = 1000;
      sliderMinimum = 0.0001;
      type = scalar;
   };
   name = "Ring Lens";
   outputImage = {class = CIImage; };
}

------------- Filter # 41:  CIStarburst -------------
{
```

```
    category = Distortion;
    inputCenter = {class = CIVector; default = <150, 150, 0, 1>; type =
position; };
    inputImage = {class = CIImage; };
    inputRadius = {
        class = NSNumber;
        default = 300;
        identity = 300;
        minimum = 0.01;
        sliderMaximum = 1000;
        sliderMinimum = 0.01;
        type = distance;
    };
    name = Starburst;
    outputImage = {class = CIImage; };
}

-------------- Filter # 42:  CITorusLens --------------
{
    category = Distortion;
    inputCenter = {class = CIVector; default = <150, 150, 0, 1>; type =
position; };
    inputImage = {class = CIImage; };
    inputRadius = {
        class = NSNumber;
        default = 160;
        identity = 160;
        minimum = 0;
        sliderMaximum = 1000;
        sliderMinimum = 0;
        type = distance;
    };
    inputRefraction = {
        class = NSNumber;
        default = 1.7;
        identity = 0;
        minimum = -5;
        sliderMaximum = 5;
        sliderMinimum = -5;
        type = scalar;
    };
    inputSymmetricRefraction = {class = NSNumber; default = 0; identity
= 0; type = boolean; };
    inputThickness = {
        class = NSNumber;
        default = 0.43;
```

```
      identity = 0.43;
      minimum = 0;
      sliderMaximum = 1;
      sliderMinimum = 0;
      type = distance;
   };
   name = "Torus Lens";
   outputImage = {class = CIImage; };
}

-------------- Filter # 43: CIGlassLozenge --------------
{
   category = Distortion;
   inputImage = {class = CIImage; };
   inputPoint0 = {class = CIVector; default = <150, 150, 0, 1>; type = position; };
   inputPoint1 = {class = CIVector; default = <350, 150, 0, 1>; type = position; };
   inputRadius = {
      class = NSNumber;
      default = 100;
      identity = 100;
      minimum = 0;
      sliderMaximum = 1000;
      sliderMinimum = 0;
      type = distance;
   };
   inputRefraction = {
      class = NSNumber;
      default = 30;
      identity = 0;
      minimum = -100;
      sliderMaximum = 200;
      sliderMinimum = -100;
      type = scalar;
   };
   name = "Glass Lozenge";
   outputImage = {class = CIImage; };
}

-------------- Filter # 44: CITwirlDistortion --------------
{
   category = Distortion;
   inputAngle = {
      class = NSNumber;
      default = 0;
```

```
       identity = 0;
       maximum = 6.283185307179586;
       minimum = 0;
       sliderMaximum = 500;
       sliderMinimum = -500;
       type = angle;
    };
    inputCenter = {class = CIVector; default = <150, 150, 0, 1>; type =
position; };
    inputGradualAngles = {class = NSNumber; default = 0; identity = 0;
type = boolean; };
    inputImage = {class = CIImage; };
    inputRadius = {
       class = NSNumber;
       default = 500;
       identity = 500;
       minimum = 0;
       sliderMaximum = 1000;
       sliderMinimum = 0;
       type = distance;
    };
    inputVortex = {class = NSNumber; default = 0; identity = 0; type =
boolean; };
    name = Twirl;
    outputImage = {class = CIImage; };
}

------------- Filter # 45:  CIFlagWaveDistortion ------------- {
    category = Distortion;
    inputDroop = {
       class = NSNumber;
       default = 0.5;
       identity = 0.5;
       minimum = 0;
       sliderMaximum = 1;
       sliderMinimum = 0;
       type = scalar;
    };
    inputImage = {class = CIImage; };
    inputRippleAmplitude = {
       class = NSNumber;
       default = 25;
       identity = 25;
       minimum = 0;
       sliderMaximum = 120;
       sliderMinimum = 0;
```

```
      type = distance;
    };
    inputRippleWavelength = {
      class = NSNumber;
      default = 280;
      identity = 280;
      minimum = 10;
      sliderMaximum = 600;
      sliderMinimum = 10;
      type = distance;
    };
    inputRippleY = {
      class = NSNumber;
      default = 0.3;
      identity = 0.3;
      minimum = 0;
      sliderMaximum = 1;
      sliderMinimum = 0;
      type = distance;
    };
    inputXPhase = {
      class = NSNumber;
      default = 0;
      identity = 0;
      minimum = 0;
      sliderMaximum = 1000;
      sliderMinimum = 0;
      type = scalar;
    };
    inputXWidth = {
      class = NSNumber;
      default = 200;
      identity = 200;
      minimum = 0;
      sliderMaximum = 1000;
      sliderMinimum = 0;
      type = distance;
    };
    name = "Flag Wave";
    outputImage = {class = CIImage; };
}

------------- Filter # 46:  CIPerspectiveTile -------------
{
    category = Distortion;
    inputBottomLeft = {class = CIVector; default = <118, 484, 0, 1>;
``` type = position; };
   inputBottomRight = {class = CIVector; default = <646, 507, 0, 1>; type = position; };
   inputImage = {class = CIImage; };
   inputTopLeft = {class = CIVector; default = <155, 153, 0, 1>; type = position; };
   inputTopRight = {class = CIVector; default = <548, 140, 0, 1>; type = position; };
   name = "Perspective Tile";
   outputImage = {class = CIImage; };
}

------------- Filter # 47: CISphereDistortion -------------
{
   category = Distortion;
   inputCenter = {class = CIVector; default = <150, 150, 0, 1>; type = position; };
   inputImage = {class = CIImage; };
   inputRadius = {
     class = NSNumber;
     default = 300;
     minimum = 0;
     sliderMaximum = 1000;
     sliderMinimum = 0;
     type = distance;
   };
   name = Sphere;
   outputImage = {class = CIImage; };
}

------------- Filter # 48: CIAffineTransform -------------
{
   category = Distortion;
   inputAngle = {
     class = NSNumber;
     default = 0;
     identity = 0;
     maximum = 6.283185307179586;
     minimum = 0;
     sliderMaximum = 6.283185307179586;
     sliderMinimum = 0;
     type = angle;
   };
   inputCenter = {class = CIVector; default = <150, 150, 0, 1>; type = position; };
   inputImage = {class = CIImage; };

```
    inputScale = {
      class = NSNumber;
      default = 3;
      identity = 1;
      minimum = 0;
      sliderMaximum = 20;
      sliderMinimum = 0.05;
      type = scalar;
    };
    inputSkew = {
      class = NSNumber;
      default = 0;
      identity = 0;
      sliderMaximum = 3;
      sliderMinimum = -3;
      type = scalar;
    };
    inputStretch = {
      class = NSNumber;
      default = 1;
      identity = 1;
      minimum = 0;
      sliderMaximum = 10;
      sliderMinimum = 0.1;
      type = scalar;
    };
    name = "Affine Transform";
    outputImage = {class = CIImage; };
}

-------------- Filter # 49:  CICircularRippleGlassDistortion
--------------
{
   category = Distortion;
   inputCenter = {class = CIVector; default = <150, 150, 0, 1>; type = position; };
    inputForeshortening = {
      class = NSNumber;
      default = 1.6;
      identity = 1;
      minimum = 0.25;
      sliderMaximum = 4;
      sliderMinimum = 0.25;
      type = scalar;
    };
    inputImage = {class = CIImage; };
```

```
    inputPhase = {
      class = NSNumber;
      default = 0;
      identity = 0;
      minimum = 0;
      sliderMaximum = 6.283185307179586;
      sliderMinimum = 0;
      type = angle;
    };
    inputRefraction = {
      class = NSNumber;
      default = 100;
      identity = 100;
      minimum = 0;
      sliderMaximum = 200;
      sliderMinimum = 0;
      type = scalar;
    };
    inputWavelength = {
      class = NSNumber;
      default = 100;
      identity = 100;
      minimum = 0.1;
      sliderMaximum = 1000;
      sliderMinimum = 0.1;
      type = distance;
    };
    name = "Circular Ripple Glass";
    outputImage = {class = CIImage; };
}

-------------- Filter # 50: CILinearRippleGlassDistortion -------------- {
    category = Distortion;
    inputAngle = {
      class = NSNumber;
      default = 0;
      identity = 0;
      maximum = 6.283185307179586;
      minimum = 0;
      sliderMaximum = 6.283185307179586;
      sliderMinimum = 0;
      type = angle;
    };
    inputCenter = {class = CIVector; default = <150, 150, 0, 1>; type = position; };
    inputImage = {class = CIImage; };
```

```
    inputRefraction = {
      class = NSNumber;
      default = 100;
      identity = 100;
      minimum = 0;
      sliderMaximum = 200;
      sliderMinimum = 0;
      type = scalar;
    };
    inputWavelength = {
      class = NSNumber;
      default = 100;
      identity = 100;
      minimum = 0.1;
      sliderMaximum = 1000;
      sliderMinimum = 0.1;
      type = distance;
    };
    name = "Linear Ripple Glass";
    outputImage = {class = CIImage; };
}

------------- Filter # 51:  CISuperGlassLozengeDistortion ------------- {
    category = Distortion;
    inputColor = {class = CIColor; default = <1, 1, 1, 1>; type =
opaqueColor; };
    inputImage = {class = CIImage; };
    inputPoint0 = {class = CIVector; default = <150, 150, 0, 1>; type =
position; };
    inputPoint1 = {class = CIVector; default = <350, 150, 0, 1>; type =
position; };
    inputRadius = {
      class = NSNumber;
      default = 100;
      identity = 100;
      minimum = 0;
      sliderMaximum = 1000;
      sliderMinimum = 0;
      type = distance;
    };
    inputReflection = {
      class = NSNumber;
      default = 1;
      identity = 0;
      minimum = 0;
      sliderMaximum = 2;
```

```
    sliderMinimum = 0;
    type = scalar;
  };
  inputRefraction = {
    class = NSNumber;
    default = 6;
    identity = 0;
    minimum = 0;
    sliderMaximum = 200;
    sliderMinimum = 0;
    type = scalar;
  };
  inputShineMap = {class = CIImage; };
  name = "Super Glass Lozenge";
  outputImage = {class = CIImage; };
}
```

------------- Filter # 52: CIPerspective -------------
```
{
  category = Distortion;
  inputBottomLeft = {class = CIVector; default = <118, 484, 0, 1>;
type = position; };
  inputBottomRight = {class = CIVector; default = <646, 507, 0, 1>;
type = position; };
  inputImage = {class = CIImage; };
  inputTopLeft = {class = CIVector; default = <155, 153, 0, 1>; type
= position; };
  inputTopRight = {class = CIVector; default = <548, 140, 0, 1>; type
= position; };
  name = Perspective;
  outputImage = {class = CIImage; };
}
```

------------- Filter # 53: CIInsideOutDistortion ------------- {
```
  category = Distortion;
  inputCenter = {class = CIVector; default = <150, 150, 0, 1>; type =
position; };
  inputImage = {class = CIImage; };
  inputRadius = {
    class = NSNumber;
    default = 150;
    identity = 0.1;
    minimum = 0;
    sliderMaximum = 1000;
    sliderMinimum = 0;
    type = distance;
```

```
   };
   name = "Inside Out";
   outputImage = {class = CIImage; };
}

------------- Filter # 54: CICircleSplashDistortion ------------- {
   category = Distortion;
   inputCenter = {class = CIVector; default = <150, 150, 0, 1>; type = position; };
   inputImage = {class = CIImage; };
   inputRadius = {
      class = NSNumber;
      default = 150;
      identity = 0.1;
      minimum = 0;
      sliderMaximum = 1000;
      sliderMinimum = 0;
      type = distance;
   };
   name = "Circle Splash";
   outputImage = {class = CIImage; };
}

------------- Filter # 55: CIKeystoneDistortion ------------- {
   category = Distortion;
   inputCenter = {class = CIVector; default = <150, 150, 0, 1>; type = position; };
   inputImage = {class = CIImage; };
   inputScale = {
      class = NSNumber;
      default = 0.5;
      identity = 0.5;
      minimum = 0.01;
      sliderMaximum = 10;
      sliderMinimum = 0.01;
      type = distance;
   };
   inputYBottom = {
      class = NSNumber;
      default = 1;
      identity = 1;
      minimum = 0;
      sliderMaximum = 1;
      sliderMinimum = 0;
      type = scalar;
   };
```

```
    inputYTop = {
      class = NSNumber;
      default = 0;
      identity = 0;
      minimum = 0;
      sliderMaximum = 1;
      sliderMinimum = 0;
      type = scalar;
    };
    name = Keystone;
    outputImage = {class = CIImage; };
}

------------- Filter # 56: CIColorAxialGradient ------------- {
    category = Generator;
    inputColor1 = {class = CIColor; default = <1, 0.9, 0.8, 1>; type = color; };
    inputColor2 = {class = CIColor; default = <0.5, 0.1, 0, 1>; type = color; };
    inputPoint1 = {class = CIVector; default = <0, 0, 0, 1>; type = position; };
    inputPoint2 = {class = CIVector; default = <200, 200, 0, 1>; type = position; };
    name = "Color Axial Gradient";
    outputImage = {class = CIImage; };
}

------------- Filter # 57: CIColorRadialGradient ------------- {
    category = Generator;
    inputCenter = {class = CIVector; default = <150, 150, 0, 1>; type = position; };
    inputColor1 = {class = CIColor; default = <1, 0.9, 0.8, 1>; type = color; };
    inputColor2 = {class = CIColor; default = <0.5, 0.1, 0, 1>; type = color; };
    inputRadius0 = {
      class = NSNumber;
      default = 5;
      identity = 5;
      minimum = 0;
      sliderMaximum = 1000;
      sliderMinimum = 0;
      type = distance;
    };
    inputRadius1 = {
      class = NSNumber;
```

```
      default = 100;
      identity = 100;
      minimum = 0;
      sliderMaximum = 1000;
      sliderMinimum = 0;
      type = distance;
   };
   name = "Color Radial Gradient";
   outputImage = {class = CIImage; };
}

-------------- Filter # 58:  CIAxialGradient --------------
{
   category = Generator;
   inputGradientImage = {class = CIImage; type = gradient; };
   inputPoint1 = {class = CIVector; default = <0, 0, 0, 1>; type = position; };
   inputPoint2 = {class = CIVector; default = <200, 200, 0, 1>; type = position; };
   name = "Axial Gradient";
   outputImage = {class = CIImage; };
}

-------------- Filter # 59:  CIRadialGradient --------------
{
   category = Generator;
   inputCenter = {class = CIVector; default = <150, 150, 0, 1>; type = position; };
   inputGradientImage = {class = CIImage; type = gradient; };
   inputRadius0 = {
      class = NSNumber;
      default = 5;
      identity = 5;
      minimum = 0;
      sliderMaximum = 1000;
      sliderMinimum = 0;
      type = distance;
   };
   inputRadius1 = {
      class = NSNumber;
      default = 100;
      identity = 100;
      minimum = 0;
      sliderMaximum = 1000;
      sliderMinimum = 0;
      type = distance;
```

```
   };
   name = "Radial Gradient";
   outputImage = {class = CIImage; };
}

-------------- Filter # 60:  CIGaussianGradient --------------
{
   category = Generator;
   inputCenter = {class = CIVector; default = <150, 150, 0, 1>; type = position; };
   inputColor = {class = CIColor; default = <1, 0.9, 0.8, 1>; type = color; };
   inputRadius = {
      class = NSNumber;
      default = 300;
      identity = 300;
      minimum = 0;
      sliderMaximum = 1000;
      sliderMinimum = 0;
      type = distance;
   };
   name = "Gaussian Gradient";
   outputImage = {class = CIImage; };
}

-------------- Filter # 61:  CICheckerboardGenerator -------------- {
   category = Generator;
   inputCenter = {class = CIVector; default = <150, 150, 0, 1>; type = position; };
   inputColor1 = {class = CIColor; default = <1, 0.9, 0.8, 1>; type = color; };
   inputColor2 = {class = CIColor; default = <0.5, 0.1, 0, 1>; type = color; };
   inputContrast = {
      class = NSNumber;
      default = 1;
      identity = 1;
      minimum = 0;
      sliderMaximum = 1;
      sliderMinimum = 0;
      type = scalar;
   };
   inputWidth = {
      class = NSNumber;
      default = 80;
      identity = 80;
```

```
      minimum = 0;
      sliderMaximum = 800;
      sliderMinimum = 0;
      type = distance;
   };
   name = Checkerboard;
   outputImage = {class = CIImage; };
}

------------- Filter # 62:  CIStripesGenerator -------------
{
   category = Generator;
   inputCenter = {class = CIVector; default = <150, 150, 0, 1>; type = position; };
   inputColor1 = {class = CIColor; default = <1, 0.9, 0.8, 1>; type = color; };
   inputColor2 = {class = CIColor; default = <0.5, 0.1, 0, 1>; type = color; };
      inputContrast = {
         class = NSNumber;
         default = 1;
         identity = 1;
         minimum = 0;
         sliderMaximum = 1;
         sliderMinimum = 0;
         type = scalar;
      };
      inputWidth = {
         class = NSNumber;
         default = 80;
         identity = 80;
         minimum = 0;
         sliderMaximum = 1000;
         sliderMinimum = 0;
         type = distance;
      };
   name = Stripes;
   outputImage = {class = CIImage; };
}

------------- Filter # 63:  CIOpArt1Generator -------------
{
   category = Generator;
   inputAmplitude = {
      class = NSNumber;
      default = 18;
```

```
        identity = 18;
        minimum = 0.1;
        sliderMaximum = 500;
        sliderMinimum = 0.1;
        type = distance;
    };
    inputContrast = {
        class = NSNumber;
        default = 3.12;
        identity = 3.12;
        minimum = 0.1;
        sliderMaximum = 10;
        sliderMinimum = 0.1;
        type = scalar;
    };
    inputLineThickness = {
        class = NSNumber;
        default = 3.64;
        identity = 3.64;
        minimum = 0;
        sliderMaximum = 10;
        sliderMinimum = 0;
        type = distance;
    };
    inputRoundness = {
        class = NSNumber;
        default = 0.07000000000000001;
        identity = 0.07000000000000001;
        minimum = -0.11;
        sliderMaximum = 0.7;
        sliderMinimum = -0.11;
        type = distance;
    };
    inputWavelength1 = {
        class = NSNumber;
        default = 700;
        identity = 700;
        minimum = 2;
        sliderMaximum = 1000;
        sliderMinimum = 2;
        type = distance;
    };
    inputWavelength2 = {
        class = NSNumber;
        default = 140;
        identity = 140;
```

```
      minimum = 2;
      sliderMaximum = 1000;
      sliderMinimum = 2;
      type = distance;
   };
   name = "Op Art 1";
   outputImage = {class = CIImage; };
}

------------- Filter # 64: CIOpArt2Generator -------------
{
   category = Generator;
   inputAngle = {
      class = NSNumber;
      default = 0;
      identity = 0;
      maximum = 6.283185307179586;
      minimum = 0;
      sliderMaximum = 6.283185307179586;
      sliderMinimum = 0;
      type = angle;
   };
   inputCompression = {
      class = NSNumber;
      default = 0.71;
      identity = 0.71;
      minimum = 0;
      sliderMaximum = 1;
      sliderMinimum = 0;
      type = scalar;
   };
   inputContrast = {
      class = NSNumber;
      default = 3.8;
      identity = 3.8;
      minimum = 0;
      sliderMaximum = 20;
      sliderMinimum = 0;
      type = scalar;
   };
   inputRadius = {
      class = NSNumber;
      default = 0.6;
      identity = 0.6;
      minimum = 0;
      sliderMaximum = 1.5;
```

```
      sliderMinimum = 0;
      type = scalar;
    };
    inputScale = {
      class = NSNumber;
      default = 80;
      identity = 80;
      minimum = 1;
      sliderMaximum = 200;
      sliderMinimum = 1;
      type = scalar;
    };
    name = "Op Art 2";
    outputImage = {class = CIImage; };
}

------------- Filter # 65:  CIOpArt3Generator -------------
{
    category = Generator;
    inputAmplitude = {
      class = NSNumber;
      default = 16;
      identity = 16;
      minimum = 0.1;
      sliderMaximum = 500;
      sliderMinimum = 0.1;
      type = scalar;
    };
    inputContrast = {
      class = NSNumber;
      default = 4;
      identity = 4;
      minimum = 0.1;
      sliderMaximum = 10;
      sliderMinimum = 0.1;
      type = scalar;
    };
    inputLineThickness = {
      class = NSNumber;
      default = 5.4;
      identity = 5.4;
      minimum = 0;
      sliderMaximum = 10;
      sliderMinimum = 0;
      type = distance;
    };
```

```
    inputRoundness = {
      class = NSNumber;
      default = 0.12;
      identity = 0.12;
      minimum = -0.11;
      sliderMaximum = 0.7;
      sliderMinimum = -0.11;
      type = distance;
    };
    inputSkew = {
      class = NSNumber;
      default = 2.28;
      identity = 2.28;
      minimum = 0;
      sliderMaximum = 10;
      sliderMinimum = 0;
      type = scalar;
    };
    inputWavelength = {
      class = NSNumber;
      default = 314;
      identity = 314;
      minimum = 2;
      sliderMaximum = 1000;
      sliderMinimum = 2;
      type = distance;
    };
    name = "Op Art 3";
    outputImage = {class = CIImage; };
}

-------------- Filter # 66:  CIStarShineGenerator -------------- {
    category = Generator;
    inputCenter = {class = CIVector; default = <150, 150, 0, 1>; type = position; };
    inputColor = {class = CIColor; default = <1, 0.8, 0.6, 1>; type = color; };
    inputCrossAngle = {
      class = NSNumber;
      default = 0.6;
      identity = 0.6;
      minimum = 0;
      sliderMaximum = 6.283185307179586;
      sliderMinimum = 0;
      type = angle;
    };
```

```
inputCrossOpacity = {
    class = NSNumber;
    default = -2;
    identity = -2;
    minimum = -8;
    sliderMaximum = 0;
    sliderMinimum = -8;
    type = scalar;
};
inputCrossScale = {
    class = NSNumber;
    default = 15;
    identity = 15;
    minimum = 0;
    sliderMaximum = 100;
    sliderMinimum = 0;
    type = scalar;
};
inputCrossWidth = {
    class = NSNumber;
    default = 2.5;
    identity = 2.5;
    minimum = 0;
    sliderMaximum = 300;
    sliderMinimum = 0;
    type = distance;
};
inputEpsilon = {
    class = NSNumber;
    default = -2;
    identity = -2;
    minimum = -8;
    sliderMaximum = 0;
    sliderMinimum = -8;
    type = scalar;
};
inputRadius = {
    class = NSNumber;
    default = 50;
    identity = 50;
    minimum = 0;
    sliderMaximum = 300;
    sliderMinimum = 0;
    type = distance;
};
name = "Star Shine";
```

```
    outputImage = {class = CIImage; };
}

------------- Filter # 67: CILenticularHaloGenerator ------------- {
    category = Generator;
    inputCenter = {class = CIVector; default = <150, 150, 0, 1>; type = position; };
    inputColor = {class = CIColor; default = <1, 0.9, 0.8, 1>; type = color; };
    inputHaloOverlap = {
        class = NSNumber;
        default = 0.77;
        minimum = 0;
        sliderMaximum = 1;
        sliderMinimum = 0;
        type = scalar;
    };
    inputHaloRadius = {
        class = NSNumber;
        default = 70;
        minimum = 0;
        sliderMaximum = 1000;
        sliderMinimum = 0;
        type = distance;
    };
    inputHaloWidth = {
        class = NSNumber;
        default = 87;
        minimum = 0;
        sliderMaximum = 300;
        sliderMinimum = 0;
        type = angle;
    };
    inputImage = {class = CIImage; };
    inputLookupRadius = {
        class = NSNumber;
        default = 100;
        minimum = 0;
        sliderMaximum = 330;
        sliderMinimum = 0;
        type = distance;
    };
    inputStriationContrast = {
        class = NSNumber;
        default = 1;
        minimum = 0;
```

```
      sliderMaximum = 5;
      sliderMinimum = 0;
      type = scalar;
   };
   inputStriationStrength = {
      class = NSNumber;
      default = 0.5;
      minimum = 0;
      sliderMaximum = 3;
      sliderMinimum = 0;
      type = scalar;
   };
   inputTexture = {class = CIImage; };
   name = "Lenticular Halo";
   outputImage = {class = CIImage; };
}

------------ Filter # 68:  CIFloodGenerator ------------
{
   category = Generator;
   inputColor = {class = CIColor; default = <1, 0, 0, 1>; type = color; };
   name = Flood;
   outputImage = {class = CIImage; };
}

------------ Filter # 69:  CISunbeams ------------
{
   category = Generator;
   inputCenter = {class = CIVector; default = <150, 150, 0, 1>; type = position; };
   inputColor = {class = CIColor; default = <1, 0.8, 0.6, 1>; type = color; };
   inputImage = {class = CIImage; };
   inputLookupRadius = {
      class = NSNumber;
      default = 45;
      identity = 45;
      minimum = 0;
      sliderMaximum = 330;
      sliderMinimum = 0;
      type = distance;
   };
   inputMaxStriationRadius = {
      class = NSNumber;
      default = 2.58;
```

```
      identity = 2.58;
      minimum = 0;
      sliderMaximum = 10;
      sliderMinimum = 0;
      type = scalar;
    };
    inputStriationContrast = {
      class = NSNumber;
      default = 1.375;
      identity = 1.375;
      minimum = 0;
      sliderMaximum = 5;
      sliderMinimum = 0;
      type = scalar;
    };
    inputStriationStrength = {
      class = NSNumber;
      default = 0.5;
      identity = 0.5;
      minimum = 0;
      sliderMaximum = 3;
      sliderMinimum = 0;
      type = scalar;
    };
    inputSunRadius = {
      class = NSNumber;
      default = 40;
      identity = 40;
      minimum = 0;
      sliderMaximum = 1000;
      sliderMinimum = 0;
      type = distance;
    };
    inputTexture = {class = CIImage; };
    name = Sunbeams;
    outputImage = {class = CIImage; };
}

------------- Filter # 70: CIGammaTestImageGenerator ------------- {
    category = Generator;
    name = "Gamma Test Image";
    outputImage = {class = CIImage; };
}

------------- Filter # 71: CISharpen -------------
{
```

```
   category = Focus;
   inputImage = {class = CIImage; };
   inputIntensity = {
      class = NSNumber;
      default = 1;
      identity = 0;
      minimum = 0;
      sliderMaximum = 2;
      sliderMinimum = 0;
      type = scalar;
   };
   inputLuminanceOnly = {class = NSNumber; default = 0; identity = 0;
type = boolean; };
   inputRadius = {
      class = NSNumber;
      default = 2.5;
      identity = 0;
      minimum = 0;
      sliderMaximum = 100;
      sliderMinimum = 0;
      type = distance;
   };
   name = Sharpen;
   outputImage = {class = CIImage; };
}

-------------- Filter # 72:  CISharpenEdges --------------
{
   category = Focus;
   inputEdgeScale = {
      class = NSNumber;
      default = 1;
      identity = 1;
      minimum = 0;
      sliderMaximum = 10;
      sliderMinimum = 0;
      type = scalar;
   };
   inputEdgeThreshold = {
      class = NSNumber;
      default = 0.12;
      identity = 0.12;
      minimum = 0;
      sliderMaximum = 40;
      sliderMinimum = 0;
      type = scalar;
```

```
   };
   inputImage = {class = CIImage; };
   inputIntensity = {
     class = NSNumber;
     default = 1;
     identity = 0;
     minimum = 0;
     sliderMaximum = 2;
     sliderMinimum = 0;
     type = scalar;
   };
   inputRadius = {
     class = NSNumber;
     default = 2.5;
     identity = 0;
     minimum = 0;
     sliderMaximum = 100;
     sliderMinimum = 0;
     type = distance;
   };
   name = "Sharpen Edges";
   outputImage = {class = CIImage; };
}
```

------------- Filter # 73:  CIHalftone -------------
```
{
   category = Stylize;
   inputAngle = {
     class = NSNumber;
     default = 0.7853981633974483;
     identity = 0.7853981633974483;
     maximum = 6.283185307179586;
     minimum = 0;
     sliderMaximum = 6.283185307179586;
     sliderMinimum = 0;
     type = angle;
   };
   inputCenter = {class = CIVector; default = <150, 150, 0, 1>; type = position; };
   inputContrast = {
     class = NSNumber;
     default = 3.33;
     identity = 1;
     minimum = 1;
     sliderMaximum = 30;
     sliderMinimum = 1;
```

```
      type = scalar;
    };
    inputImage = {class = CIImage; };
    inputScale = {
      class = NSNumber;
      default = 6;
      identity = 6;
      minimum = 2;
      sliderMaximum = 100;
      sliderMinimum = 2;
      type = distance;
    };
    name = Halftone;
    outputImage = {class = CIImage; };
}

------------- Filter # 74:  CILineScreen -------------
{
    category = Stylize;
    inputAngle = {
      class = NSNumber;
      default = 0.5;
      identity = 0;
      maximum = 6.283185307179586;
      minimum = 0;
      sliderMaximum = 6.283185307179586;
      sliderMinimum = 0;
      type = angle;
    };
    inputCenter = {class = CIVector; default = <150, 150, 0, 1>; type = position; };
    inputContrast = {
      class = NSNumber;
      default = 0.5;
      identity = 0.5;
      minimum = 0.001;
      sliderMaximum = 1;
      sliderMinimum = 0.001;
      type = scalar;
    };
    inputImage = {class = CIImage; };
    inputScale = {
      class = NSNumber;
      default = -0.7;
      identity = -0.7;
      minimum = -3;
```

```
      sliderMaximum = -0.477122;
      sliderMinimum = -3;
      type = distance;
   };
   inputSkew = {
      class = NSNumber;
      default = 0;
      identity = 0;
      minimum = -3;
      sliderMaximum = 3;
      sliderMinimum = -3;
      type = scalar;
   };
   inputStretch = {
      class = NSNumber;
      default = 0;
      identity = 0;
      minimum = -2;
      sliderMaximum = 2;
      sliderMinimum = -2;
      type = scalar;
   };
   name = "Line Screen";
   outputImage = {class = CIImage; };
}

------------- Filter # 75:  CIHatchedScreen -------------
{
   category = Stylize;
   inputAngle = {
      class = NSNumber;
      default = 0.5;
      identity = 0;
      maximum = 6.283185307179586;
      minimum = 0;
      sliderMaximum = 6.283185307179586;
      sliderMinimum = 0;
      type = angle;
   };
   inputCenter = {class = CIVector; default = <150, 150, 0, 1>; type = position; };
   inputContrast = {
      class = NSNumber;
      default = 0.5;
      identity = 0.5;
      minimum = 0.001;
```

```
      sliderMaximum = 1;
      sliderMinimum = 0.001;
      type = scalar;
    };
    inputImage = {class = CIImage; };
    inputScale = {
      class = NSNumber;
      default = -0.7;
      identity = 0;
      minimum = -3;
      sliderMaximum = -0.477122;
      sliderMinimum = -3;
      type = distance;
    };
    inputSkew = {
      class = NSNumber;
      default = 0;
      identity = 0;
      minimum = -3;
      sliderMaximum = 3;
      sliderMinimum = -3;
      type = scalar;
    };
    inputStretch = {
      class = NSNumber;
      default = 0;
      identity = 0;
      minimum = -2;
      sliderMaximum = 2;
      sliderMinimum = -2;
      type = scalar;
    };
    name = "Hatched Screen";
    outputImage = {class = CIImage; };
}

-------------- Filter # 76:  CIWavyScreen --------------
{
    category = Stylize;
    inputAmplitude = {
      class = NSNumber;
      default = 40;
      identity = 40;
      minimum = 0;
      sliderMaximum = 100;
      sliderMinimum = 0;
```

```
      type = distance;
   };
   inputContrast = {
      class = NSNumber;
      default = 0.75;
      identity = 0.75;
      minimum = 0.001;
      sliderMaximum = 1;
      sliderMinimum = 0.001;
      type = scalar;
   };
   inputImage = {class = CIImage; };
   inputScale = {
      class = NSNumber;
      default = 5;
      identity = 5;
      minimum = 0.001;
      sliderMaximum = 200;
      sliderMinimum = 0.001;
      type = distance;
   };
   inputWavelength = {
      class = NSNumber;
      default = 125;
      identity = 125;
      minimum = 0.001;
      sliderMaximum = 500;
      sliderMinimum = 0.001;
      type = distance;
   };
   name = "Wavy Screen";
   outputImage = {class = CIImage; };
}

-------------- Filter # 77:  CICircularScreen --------------
{
   category = Stylize;
   inputCenter = {class = CIVector; default = <150, 150, 0, 1>; type = position; };
   inputContrast = {
      class = NSNumber;
      default = 1;
      identity = 1;
      minimum = 0.001;
      sliderMaximum = 1;
      sliderMinimum = 0.001;
```

```
      type = scalar;
    };
    inputImage = {class = CIImage; };
    inputScale = {
      class = NSNumber;
      default = -0.7;
      identity = -0.7;
      minimum = -3;
      sliderMaximum = -0.477122;
      sliderMinimum = -3;
      type = scalar;
    };
    name = "Circular Screen";
    outputImage = {class = CIImage; };
}

-------------- Filter # 78:  CITextureScreen --------------
{
    category = Stylize;
    inputAngle = {
      class = NSNumber;
      default = 0;
      identity = 0;
      maximum = 6.283185307179586;
      minimum = 0;
      sliderMaximum = 6.283185307179586;
      sliderMinimum = 0;
      type = angle;
    };
    inputCenter = {class = CIVector; default = <150, 150, 0, 1>; type = position; };
    inputImage = {class = CIImage; };
    inputImageContrast = {
      class = NSNumber;
      default = 1;
      identity = 1;
      minimum = 0;
      sliderMaximum = 20;
      sliderMinimum = 0;
      type = scalar;
    };
    inputMapImage = {class = CIImage; };
    inputNoiseContrast = {
      class = NSNumber;
      default = 1;
      identity = 1;
```

```
    minimum = 0;
    sliderMaximum = 20;
    sliderMinimum = 0;
    type = scalar;
};
inputNoisiness = {
    class = NSNumber;
    default = 1;
    identity = 1;
    minimum = 0;
    sliderMaximum = 20;
    sliderMinimum = 0;
    type = scalar;
};
inputScale = {
    class = NSNumber;
    default = 0;
    identity = 0;
    minimum = -2;
    sliderMaximum = 2;
    sliderMinimum = -2;
    type = distance;
};
inputSkew = {
    class = NSNumber;
    default = 0;
    identity = 0;
    minimum = -3;
    sliderMaximum = 3;
    sliderMinimum = -3;
    type = scalar;
};
inputStretch = {
    class = NSNumber;
    default = 0;
    identity = 0;
    minimum = -2;
    sliderMaximum = 2;
    sliderMinimum = -2;
    type = scalar;
};
inputThreshold = {
    class = NSNumber;
    default = 0.5;
    identity = 0.5;
    minimum = -2;
```

```
      sliderMaximum = 2;
      sliderMinimum = -2;
      type = scalar;
    };
    name = "Texture Screen";
    outputImage = {class = CIImage; };
}

------------- Filter # 79:  CIPixellate -------------
{
    category = Stylize;
    inputCenter = {class = CIVector; default = <150, 150, 0, 1>; type = position; };
    inputImage = {class = CIImage; };
    inputScale = {
      class = NSNumber;
      default = 8;
      identity = 1;
      minimum = 1;
      sliderMaximum = 100;
      sliderMinimum = 1;
      type = distance;
    };
    name = Pixellate;
    outputImage = {class = CIImage; };
}

------------- Filter # 80:  CIOverdriveGlow -------------
{
    category = Stylize;
    inputAlphaSoftness = {
      class = NSNumber;
      default = 0.2;
      identity = 0.2;
      minimum = 0;
      sliderMaximum = 1;
      sliderMinimum = 0;
      type = scalar;
    };
    inputGlowOpacity = {
      class = NSNumber;
      default = 1.5;
      identity = 0;
      minimum = 0;
      sliderMaximum = 3;
      sliderMinimum = 0;
```

```
      type = scalar;
   };
   inputGlowRadius = {
      class = NSNumber;
      default = 10;
      identity = 0;
      minimum = 0;
      sliderMaximum = 100;
      sliderMinimum = 0;
      type = distance;
   };
   inputImage = {class = CIImage; };
   inputThreshold = {
      class = NSNumber;
      default = 0.75;
      identity = 0.75;
      minimum = 0;
      sliderMaximum = 1;
      sliderMinimum = 0;
      type = scalar;
   };
   name = "Overdrive Glow";
   outputImage = {class = CIImage; };
}

------------- Filter # 81:  CIHighpass -------------
{
   category = Stylize;
   inputAmount = {
      class = NSNumber;
      default = 15;
      identity = 15;
      minimum = 0;
      sliderMaximum = 30;
      sliderMinimum = 0;
      type = scalar;
   };
   inputImage = {class = CIImage; };
   inputRadius = {
      class = NSNumber;
      default = 10;
      identity = 10;
      minimum = 0;
      sliderMaximum = 100;
      sliderMinimum = 0;
      type = distance;
```

```
   };
   name = Highpass;
   outputImage = {class = CIImage; };
}

------------- Filter # 82:  CIBloom -------------
{
   category = Stylize;
   inputAmount = {
      class = NSNumber;
      default = 1;
      minimum = 0;
      sliderMaximum = 2;
      sliderMinimum = 0;
      type = scalar;
   };
   inputImage = {class = CIImage; };
   inputRadius = {
      class = NSNumber;
      default = 10;
      minimum = 0;
      sliderMaximum = 100;
      sliderMinimum = 0;
      type = distance;
   };
   name = Bloom;
   outputImage = {class = CIImage; };
}

------------- Filter # 83:  CIGloom -------------
{
   category = Stylize;
   inputAmount = {
      class = NSNumber;
      default = 1;
      minimum = 0;
      sliderMaximum = 2;
      sliderMinimum = 0;
      type = scalar;
   };
   inputImage = {class = CIImage; };
   inputRadius = {
      class = NSNumber;
      default = 10;
      minimum = 0;
      sliderMaximum = 100;
```

```
      sliderMinimum = 0;
      type = distance;
   };
   name = Gloom;
   outputImage = {class = CIImage; };
}

-------------- Filter # 84:  CIEdges --------------
{
   category = Stylize;
   inputImage = {class = CIImage; };
   inputIntensity = {
      class = NSNumber;
      default = 1;
      identity = 0;
      minimum = 0;
      sliderMaximum = 50;
      sliderMinimum = 0;
      type = scalar;
   };
   name = Edges;
   outputImage = {class = CIImage; };
}

-------------- Filter # 85:  CIEdgeWork --------------
{
   category = Stylize;
   inputAmount = {
      class = NSNumber;
      default = 15;
      minimum = 0;
      sliderMaximum = 30;
      sliderMinimum = 0;
      type = scalar;
   };
   inputBlur = {
      class = NSNumber;
      default = 3;
      minimum = 0;
      sliderMaximum = 3.5;
      sliderMinimum = 0;
      type = scalar;
   };
   inputImage = {class = CIImage; };
   inputRadius = {
      class = NSNumber;
```

```
        default = 10;
        minimum = 0;
        sliderMaximum = 100;
        sliderMinimum = 0;
        type = distance;
    };
    inputSmoothness = {
        class = NSNumber;
        default = 1;
        minimum = 0;
        sliderMaximum = 5;
        sliderMinimum = 0;
        type = scalar;
    };
    name = "Edge Work";
    outputImage = {class = CIImage; };
}

------------- Filter # 86:  CIGradientLookupTable ------------- {
    category = Stylize;
    inputBias = {
        class = NSNumber;
        default = 0;
        identity = 0;
        minimum = 0;
        sliderMaximum = 1;
        sliderMinimum = 0;
        type = scalar;
    };
    inputImage = {class = CIImage; };
    inputTexture = {class = CIImage; };
    name = "Gradient Lookup Table";
    outputImage = {class = CIImage; };
}

------------- Filter # 87:  CICMYKHalftone -------------
{
    category = Stylize;
    inputBlackAngle = {
        class = NSNumber;
        default = 0.7853981633974483;
        identity = 0.7853981633974483;
        minimum = -3.141592653589793;
        sliderMaximum = 3.141592653589793;
        sliderMinimum = -3.141592653589793;
        type = angle;
```

```
};
inputCenter = {class = CIVector; default = <150, 150, 0, 1>; type = position; };
inputContrast = {
    class = NSNumber;
    default = 5.62;
    identity = 5.62;
    minimum = 1;
    sliderMaximum = 30;
    sliderMinimum = 1;
    type = scalar;
};
inputCyanAngle = {
    class = NSNumber;
    default = 1.308996938995747;
    identity = 1.308996938995747;
    minimum = -3.141592653589793;
    sliderMaximum = 3.141592653589793;
    sliderMinimum = -3.141592653589793;
    type = angle;
};
inputGamma = {
    class = NSNumber;
    default = 1.8;
    identity = 1.8;
    minimum = 0.316;
    sliderMaximum = 3.162;
    sliderMinimum = 0.316;
    type = scalar;
};
inputImage = {class = CIImage; };
inputMagentaAngle = {
    class = NSNumber;
    default = 0.2617993877991494;
    identity = 0.2617993877991494;
    minimum = -3.141592653589793;
    sliderMaximum = 3.141592653589793;
    sliderMinimum = -3.141592653589793;
    type = angle;
};
inputScale = {
    class = NSNumber;
    default = 6;
    identity = 6;
    minimum = 2;
    sliderMaximum = 100;
```

```
      sliderMinimum = 2;
      type = distance;
   };
   inputUCR = {
      class = NSNumber;
      default = 0.5;
      identity = 0.5;
      minimum = 0;
      sliderMaximum = 1;
      sliderMinimum = 0;
      type = scalar;
   };
   inputYellowAngle = {
      class = NSNumber;
      default = 0;
      identity = 0;
      minimum = -3.141592653589793;
      sliderMaximum = 3.141592653589793;
      sliderMinimum = -3.141592653589793;
      type = angle;
   };
   name = "CMYK Halftone";
   outputImage = {class = CIImage; };
}

-------------- Filter # 88: CILayerPlusDropShadow -------------- {
   category = Compositing;
   inputImage = {class = CIImage; };
   inputLayer = {class = CIImage; };
   inputLayerOpacity = {
      class = NSNumber;
      default = 1;
      minimum = 0;
      sliderMaximum = 1;
      sliderMinimum = 0;
      type = scalar;
   };
   inputShadowAngle = {
      class = NSNumber;
      default = 0;
      minimum = 0;
      sliderMaximum = 6.283185307179586;
      sliderMinimum = 0;
      type = angle;
   };
   inputShadowBlurRadius = {
```

```
      class = NSNumber;
      default = 10;
      identity = 10;
      minimum = 0;
      sliderMaximum = 100;
      sliderMinimum = 0;
      type = distance;
   };
   inputShadowColor = {class = CIColor; default = <0, 0, 0, 1>; type = color; };
   inputShadowOffset = {
      class = NSNumber;
      default = 0;
      minimum = 0;
      sliderMaximum = 80;
      sliderMinimum = 0;
      type = distance;
   };
   inputShadowOpacity = {
      class = NSNumber;
      default = 0.72;
      minimum = 0;
      sliderMaximum = 3;
      sliderMinimum = 0;
      type = scalar;
   };
   name = "Layer With Drop Shadow";
   outputImage = {class = CIImage; };
}

-------------- Filter # 89: CIVideoNoiseFilter --------------
{
   category = Stylize;
   inputCenter = {class = CIVector; default = <150, 150, 0, 1>; type = position; };
   inputExtent = {class = CIVector; default = <0, 0, 640, 80>; type = rectangle; };
   inputImage = {class = CIImage; };
   inputOpacity = {
      class = NSNumber;
      default = 1;
      minimum = 0;
      sliderMaximum = 2;
      sliderMinimum = 0;
      type = scalar;
   };
```

```
   inputScale = {
     class = NSNumber;
     default = 1;
     minimum = 1;
     sliderMaximum = 100;
     sliderMinimum = 1;
     type = scalar;
   };
   inputTexture = {class = CIImage; };
   name = "Video Noise";
   outputImage = {class = CIImage; };
}

------------- Filter # 90:  CISpotLight -------------
{
   category = Stylize;
   inputBrightness = {
     class = NSNumber;
     default = 3;
     identity = 1;
     minimum = 0;
     sliderMaximum = 10;
     sliderMinimum = 0;
     type = distance;
   };
   inputColor = {class = CIColor; default = <1, 1, 1, 1>; type =
opaqueColor; };
   inputConcentration = {
     class = NSNumber;
     default = 0.1;
     identity = 20;
     minimum = 0.001;
     sliderMaximum = 1.5;
     sliderMinimum = 0.001;
     type = scalar;
   };
   inputElevation = {
     class = NSNumber;
     default = 0.3;
     identity = 0.3;
     minimum = 0;
     sliderMaximum = 1.570796326794897;
     sliderMinimum = 0;
     type = scalar;
   };
   inputImage = {class = CIImage; };
``` inputLightPointsAt = {class = CIVector; default = <200, 200, 0, 1>; type = position3; };
        inputLightPosition = {class = CIVector; default = <400, 600, 150, 1>; type = position3; };
        name = "Spot Light";
        outputImage = {class = CIImage; };
}

------------- Filter # 91: CIBlendWithMask -------------
{
    category = Compositing;
    inputImage = {class = CIImage; };
    inputImage2 = {class = CIImage; };
    inputMask = {class = CIImage; };
    inputOpacity = {
        class = NSNumber;
        default = 1;
        minimum = 0;
        sliderMaximum = 1;
        sliderMinimum = 0;
        type = scalar;
    };
    name = "Blend With Mask";
    outputImage = {class = CIImage; };
}

------------- Filter # 92: CIRoundedSurface -------------
{
    category = Stylize;
    inputBearing = {
        class = NSNumber;
        default = 0;
        identity = 0;
        minimum = -3.141592653589793;
        sliderMaximum = 3.141592653589793;
        sliderMinimum = -3.141592653589793;
        type = angle;
    };
    inputBrightness = {
        class = NSNumber;
        default = 1;
        identity = 1;
        minimum = 0;
        sliderMaximum = 8;
        sliderMinimum = 0;
        type = scalar;

```
    };
    inputColor = {class = CIColor; default = <1, 1, 1, 1>; type =
opaqueColor; };
    inputElevation = {
        class = NSNumber;
        default = 0.1;
        identity = 0.1;
        minimum = 0;
        sliderMaximum = 1;
        sliderMinimum = 0;
        type = angle;
    };
    inputEnvironmentMap = {class = CIImage; };
    inputImage = {class = CIImage; };
    inputReflection = {
        class = NSNumber;
        default = 0.2;
        identity = 0.2;
        minimum = 0;
        sliderMaximum = 1;
        sliderMinimum = 0;
        type = scalar;
    };
    inputRoundness = {
        class = NSNumber;
        default = 0.4;
        identity = 0.4;
        minimum = -1;
        sliderMaximum = 2;
        sliderMinimum = -1;
        type = scalar;
    };
    inputSurfaceScale = {
        class = NSNumber;
        default = -1.6;
        identity = -1.6;
        minimum = -5;
        sliderMaximum = 3;
        sliderMinimum = -5;
        type = scalar;
    };
    name = "Rounded Surface";
    outputImage = {class = CIImage; };
}
```

-------------- Filter # 93: CIEmboss --------------

```
{
    category = Stylize;
    inputBearing = {
        class = NSNumber;
        default = 0;
        identity = 0;
        minimum = -3.141592653589793;
        sliderMaximum = 3.141592653589793;
        sliderMinimum = -3.141592653589793;
        type = angle;
    };
    inputBrightness = {
        class = NSNumber;
        default = 1;
        identity = 1;
        minimum = 0;
        sliderMaximum = 8;
        sliderMinimum = 0;
        type = scalar;
    };
    inputColor = {class = CIColor; default = <1, 1, 1, 1>; type = opaqueColor; };
    inputElevation = {
        class = NSNumber;
        default = 0.1;
        identity = 0.1;
        minimum = 0;
        sliderMaximum = 1;
        sliderMinimum = 0;
        type = angle;
    };
    inputEnvironmentMap = {class = CIImage; };
    inputImage = {class = CIImage; };
    inputReflection = {
        class = NSNumber;
        default = 0.2;
        identity = 0.2;
        minimum = 0;
        sliderMaximum = 1;
        sliderMinimum = 0;
        type = scalar;
    };
    inputRoundness = {
        class = NSNumber;
        default = 0.4;
        identity = 0.4;
```

```
      minimum = -1;
      sliderMaximum = 2;
      sliderMinimum = -1;
      type = scalar;
   };
   inputSurfaceScale = {
      class = NSNumber;
      default = -1.6;
      identity = -1.6;
      minimum = -5;
      sliderMaximum = 3;
      sliderMinimum = -5;
      type = scalar;
   };
   name = Emboss;
   outputImage = {class = CIImage; };
}

------------- Filter # 94: CIEmbossOver -------------
{
   category = Stylize;
   inputBearing = {
      class = NSNumber;
      default = 0;
      identity = 0;
      minimum = -3.141592653589793;
      sliderMaximum = 3.141592653589793;
      sliderMinimum = -3.141592653589793;
      type = angle;
   };
   inputBrightness = {
      class = NSNumber;
      default = 1;
      identity = 1;
      minimum = 0;
      sliderMaximum = 8;
      sliderMinimum = 0;
      type = scalar;
   };
   inputElevation = {
      class = NSNumber;
      default = 0.1;
      identity = 0.1;
      minimum = 0;
      sliderMaximum = 1;
      sliderMinimum = 0;
```

```
      type = angle;
   };
   inputImage = {class = CIImage; };
   inputRoundness = {
      class = NSNumber;
      default = 0.4;
      identity = 0.4;
      minimum = -1;
      sliderMaximum = 2;
      sliderMinimum = -1;
      type = scalar;
   };
   inputSurfaceScale = {
      class = NSNumber;
      default = -1.6;
      identity = -1.6;
      minimum = -5;
      sliderMaximum = 3;
      sliderMinimum = -5;
      type = scalar;
   };
   inputTexture = {class = CIImage; };
   name = "Emboss Over";
   outputImage = {class = CIImage; };
}

-------------- Filter # 95:  CISpotLight3 --------------
{
   category = Stylize;
   inputBrightness1 = {
      class = NSNumber;
      default = 3;
      identity = 1;
      minimum = 0;
      sliderMaximum = 10;
      sliderMinimum = 0;
      type = distance;
   };
   inputBrightness2 = {
      class = NSNumber;
      default = 3;
      identity = 1;
      minimum = 0;
      sliderMaximum = 10;
      sliderMinimum = 0;
      type = distance;
```

```
};
inputBrightness3 = {
  class = NSNumber;
  default = 3;
  identity = 1;
  minimum = 0;
  sliderMaximum = 10;
  sliderMinimum = 0;
  type = distance;
};
inputColor1 = {class = CIColor; default = <1, 1, 1, 1>; type = opaqueColor; };
inputColor2 = {class = CIColor; default = <1, 1, 1, 1>; type = opaqueColor; };
inputColor3 = {class = CIColor; default = <1, 1, 1, 1>; type = opaqueColor; };
inputConcentration1 = {
  class = NSNumber;
  default = 0.1;
  identity = 20;
  minimum = 0.001;
  sliderMaximum = 1.5;
  sliderMinimum = 0.001;
  type = scalar;
};
inputConcentration2 = {
  class = NSNumber;
  default = 0.1;
  identity = 20;
  minimum = 0.001;
  sliderMaximum = 1.5;
  sliderMinimum = 0.001;
  type = scalar;
};
inputConcentration3 = {
  class = NSNumber;
  default = 0.1;
  identity = 20;
  minimum = 0.001;
  sliderMaximum = 1.5;
  sliderMinimum = 0.001;
  type = scalar;
};
inputElevation1 = {
  class = NSNumber;
  default = 0.3;
```

```
      identity = 0.3;
      minimum = 0;
      sliderMaximum = 1.570796326794897;
      sliderMinimum = 0;
      type = scalar;
   };
   inputElevation2 = {
      class = NSNumber;
      default = 0.3;
      identity = 0.3;
      minimum = 0;
      sliderMaximum = 1.570796326794897;
      sliderMinimum = 0;
      type = scalar;
   };
   inputElevation3 = {
      class = NSNumber;
      default = 0.3;
      identity = 0.3;
      minimum = 0;
      sliderMaximum = 1.570796326794897;
      sliderMinimum = 0;
      type = scalar;
   };
   inputImage = {class = CIImage; };
   inputLightPointsAt1 = {class = CIVector; default = <200, 200, 0, 1>; type = position3; };
   inputLightPointsAt2 = {class = CIVector; default = <200, 200, 0, 1>; type = position3; };
   inputLightPointsAt3 = {class = CIVector; default = <200, 200, 0, 1>; type = position3; };
   inputLightPosition1 = {class = CIVector; default = <400, 600, 150, 1>; type = position3; };
   inputLightPosition2 = {class = CIVector; default = <400, 600, 150, 1>; type = position3; };
   inputLightPosition3 = {class = CIVector; default = <400, 600, 150, 1>; type = position3; };
   name = "Spot Light 3";
   outputImage = {class = CIImage; };
}

----------- Filter # 96: CIGaussianBlur -------------
{
   category = Focus;
   inputImage = {class = CIImage; };
   inputRadius = {
```

```
        class = NSNumber;
        default = 10;
        identity = 0;
        minimum = 0;
        sliderMaximum = 100;
        sliderMinimum = 0;
        type = distance;
    };
    name = "Gaussian Blur";
    outputImage = {class = CIImage; };
}

------------- Filter # 97:  CIMotionBlur -------------
{
    category = Focus;
    inputAngle = {
        class = NSNumber;
        default = 0;
        identity = 0;
        maximum = 6.283185307179586;
        minimum = 0;
        sliderMaximum = 6.283185307179586;
        sliderMinimum = 0;
        type = angle;
    };
    inputImage = {class = CIImage; };
    inputRadius = {
        class = NSNumber;
        default = 20;
        identity = 0;
        minimum = 0;
        sliderMaximum = 100;
        sliderMinimum = 0;
        type = distance;
    };
    name = "Motion Blur";
    outputImage = {class = CIImage; };
}

------------- Filter # 98:  CIAxialBlur -------------
{
    category = Focus;
    inputImage = {class = CIImage; };
    inputPoint1 = {class = CIVector; default = <0, 0, 0, 1>; type = position; };
    inputPoint2 = {class = CIVector; default = <200, 200, 0, 1>; type =
```

```
position; };
   inputRadius = {
      class = NSNumber;
      default = 10;
      identity = 0;
      minimum = 0;
      sliderMaximum = 100;
      sliderMinimum = 0;
      type = distance;
   };
   name = "Axial Blur";
   outputImage = {class = CIImage; };
}

-------------- Filter # 99:  CIVariableBlur --------------
{
   category = Focus;
   inputAmount = {
      class = NSNumber;
      default = 10;
      identity = 0;
      minimum = 0;
      sliderMaximum = 100;
      sliderMinimum = 0;
      type = distance;
   };
   inputCenter = {class = CIVector; default = <150, 150, 0, 1>; type = position; };
   inputImage = {class = CIImage; };
   inputInnerRadius = {
      class = NSNumber;
      default = 400;
      identity = 400;
      minimum = 0;
      sliderMaximum = 1000;
      sliderMinimum = 0;
      type = distance;
   };
   inputOuterRadius = {
      class = NSNumber;
      default = 100;
      identity = 100;
      minimum = 0;
      sliderMaximum = 1000;
      sliderMinimum = 0;
      type = distance;
```

};
    name = "Variable Blur";
    outputImage = {class = CIImage; };
}

------------- Filter #100: CICentralBlur -------------
{
    category = Focus;
    inputCenter = {class = CIVector; default = <150, 150, 0, 1>; type = position; };
    inputEffectRadius = {
        class = NSNumber;
        default = 400;
        identity = 400;
        minimum = 0;
        sliderMaximum = 1000;
        sliderMinimum = 0;
        type = distance;
    };
    inputImage = {class = CIImage; };
    inputRadius = {
        class = NSNumber;
        default = 10;
        identity = 0;
        minimum = 0;
        sliderMaximum = 100;
        sliderMinimum = 0;
        type = distance;
    };
    name = "Central Blur";
    outputImage = {class = CIImage; };
}

------------- Filter #101: CIRadialBlur -------------
{
    category = Focus;
    inputAngle = {
        class = NSNumber;
        default = 0.5235987755982988;
        identity = 0;
        maximum = 6.283185307179586;
        minimum = 0;
        sliderMaximum = 6.283185307179586;
        sliderMinimum = 0;
        type = angle;
    };

```
    inputCenter = {class = CIVector; default = <150, 150, 0, 1>; type =
position; };
    inputImage = {class = CIImage; };
    inputSubsampling = {
        class = NSNumber;
        default = 0.0036;
        identity = 0.0036;
        minimum = 0.001;
        sliderMaximum = 0.02;
        sliderMinimum = 0.001;
        type = angle;
    };
    name = "Radial Blur";
    outputImage = {class = CIImage; };
}

-------------- Filter #102:  CIZoomBlur --------------
{
    category = Focus;
    inputAmount = {
        class = NSNumber;
        default = 20;
        identity = 0;
        minimum = 0;
        sliderMaximum = 200;
        sliderMinimum = 0;
        type = distance;
    };
    inputCenter = {class = CIVector; default = <150, 150, 0, 1>; type =
position; };
    inputImage = {class = CIImage; };
    inputSampling = {
        class = NSNumber;
        default = 0.994;
        identity = 0.994;
        minimum = 0.98;
        sliderMaximum = 1;
        sliderMinimum = 0.98;
        type = scalar;
    };
    name = "Zoom Blur";
    outputImage = {class = CIImage; };
}

-------------- Filter #103:  CIAxialMotionBlur --------------
{
```

```
category = Focus;
inputAmount = {
   class = NSNumber;
   default = 10;
   identity = 0;
   minimum = 0;
   sliderMaximum = 200;
   sliderMinimum = 0;
   type = distance;
};
inputAngle = {
   class = NSNumber;
   default = 0;
   identity = 0;
   maximum = 6.283185307179586;
   minimum = 0;
   sliderMaximum = 6.283185307179586;
   sliderMinimum = 0;
   type = angle;
};
inputImage = {class = CIImage; };
inputPoint1 = {class = CIVector; default = <0, 0, 0, 1>; type = position; };
inputPoint2 = {class = CIVector; default = <200, 200, 0, 1>; type = position; };
   name = "Axial Motion Blur";
   outputImage = {class = CIImage; };
}

------------- Filter #104: CIFractalNoiseGenerator ------------- {
   category = Generator;
   inputCenter = {class = CIVector; default = <150, 150, 0, 1>; type = position; };
   inputScale = {
      class = NSNumber;
      default = 0.5;
      minimum = 0;
      sliderMaximum = 1;
      sliderMinimum = 0;
      type = scalar;
   };
   inputSmoothness = {
      class = NSNumber;
      default = 0.7;
      minimum = 0;
      sliderMaximum = 1;
```

```
      sliderMinimum = 0;
      type = scalar;
   };
   inputTexture = {class = CIImage; };
   name = "Fractal Noise";
   outputImage = {class = CIImage; };
}

------------- Filter #105: CIBlockyFractalNoiseGenerator ------------- {
   category = Generator;
   inputCenter = {class = CIVector; default = <150, 150, 0, 1>; type = position; };
   inputScale = {
      class = NSNumber;
      default = 0.5;
      minimum = 0;
      sliderMaximum = 1;
      sliderMinimum = 0;
      type = scalar;
   };
   inputSmoothness = {
      class = NSNumber;
      default = 0.7;
      minimum = 0;
      sliderMaximum = 1;
      sliderMinimum = 0;
      type = scalar;
   };
   inputTexture = {class = CIImage; };
   name = "Blocky Fractal Noise";
   outputImage = {class = CIImage; };
}

------------- Filter #106: CISourceOver -------------
{
   category = Compositing;
   inputImage = {class = CIImage; };
   inputLayer = {class = CIImage; };
   name = "Source Over";
   outputImage = {class = CIImage; };
}

------------- Filter #107: CISourceIn -------------
{
   category = Compositing;
   inputImage = {class = CIImage; };
```

```
      inputLayer = {class = CIImage; };
      name = "Source In";
      outputImage = {class = CIImage; };
}

------------ Filter #108:  CISourceOut ------------
{
      category = Compositing;
      inputImage = {class = CIImage; };
      inputLayer = {class = CIImage; };
      name = "Source Out";
      outputImage = {class = CIImage; };
}

------------ Filter #109:  CISourceAtop ------------
{
      category = Compositing;
      inputImage = {class = CIImage; };
      inputLayer = {class = CIImage; };
      name = "Source Atop";
      outputImage = {class = CIImage; };
}

------------ Filter #110:  CISourceXor ------------
{
      category = Compositing;
      inputImage = {class = CIImage; };
      inputLayer = {class = CIImage; };
      name = "Source Xor";
      outputImage = {class = CIImage; };
}

------------ Filter #111:  CILuminanceToAlpha ------------
{
      category = Compositing;
      inputImage = {class = CIImage; };
      name = "Luminance To Alpha";
      outputImage = {class = CIImage; };
}
```

The following concurrently filed applications are hereby incorporated by reference: IMPROVED BLUR COMPUTATION ALGORITHM By Mark Zimmer, filed concurrently herewith; SYSTEM FOR EMULATING GRAPHICS OPERATIONS, By John Harper, filed concurrently herewith; SYSTEM FOR OPTIMIZING GRAPHICS OPERATIONS, by John Harper, Mark Zimmer, Ralph Brunner, Peter Graffagnino, filed concurrently herewith; HIGH-LEVEL PROGRAM INTERFACE FOR GRAPHICS OPERATIONS, By John Harper, Mark Zimmer, Ralph Brunner, Peter Graffagnino, filed concurrently herewith.

The invention claimed is:

1. A method of determining if a first node in a graph may be combined with a second node in said graph, the method comprising the steps of;
   determining whether an output buffer of said first node will comprise data that is similar to an input texture of said second node;
   examining each program line in said second node to determine if it negates the possibility of combining nodes; and
   editing program code to replace any first-node-texture references with a single pixel, where a first-node-texture reference is a reference in the second node's code to a texture that would have been created by the first node.

2. The method of claim 1 wherein the step of examining each program line in said second node to determine if it negates the possibility of combining nodes comprises the step of renaming local variables.

3. The method of claim 1 wherein the step of examining each program line in said second node to determine if it negates the possibility of combining nodes comprises the step of renaming textures.

4. The method of claim 1 wherein the step of examining each program line in said second node to determine if it negates the possibility of combining nodes, comprises the step of analyzing each said program line to determine if there are dependent texture references.

5. The method of claim 1 wherein the step of examining each program line in said second node to determine if it negates the possibility of combining nodes, comprises the step of analyzing each said program line to determine if there is a reference to a texture that depends upon the output of said first node and said reference is located at coordinates stored in a register.

6. The method of claim 1 wherein the step of determining whether the output buffer of said first node will comprise data that is similar to the input texture of said second node, comprises the step of determining if the image pixels represented by the output of said first node are the same as the image pixels represented by the input of said second node.

7. A method of determining if a first fragment program may be combined with a second fragment program, where each said program is for processing a single graphic element, the method comprising the steps of:
   determining whether an output of the first fragment program represents relevant pixels that are the same pixels represented by an input of the second fragment program;
   examining each program line in said second program to determine if it negates the possibility of combining said two programs; and
   editing program code to replace at least one texture reference with a register reference.

8. The method of claim 7 wherein the step of examining each program line in said second program to determine if it negates the possibility of combining programs comprises the step of renaming local variables.

9. The method of claim 7 wherein the step of examining each program line in said second program to determine if it negates the possibility of combining programs comprises the step of renaming textures.

10. The method of claim 7 wherein the step of examining each program line in said second program to determine if it negates the possibility of combining programs, comprises the step of determining if there are dependent texture references.

11. The method of claim 7 wherein the step of examining each program line in said second program to determine if it negates the possibility of combining programs, comprises the step of determining if there is a texture reference that is dependent upon an output of said first program and said texture reference is located at coordinates stored in a register.

12. A computer-readable medium having computer executable instructions for performing the steps of:
   determining whether an output buffer of said first node will comprise data that is similar to an input texture of said second node;
   examining each program line in said second node to determine if it negates the possibility of combining nodes; and
   editing program code to replace any first-node-texture references with a single pixel, where a first-node-texture reference is a reference in the second node's code to a texture that would have been created by the first node.

13. A computer-readable medium having computer executable instructions for performing the steps of:
   determining whether an output of the first fragment program represents relevant pixels that are the same pixels represented by an input of the second fragment program;
   examining each program line in said second program to determine if it negates the possibility of combining said two programs; and
   editing program code to replace at least one texture reference with a register reference.

* * * * *